United States Patent
Constantz et al.

(10) Patent No.: US 12,145,098 B2
(45) Date of Patent: *Nov. 19, 2024

(54) NEGATIVE CARBON FOOTPRINT CONCRETE COMPOSITION

(71) Applicant: Blue Planet Systems Corporation, Los Gatos, CA (US)

(72) Inventors: Brent R. Constantz, Portola Valley, CA (US); Jacob Schneider, San Jose, CA (US); Christopher L. Camire, Morgan Hill, CA (US); Seung-Hee Kang, San Jose, CA (US); Ken Hines, Palo Alto, CA (US)

(73) Assignee: Blue Planet Systems Corporation, Los Gatos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/944,489

(22) Filed: Sep. 14, 2022

(65) Prior Publication Data

US 2023/0067634 A1 Mar. 2, 2023

Related U.S. Application Data

(63) Continuation of application No. 16/490,328, filed as application No. PCT/US2018/020527 on Mar. 1, 2018.

(Continued)

(51) Int. Cl.
*B01D 53/14* (2006.01)
*B01D 53/62* (2006.01)
*C01B 32/60* (2017.01)

(52) U.S. Cl.
CPC ..... *B01D 53/1475* (2013.01); *B01D 53/1425* (2013.01); *B01D 53/62* (2013.01);
(Continued)

(58) Field of Classification Search
CPC ........ B01D 53/1475; B01D 53/1425; B01D 53/62; B01D 2252/102; B01D 2257/504;
(Continued)

(56) References Cited

U.S. PATENT DOCUMENTS 1,316,071 A * 9/1919 Zukoski .............. C04B 28/26
106/602
5,298,475 A * 3/1994 Shibata .............. B01J 20/041
423/230
(Continued)

FOREIGN PATENT DOCUMENTS

WO WO2007139392 A1 12/2007
WO WO2014039578 A1 3/2014
(Continued)

OTHER PUBLICATIONS

Production of lightweight aggregate from industrial waste and carbon dioxide, accessed 2023 (Year: 2009).*
(Continued)

*Primary Examiner* — Christopher P Jones
*Assistant Examiner* — Phillip Y Shao
(74) *Attorney, Agent, or Firm* — Peter W. Schroen; Bret E. Field; Bozicevic, Field & Francis LLP

(57) ABSTRACT

A negative-carbon footprint concrete composition includes $CO_2$-sequestering aggregate that sequesters carbon dioxide ($CO_2$) from a $CO_2$ containing gas and cementitious material. The negative-carbon footprint concrete composition has a negative carbon footprint relative to an ordinary concrete composition.

13 Claims, 11 Drawing Sheets

Related U.S. Application Data

(60) Provisional application No. 62/624,022, filed on Jan. 30, 2018, provisional application No. 62/595,232, filed on Dec. 6, 2017, provisional application No. 62/548,883, filed on Aug. 22, 2017, provisional application No. 62/547,836, filed on Aug. 20, 2017, provisional application No. 62/466,151, filed on Mar. 2, 2017.

(52) U.S. Cl.
CPC ........ *C01B 32/60* (2017.08); *B01D 2252/102* (2013.01); *B01D 2257/504* (2013.01); *B01D 2258/0283* (2013.01); *B01D 2258/06* (2013.01)

(58) Field of Classification Search
CPC ........ B01D 2258/0283; B01D 2258/06; C01B 32/60
See application file for complete search history.

(56) References Cited

U.S. PATENT DOCUMENTS

| | | | |
|---|---|---|---|
| 7,727,374 B2 | 6/2010 | Jones | |
| 7,735,274 B2 | 6/2010 | Constantz et al. | |
| 7,749,476 B2 | 7/2010 | Constantz et al. | |
| 7,906,028 B2 | 3/2011 | Constantz et al. | |
| 7,914,685 B2 | 3/2011 | Constantz et al. | |
| 7,931,809 B2 | 4/2011 | Constantz et al. | |
| 8,333,944 B2 | 12/2012 | Constantz et al. | |
| 8,741,244 B2 | 6/2014 | Jones | |
| 8,795,508 B2 | 8/2014 | Jones | |
| 8,857,118 B2 | 10/2014 | Constantz et al. | |
| 9,359,221 B2 | 6/2016 | Jones et al. | |
| 9,957,623 B2 | 5/2018 | Gilliam et al. | |
| 10,668,443 B2 | 6/2020 | Kuppler et al. | |
| 2001/0054253 A1* | 12/2001 | Takahashi | C01F 11/18 423/230 |
| 2004/0129181 A1* | 7/2004 | Lalande | C04B 7/367 106/739 |
| 2006/0185560 A1* | 8/2006 | Ramme | C04B 28/021 106/705 |
| 2007/0246857 A1* | 10/2007 | Kurtis | C04B 28/02 106/805 |
| 2008/0138265 A1 | 6/2008 | Lackner et al. | |
| 2008/0245274 A1* | 10/2008 | Ramme | B01D 53/62 106/672 |
| 2008/0276803 A1 | 11/2008 | Molaison et al. | |
| 2009/0272297 A1* | 11/2009 | Stratton | C04B 28/04 106/712 |
| 2009/0301352 A1* | 12/2009 | Constantz | B01D 53/62 106/668 |
| 2010/0221163 A1 | 9/2010 | Dacosta et al. | |
| 2010/0247410 A1 | 9/2010 | Constantz et al. | |
| 2011/0038774 A1 | 2/2011 | Zhong | |
| 2011/0052453 A1 | 3/2011 | McLarnon et al. | |
| 2012/0211421 A1* | 8/2012 | Self | B01D 61/025 210/205 |
| 2012/0240764 A1 | 9/2012 | Kim et al. | |
| 2013/0167756 A1* | 7/2013 | Chen | C04B 7/34 106/789 |
| 2013/0287673 A1 | 10/2013 | Wang et al. | |
| 2013/0305925 A1* | 11/2013 | Polak | B01D 53/62 95/227 |
| 2013/0333568 A1 | 12/2013 | Bockman et al. | |
| 2014/0356267 A1* | 12/2014 | Hunwick | B01D 53/80 423/220 |
| 2015/0083607 A1 | 3/2015 | Gilliam et al. | |

FOREIGN PATENT DOCUMENTS

| | | |
|---|---|---|
| WO | WO2014144848 A1 | 9/2014 |
| WO | WO2015134408 A1 | 9/2015 |
| WO | WO2016033446 A1 | 3/2016 |
| WO | WO2016057709 A2 | 4/2016 |
| WO | WO2016160612 A1 | 10/2016 |
| WO | WO2017165849 A1 | 9/2017 |
| WO | WO2021228979 A1 | 11/2021 |

OTHER PUBLICATIONS

Production of carbonate aggregates using steel slag and carbon dioxide for carbon negative concrete, accessed 2023 (Year: 2017).*
Wikipedia page on sand (Year: 2024).*
Kelemen et al., Engineered carbon mineralization in ultramafic rocks for CO2 removal from air: Review and new insights, Chemical Geology, Sep. 2020, vol. 550, No. 119628, p. 1-22.
Maruyama et al., A New Concept of Calcium Carbonate Concrete using Demolished Concrete and CO2, Journal of Advanced Concrete Technology, Oct. 2021, vol. 19, No. 10, p. 1052-1060, abstract only.
The University of Tokyo, A concrete solution: Recycled concrete and CO2 from the air are made into a new building material, Oct. 8, 2021, Retrieved from: https://www.u-tokyo.ac.jp/focus/en/press/z0508_00190.html.
SRS Engineering Corporation, How Columns Work, 2007, p. 1, retrieved from http://www.srsengineering.com/our-products/distillation-columns/how-columns-work/ on Nov. 21, 2019.
Lamothe et al., Evaluation of a Microwave Oven System for the Dissolution of Geologic Samples, Analytical Chemistry, 1986, vol. 58, No. 8, p. 1881-1886, Abstract Only.
Makhloufi et al., Ammonia Based CO2 Capture Process Using Hollow Fiber Membrane Contactors, Journal of Membrane Science, 2014, vol. 455, p. 236-246.

\* cited by examiner

NEGATIVE CARBON FOOTPRINT CONCRETE COMPOSITION

CROSS-REFERENCE TO RELATED APPLICATIONS

This application is a continuation of United States application Ser. No. 16/490,328 filed on Aug. 30, 2019, which application is a national stage entry of International Application No. PCT/US2018/020527 filed on Mar. 1, 2018, which application, pursuant to 35 U.S.C. § 119(e), claims priority to the filing dates of: U.S. Provisional Application Ser. No. 62/466,151 filed on Mar. 2, 2017; U.S. Provisional Application Ser. No. 62/547,836 filed on Aug. 20, 2017; U.S. Provisional Application Ser. No. 62/548,883 filed on Aug. 22, 2017; U.S. Provisional Application Ser. No. 62/595,232 filed on Dec. 6, 2017; and U.S. Provisional Application Ser. No. 62/624,022 filed on Jan. 30, 2018; the disclosures of which applications are herein incorporated by reference.

INTRODUCTION

Carbon dioxide ($CO_2$) is a naturally occurring chemical compound that is present in Earth's atmosphere as a gas. Sources of atmospheric $CO_2$ are varied, and include humans and other living organisms that produce $CO_2$ in the process of respiration, as well as other naturally occurring sources, such as volcanoes, hot springs, and geysers.

Additional major sources of atmospheric $CO_2$ include industrial plants. Many types of industrial plants (including cement plants, refineries, steel mills and power plants) combust various carbon-based fuels, such as fossil fuels and syngases. Fossil fuels that are employed include coal, natural gas, oil, petroleum coke and biofuels. Fuels are also derived from tar sands, oil shale, coal liquids, and coal gasification and biofuels that are made via syngas.

The environmental effects of $CO_2$ are of significant interest. $CO_2$ is commonly viewed as a greenhouse gas. The phrase "global warming" is used to refer to observed and continuing rise in the average temperature of Earth's atmosphere and oceans since the late 19th century. Because human activities since the industrial revolution have rapidly increased concentrations of atmospheric $CO_2$, anthropogenic $CO_2$ has been implicated in global warming and climate change, as well as increasing oceanic bicarbonate concentration. Ocean uptake of fossil fuel $CO_2$ is now proceeding at about 1 million metric tons of $CO_2$ per hour. Since the early 20th century, the Earth's mean surface temperature has increased by about 0.8° C. (1.4° F.), with about two-thirds of the increase occurring since 1980.

The effects of global warming on the environment and for human life are numerous and varied. Some effects of recent climate change may already be occurring. Rising sea levels, glacier retreat, Arctic shrinkage, and altered patterns of agriculture are cited as direct consequences, but predictions for secondary and regional effects include extreme weather events, an expansion of tropical diseases, changes in the timing of seasonal patterns in ecosystems, and drastic economic impact.

Projected climate changes due to global warming have the potential to lead to future large-scale and possibly irreversible effects at continental and global scales. The likelihood, magnitude, and timing is uncertain and controversial, but some examples of projected climate changes include significant slowing of the ocean circulation that transports warm water to the North Atlantic, large reductions in the Greenland and Western Antarctic Ice Sheets, accelerated global warming due to carbon cycle feedbacks in the terrestrial biosphere, and releases of terrestrial carbon from permafrost regions and methane from hydrates in coastal sediments.

While a matter of scientific debate, it is believed that excess atmospheric $CO_2$ is a significant contributing factor to global warming. Since the beginning of the Industrial Revolution, the concentration of $CO_2$ has increased by about 100 parts-per-million (ppm) (i.e., from 280 ppm to 380 ppm), and was recently observed to reach an average daily value of over 400 ppm. As such, there is great interest in the sequestration of $CO_2$, particularly in a manner sufficient to at least ameliorate the ever-increasing amounts of anthropogenic $CO_2$ that is present in the atmosphere.

Concerns over anthropogenic climate change and ocean acidification, have fueled an urgency to discover scalable, cost effective, methods of carbon capture and sequestration (CCS). Typically, methods of CCS separate pure $CO_2$ from complex flue streams, compress the purified $CO_2$, and finally inject it into underground saline reservoirs for geologic sequestration. These multiple steps are very energy and capital intensive. Carbonate mineralization is another method to sequester large amounts of $CO_2$, in gigaton (Gt, i.e., 1,000,000,000 tons) volumes, sustainably.

Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include: (i) DAC can address the emissions of distributed sources (e.g. cars, planes), which account for a large portion of the worldwide greenhouse gas emissions and can currently not be captured at the site of emission in an economically feasible way; (ii) DAC can address emissions from the past and can therefore create truly negative emissions; and (iii) DAC systems do not need to be attached to the source of emission but are rather location independent and can for example be located at the site of further $CO_2$ processing.

SUMMARY

Methods of sequestering carbon dioxide ($CO_2$) are provided. Aspects of the methods include contacting an aqueous capture liquid, such as an aqueous capture ammonia, with a direct air capture (DAC) generated gaseous source of $CO_2$ under conditions sufficient to produce an aqueous carbonate liquid, such as an aqueous ammonium carbonate. The aqueous carbonate liquid is then combined with a cation source under conditions sufficient to produce a solid $CO_2$ sequestering carbonate. Also provided are systems configured for carrying out the methods.

DETAILED DESCRIPTION

Figure 1:
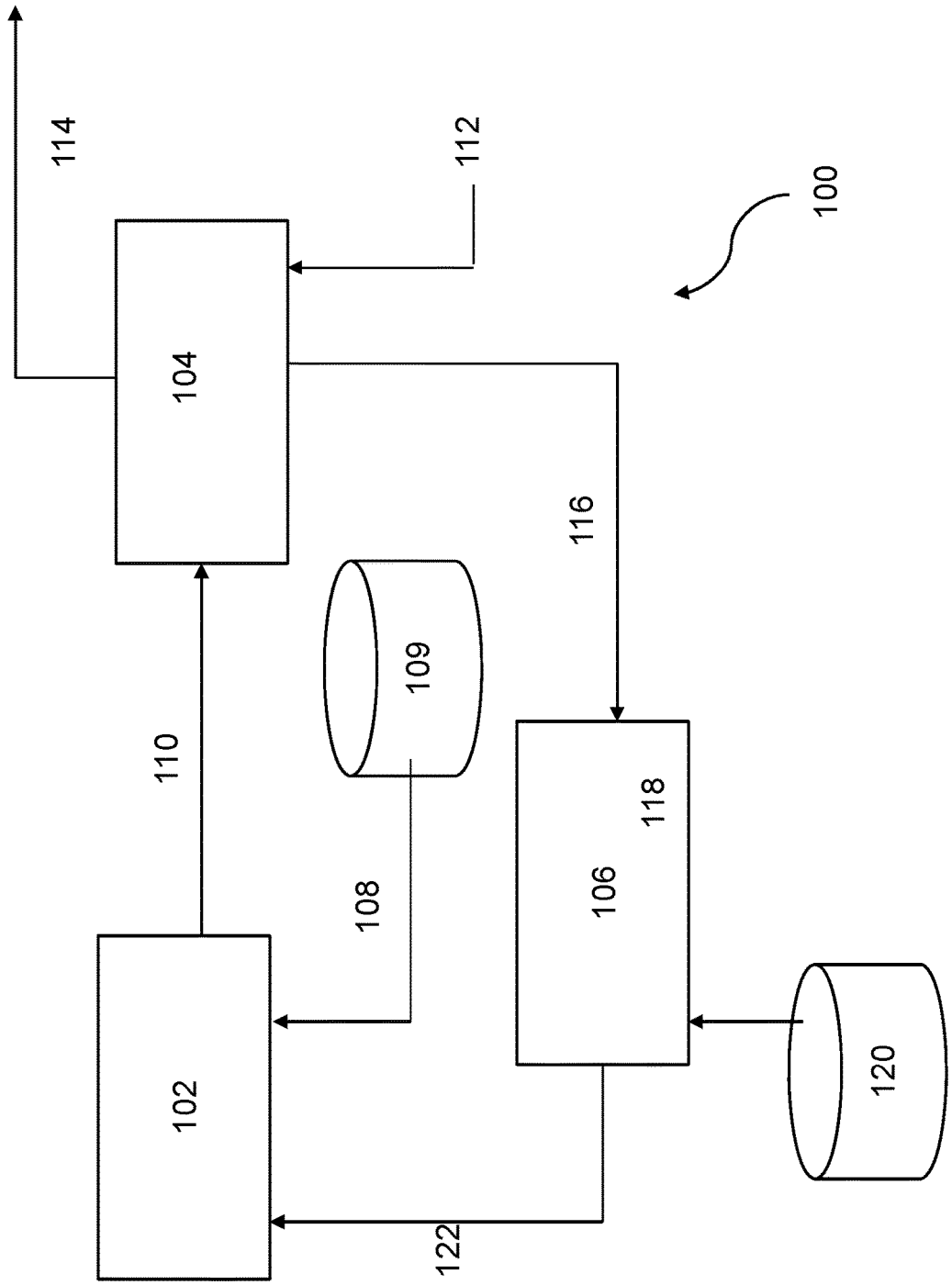
FIG. 1 provides a schematic representation of a system according to an embodiment of the invention.

Methods of sequestering carbon dioxide ($CO_2$) are provided. Aspects of the methods include contacting an aqueous capture liquid, such as an aqueous capture ammonia, with a direct air capture (DAC) generated gaseous source of $CO_2$ under conditions sufficient to produce an aqueous carbonate liquid, such as an aqueous ammonium carbonate. The aqueous carbonate liquid is then combined with a cation source under conditions sufficient to produce a solid $CO_2$ sequestering carbonate. Also provided are systems configured for carrying out the methods.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating un-recited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Methods

As summarized above, aspects of the invention include methods of sequestering $CO_2$ from a direct air capture (DAC) generated gaseous source of $CO_2$. Accordingly, aspects of the invention include $CO_2$ sequestration processes, i.e., processes (methods, protocols, etc.) that result in $CO_2$ sequestration. By "$CO_2$ sequestration" is meant the removal or segregation of an amount of $CO_2$ from an environment, such as the Earth's atmosphere or a gaseous waste stream produced by an industrial plant, so that some or all of the $CO_2$ is no longer present in the environment from which it has been removed. $CO_2$ sequestering methods of the invention sequester $CO_2$ by producing a solid storage stable $CO_2$ sequestering product from an amount of $CO_2$, such that the $CO_2$ is sequestered. The solid storage stable $CO_2$ sequestering product is a storage stable composition that incorporates an amount of $CO_2$ into a storage stable form, such as an above-ground storage or underwater storage stable form, so that the $CO_2$ is no longer present as, or available to be, a gas in the atmosphere. Sequestering of $CO_2$ according to methods of the invention allows for long-term storage of $CO_2$ in a manner such that $CO_2$ does not become part of the atmosphere.

As summarized above, aspects of the methods include: a) contacting an aqueous capture liquid, such as an aqueous capture ammonia, with a DAC generated gaseous source of $CO_2$ under conditions sufficient to produce an aqueous carbonate, such as an aqueous ammonium carbonate; and b) combining a cation source and the aqueous carbonate under conditions sufficient to produce a solid $CO_2$ sequestering carbonate. Each of these aspects of the methods is now further described in greater detail.

$CO_2$ Capture

Embodiments of the methods include contacting an aqueous capture liquid, such as an aqueous capture ammonia, with a DAC generated gaseous source of $CO_2$ (i.e., a $CO_2$ containing gas) under conditions sufficient to produce an aqueous carbonate, such as an aqueous ammonium carbonate.

The DAC generated gaseous source of $CO_2$ is a product gas produced by a direct air capture (DAC) system. DAC systems are a class of technologies capable of separating carbon dioxide $CO_2$ directly from ambient air. A DAC system is any system that captures $CO_2$ directly from air and generates a product gas that includes $CO_2$ at a higher concentration than that of the air that is input into the DAC system. While the concentration of $CO_2$ in the DAC generated gaseous source of $CO_2$ may vary, in some instances the concentration 1,000 ppm or greater, such as 10,000 ppm or greater, including 100,000 ppm or greater, where the product gas may not be pure $CO_2$, such that in some instances the product gas is 3% or more non-$CO_2$ constituents, such as 5% or more non-$CO_2$ constituents, including 10% or more non-$CO_2$ constituents. Non-$CO_2$ constituents that may be present in the product stream may be constituents that originate in the input air and/or from the DAC system. In some instances, the concentration of $CO_2$ in the DAC product gas ranges from 1,000 to 999,000 ppm, such as 1,000 to 10,000 ppm, or 10,000 to 100,000 ppm or 100,000 to 999,000 ppm. DAC generated gaseous streams have, in some embodiments, $CO_2$ present in amounts of 200 ppm to 1,000,000 ppm; or 200 ppm to 500,000 ppm; or 200 ppm to 100,000 ppm; or 200 ppm to 10,000; or 200 ppm to 5,000 ppm; or 200 ppm to 2000 ppm; or 200 ppm to 1000 ppm; or 200 to 500 ppm; or 500 ppm to 1,000,000 ppm; or 500 ppm to 500,000 ppm; or 500 ppm to 100,000 ppm; or 500 ppm to 10,000; or 500 ppm to 5,000 ppm; or 500 ppm to 2000 ppm; or 500 ppm to 1000 ppm; or 1000 ppm to 1,000,000 ppm; or 1000 ppm to 500,000 ppm; or 1000 ppm to 100,000 ppm; or 1000 ppm to 10,000; or 1000 ppm to 5,000 ppm; or 1000 ppm to 2000 ppm; or 2000 ppm to 1,000,000 ppm; or 2000 ppm to 500,000 ppm; or 2000 ppm to 100,000 ppm; or 2000 ppm to 10,000; or 2000 ppm to 5,000 ppm; or 2000 ppm to 3000 ppm; or 5000 ppm to 1,000,000 ppm; or 5000 ppm to 500,000 ppm; or 5000 ppm to 100,000 ppm; or 5000 ppm to 10,000; or 10,000 ppm to 1,000,000 ppm; or 10.00 ppm to 500,000 ppm; or 10,000 ppm to 100,000 ppm; or 50,000 ppm to 1,000,000 ppm; or 50,000 ppm to 500,000 ppm; or 50,000 ppm to 100,000 ppm; or 100,000 ppm to 1,000,000 ppm; or 100,000 ppm to 500,000 ppm; or 200,000 ppm to 1000 ppm, including 200,000 ppm to 2000 ppm, for example 180,000 ppm to 2000 ppm, or 180,000 ppm to 5000 ppm, also including 180,000 ppm to 10,000 ppm.

The DAC product gas that is contacted with the aqueous capture liquid may be produced by any convenient DAC system. DAC systems are systems that extract $CO_2$ from the air using media that binds to $CO_2$ but not to other atmospheric chemicals (such as nitrogen and oxygen). As air passes over the $CO_2$ binding medium, $CO_2$ "sticks" to the binding medium. In response to a stimulus, e.g., heat, humidity, etc., the bound $CO_2$ may then be released from the binding medium resulting the production of a gaseous $CO_2$ containing product. DAC systems of interest include, but are not limited to: hydroxide based systems; $CO_2$ sorbent/temperature swing based systems, and $CO_2$ sorbent/temperature swing based systems. In some instances, the DAC system is a hydroxide based system, in which $CO_2$ is separated from air by contacting the air with is an aqueous hydroxide liquid. Examples of hydroxide based DAC systems include, but are not limited to, those described in PCT published application Nos. WO/2009/155539; WO/2010/022339; WO/2013/036859; and WO/2013/120024; the disclosures of which are herein incorporated by reference. In some instances, the DAC system is a $CO_2$ sorbent based system, in which $CO_2$ is separated from air by contacting the air with sorbent, such as an amine sorbent, followed by release of the sorbent captured $CO_2$ by subjecting the sorbent to one or more stimuli, e.g., change in temperature, change in humidity, etc. Examples of such DAC systems include, but are not limited to, those described in PCT published application Nos. WO/2005/108297; WO/2006/009600; WO/2006/023743; WO/2006/036396; WO/2006/084008; WO/2007/016271; WO/2007/114991; WO/2008/042919; WO/2008/061210; WO/2008/131132; WO/2008/144708; WO/2009/061836; WO/2009/067625; WO/2009/105566; WO/2009/149292; WO/2010/019600; WO/2010/022399; WO/2010/107942; WO/2011/011740; WO/2011/137398; WO/2012/106703; WO/2013/028688; WO/2013/075981; WO/2013/166432; WO/2014/170184; WO/2015/103401; WO/2015/185434; WO/2016/005226; WO/2016/037668; WO/2016/162022; WO/2016/164563; WO/2016/161998; WO/2017/184652; and WO/2017/009241; the disclosures of which are herein incorporated by reference.

As summarized above, an aqueous capture liquid is contacted with the DAC generated gaseous source of $CO_2$ under conditions sufficient to produce an aqueous carbonate. The aqueous capture liquid may vary. Examples of aqueous capture liquids include, but are not limited to fresh water to bicarbonate buffered aqueous media. Bicarbonate buffered aqueous media employed in embodiments of the invention include liquid media in which a bicarbonate buffer is present. The bicarbonate buffered aqueous medium may be a naturally occurring or man-made medium, as desired. Naturally occurring bicarbonate buffered aqueous media include, but are not limited to, waters obtained from seas, oceans, lakes, swamps, estuaries, lagoons, brines, alkaline lakes, inland seas, etc. Man-made sources of bicarbonate buffered aqueous media may also vary, and may include brines produced by water desalination plants, and the like. Further details regarding such capture liquids are provided in PCT published application Nos. WO2014/039578; WO 2015/134408; and WO 2016/057709; the disclosures of which applications are herein incorporated by reference.

In some embodiments, an aqueous capture ammonia is contacted with the gaseous source of $CO_2$ under conditions sufficient to produce an aqueous ammonium carbonate. The concentration of ammonia in the aqueous capture ammonia may vary, where in some instances the aqueous capture ammonia includes ammonia ($NH_3$) at a concentration ranging from 0.1 to 20.0 M, and in some instances 0.1 to 5.0 M, such as 0.1 to 4.0 M, e.g., 4.0 M, while in other instances from 2 to 20, such as 4 to 20 M. The aqueous capture ammonia may include any convenient water. Waters of interest from which the aqueous capture ammonia may be produced include, but are not limited to, freshwaters, seawaters, brine waters, produced waters and waste waters. The pH of the aqueous capture ammonia may vary, ranging in some instances from 10.0 to 13.5, such as 10.0 to 13.0, including 10.5 to 12.5. Further details regarding aqueous capture ammonias of interest are provided in PCT published application No. WO 2017/165849; the disclosure of which is herein incorporated by reference.

The DAC generated $CO_2$ containing gas, e.g., as described above, may be contacted with the aqueous capture liquid, e.g., aqueous capture ammonia, using any convenient protocol. For example, contact protocols of interest include, but are not limited to: direct contacting protocols, e.g., bubbling the gas through a volume of the aqueous medium, concurrent contacting protocols, i.e., contact between unidirectionally flowing gaseous and liquid phase streams, countercurrent protocols, i.e., contact between oppositely flowing gaseous and liquid phase streams, and the like. Contact may be accomplished through use of infusers, bubblers, fluidic Venturi reactors, spargers, gas filters, sprays, trays, scrubbers, absorbers or packed column reactors, and the like, as may be convenient. In some instances the contacting protocol may use a conventional absorber or an absorber froth column, such as those described in U.S. Pat. Nos. 7,854,791; 6,872,240; and 6,616,733; and in United States Patent Application Publication US-2012-0237420-A1; the disclosures of which are herein incorporated by reference. The process may be a batch or continuous process.

In some instances, the DAC generated gaseous source of $CO_2$ is contacted with the liquid using a microporous membrane contactor. Microporous membrane contactors of interest include a microporous membrane present in a suitable housing, where the housing includes a gas inlet and a liquid inlet, as well a gas outlet and a liquid outlet. The contactor is configured so that the gas and liquid contact opposite sides of the membrane in a manner such that molecule may dissolve into the liquid from the gas via the pores of the microporous membrane. The membrane may be configured in any convenient format, where in some instances the membrane is configured in a hollow fiber format. Hollow fiber membrane reactor formats which may be employed include, but are not limited to, those described in U.S. Pat. Nos. 7,264,725; 6,872,240 and 5,695,545; the disclosures of which are herein incorporated by reference. In some instances, the microporous hollow fiber membrane contactor that is employed is a Liqui-Cel® hollow fiber membrane contactor (available from 3M Company), which membrane contactors include polypropylene membrane contactors and polyolefin membrane contactors.

Contact between the capture liquid and the DAC generated $CO_2$-containing gas occurs under conditions such that a substantial portion of the $CO_2$ present in the DAC generated $CO_2$-containing gas goes into solution, e.g., to produce bicarbonate ions. By substantial portion is meant 10% or more, such as 50% or more, including 80% or more.

The temperature of the capture liquid that is contacted with the DAC generated $CO_2$-containing gas may vary. In some instances, the temperature ranges from −1.4 to 100° C., such as 20 to 80° C. and including 40 to 70° C. In some instances, the temperature may range from −1.4 to 50° C. or higher, such as from −1.1 to 45° C. or higher. In some instances, cooler temperatures are employed, where such temperatures may range from −1.4 to 4° C., such as −1.1 to 0° C. In some instances, warmer temperatures are employed. For example, the temperature of the capture liquid in some instances may be 25° C. or higher, such as 30° C. or higher, and may in some embodiments range from 25 to 50° C., such as 30 to 40° C.

The DAC generated $CO_2$-containing gas and the capture liquid are contacted at a pressure suitable for production of a desired $CO_2$ charged liquid. In some instances, the pressure of the contact conditions is selected to provide for optimal $CO_2$ absorption, where such pressures may range from 1 ATM to 100 ATM, such as 1 to 50 ATM, e.g., 20-30 ATM or 1 ATM to 10 ATM. Where contact occurs at a location that is naturally at 1 ATM, the pressure may be increased to the desired pressure using any convenient protocol. In some instances, contact occurs where the optimal pressure is present, e.g., at a location under the surface of a body of water, such as an ocean or sea.

In those embodiments where the DAC generated gaseous source of $CO_2$ is contacted with an aqueous capture ammonia, contact is carried out in manner sufficient to produce an aqueous ammonium carbonate. The aqueous ammonium carbonate may vary, where in some instances the aqueous ammonium carbonate comprises at least one of ammonium carbonate and ammonium bicarbonate and in some instances comprises both ammonium carbonate and ammonium bicarbonate. The aqueous ammonium bicarbonate may be viewed as a DIC containing liquid. As such, in charging the aqueous capture ammonia with $CO_2$, a DAC generated $CO_2$ containing gas may be contacted with $CO_2$ capture liquid under conditions sufficient to produce dissolved inorganic carbon (DIC) in the $CO_2$ capture liquid, i.e., to produce a DIC containing liquid. The DIC is the sum of the concentrations of inorganic carbon species in a solution, represented by the equation: $DIC=[CO_2^*]+[HCO_3^-]+[CO_3^{2-}]$, where $[CO_2^*]$ is the sum of carbon dioxide ($[CO_2]$) and carbonic acid ($[H_2CO_3]$) concentrations, $[HCO_3]$ is the bicarbonate concentration (which includes ammonium bicarbonate) and $[CO_3^{2-}]$ is the carbonate concentration (which includes ammonium carbonate) in the solution. The DIC of the aqueous media may vary, and in some instances may be 5,000 ppm or greater, such as 10,000 ppm or greater, including 15,000 ppm or greater. In some instances, the DIC of the aqueous media may range from 5,000 to 20,000 ppm, such as 7,500 to 15,000 ppm, including 8,000 to 12,000 ppm. The amount of $CO_2$ dissolved in the liquid may vary, and in some instances ranges from 0.05 to 40 mM, such as 1 to 35 mM, including 25 to 30 mM. The pH of the resultant DIC containing liquid may vary, ranging in some instances from 4 to 12, such as 6 to 11 and including 7 to 10, e.g., 8 to 8.5.

Where desired, the DAC generated $CO_2$ containing gas is contacted with the capture liquid in the presence of a catalyst (i.e., an absorption catalyst, either hetero- or homogeneous in nature) that mediates the conversion of $CO_2$ to bicarbonate. Of interest as absorption catalysts are catalysts that, at pH levels ranging from 8 to 10, increase the rate of production of bicarbonate ions from dissolved $CO_2$. The magnitude of the rate increase (e.g., as compared to control in which the catalyst is not present) may vary, and in some instances is 2-fold or greater, such as 5-fold or greater, e.g., 10-fold or greater, as compared to a suitable control. Further details regarding examples of suitable catalysts for such embodiments are found in U.S. Pat. No. 9,707,513, the disclosure of which is herein incorporated by reference.

In some embodiments, the resultant aqueous ammonium carbonate is a two phase liquid which includes droplets of a liquid condensed phase (LCP) in a bulk liquid, e.g., bulk solution. By "liquid condensed phase" or "LCP" is meant a phase of a liquid solution which includes bicarbonate ions wherein the concentration of bicarbonate ions is higher in the LCP phase than in the surrounding, bulk liquid. LCP droplets are characterized by the presence of a meta-stable bicarbonate-rich liquid precursor phase in which bicarbonate ions associate into condensed concentrations exceeding that of the bulk solution and are present in a non-crystalline solution state. The LCP contains all of the components found in the bulk solution that is outside of the interface. However, the concentration of the bicarbonate ions is higher than in the bulk solution. In those situations where LCP droplets are present, the LCP and bulk solution may each contain ion-pairs and pre-nucleation clusters (PNCs). When present, the ions remain in their respective phases for long periods of time, as compared to ion-pairs and PNCs in solution. Further details regarding LCP containing liquids are provided in U.S. patent application Ser. No. 14/636,043, the disclosure of which is herein incorporated by reference.

Production of Solid $CO_2$ Sequestering Carbonate

Following production of an aqueous carbonate, such as an aqueous ammonium carbonate, e.g., as described above, the aqueous carbonate is combined with a cation source under conditions sufficient to produce a solid $CO_2$ sequestering carbonate. Cations of different valances can form solid carbonate compositions (e.g., in the form of carbonate minerals). In some instances, monovalent cations, such as sodium and potassium cations, may be employed. In other instances, divalent cations, such as alkaline earth metal cations, e.g., calcium and magnesium cations, may be employed. When cations are added to the aqueous carbonate, precipitation of carbonate solids, such as amorphous calcium carbonate when the divalent cations include $Ca^{2+}$, may be produced with a stoichiometric ratio of one carbonate-species ion per cation.

Any convenient cation source may be employed in such instances. Cation sources of interest include, but are not limited to, the brine from water processing facilities such as sea water desalination plants, brackish water desalination plants, groundwater recovery facilities, wastewater facilities, and the like, which produce a concentrated stream of solution high in cation contents. Also of interest as cation sources are naturally occurring sources, such as but not limited to native seawater and geological brines, which may have varying cation concentrations and may also provide a ready source of cations to trigger the production of carbonate solids from the aqueous ammonium carbonate. In some instances, the cation source may be a waste product of another step of the process, e.g., a calcium salt (such as $CaCl_2$) produced during regeneration of ammonia from the aqueous ammonium salt.

The product carbonate compositions may vary greatly. The precipitated product may include one or more different carbonate compounds, such as two or more different carbonate compounds, e.g., three or more different carbonate compounds, five or more different carbonate compounds, etc., including non-distinct, amorphous carbonate compounds. Carbonate compounds of precipitated products of the invention may be compounds having a molecular formulation $X_m(CO_3)_n$ where X is any element or combination of elements that can chemically bond with a carbonate group or its multiple, wherein X is in certain embodiments an alkaline earth metal and not an alkali metal; wherein m and n are stoichiometric positive integers. These carbonate compounds may have a molecular formula of $X_m(CO_3)_n \cdot H_2O$, where there are one or more structural waters in the molecular formula. The amount of carbonate in the product, as determined by coulometry using the protocol described as coulometric titration, may be 40% or higher, such as 70% or higher, including 80% or higher.

The carbonate compounds of the precipitated products may include a number of different cations, such as but not limited to ionic species of: calcium, magnesium, sodium, potassium, sulfur, boron, silicon, strontium, and combinations thereof. Of interest are carbonate compounds of divalent metal cations, such as calcium and magnesium carbonate compounds. Specific carbonate compounds of interest include, but are not limited to: calcium carbonate minerals, magnesium carbonate minerals and calcium magnesium carbonate minerals. Calcium carbonate minerals of interest include, but are not limited to: calcite ($CaCO_3$), aragonite ($CaCO_3$), vaterite ($CaCO_3$), ikaite ($CaCO_3 \cdot 6H_2O$), and amorphous calcium carbonate ($CaCO_3$). Magnesium carbonate minerals of interest include, but are not limited to magnesite ($MgCO_3$), barringtonite ($MgCO_3 \cdot 2H_2O$), nesquehonite ($MgCO_3 \cdot 3H_2O$), lanfordite ($MgCO_3 \cdot 5H_2O$), hydromagnisite, and amorphous magnesium calcium carbonate ($MgCO_3$). Calcium magnesium carbonate minerals of interest include, but are not limited to dolomite ($CaMg)(CO_3)_2$), huntite ($Mg_3Ca(CO_3)_4$) and sergeevite ($Ca_2Mg_{11}(CO_3)_{13} \cdot H_2O$). The carbonate compounds of the product may include one or more waters of hydration, or may be anhydrous. In some instances, the amount by weight of magnesium carbonate compounds in the precipitate exceeds the amount by weight of calcium carbonate compounds in the precipitate. For example, the amount by weight of magnesium carbonate compounds in the precipitate may exceed the amount by weight calcium carbonate compounds in the precipitate by 5% or more, such as 10% or more, 15% or more, 20% or more, 25% or more, 30% or more. In some instances, the weight ratio of magnesium carbonate compounds to calcium carbonate compounds in the precipitate ranges from 1.5-5 to 1, such as 2-4 to 1 including 2-3 to 1. In some instances, the precipitated product may include hydroxides, such as divalent metal ion hydroxides, e.g., calcium and/or magnesium hydroxides.

Further details regarding carbonate production and methods of using the carbonated produced thereby are provided in: U.S. application Ser. No. 14/204,994 published as US-2014-0322803-A1; 14/214,129 published as US 2014-0271440 A1; Ser. No. 14/861,996 published as US 2016-0082387 A1 and Ser. No. 14/877,766 published as US 2016-0121298 A1; as well as U.S. Pat. Nos. 9,707,513 and 9,714,406; the disclosures of which are herein incorporated by reference.

In some instances, carbonate production occurs in a continuous fashion, e.g., as described in Ser. No. 14/877,766 published as US 2016-0121298 A1, the disclosure of which is herein incorporated by reference. In some such instances, carbonate production may occur in the presence of a seed structure. By seed structure is meant a solid structure or material that is present flowing liquid, e.g., in the material production zone, prior to divalent cation introduction into the liquid. By "in association with" is meant that the material is produced on at least one of a surface of or in a depression, e.g., a pore, crevice, etc., of the seed structure. In such instances, a composite structure of the carbonate material and the seed structure is produced. In some instances, the product carbonate material coats a portion, if not all of, the surface of a seed structure. In some instances, the product carbonate materials fills in a depression of the seed structure, e.g., a pore, crevice, fissure, etc.

Seed structures may vary widely as desired. The term "seed structure" is used to describe any object upon and/or in which the product carbonate material forms. Seed structures may range from singular objects or particulate compositions, as desired. Where the seed structure is a singular object, it may have a variety of different shapes, which may be regular or irregular, and a variety of different dimensions. Shapes of interest include, but are not limited to, rods, meshes, blocks, etc. Also of interest are particulate compositions, e.g., granular compositions, made up of a plurality of particles. Where the seed structure is a particulate composition, the dimensions of particles may vary, ranging in some instances from 0.01 to 1,000,000 μm, such as 0.1 to 100,000 μm.

The seed structure may be made up of any convenient material or materials. Materials of interest include both carbonate materials, such as described above, as well as non-carbonate materials. The seed structures may be naturally occurring, e.g., naturally occurring sands, shell fragments from oyster shells or other carbonate skeletal allochems, gravels, etc., or man-made, such as pulverized rocks, ground blast furnace slag, fly ash, cement kiln dust, red mud, returned concrete, recycled concrete, demolished concrete and the like. For example, the seed structure may be a granular composition, such as sand, which is coated with the carbonate material during the process, e.g., a white carbonate material or colored carbonate material, e.g., as described above.

In some instances, seed structure may be coarse aggregates, such as friable Pleistocene coral rock, e.g., as may be obtained from tropical areas (e.g., Florida) that are too weak to serve as aggregate for concrete. In this case the friable coral rock can be used as a seed, and the solid $CO_2$ sequestering carbonate mineral may be deposited in the internal pores, making the coarse aggregate suitable for use in concrete, allowing it to pass the LA Rattler abrasion test. In some instances, where a light weight aggregate is desired, the outer surface will only be penetrated by the solution of deposition, leaving the inner core relatively 'hollow' making a light weight aggregate for use in light weight concrete.

Production of Materials from the $CO_2$ Sequestering Carbonate Product

The product carbonate material may be further used, manipulated and/or combined with other compositions to produce a variety of end-use materials. In certain embodiments, the product carbonate composition is refined (i.e., processed) in some manner. Refinement may include a variety of different protocols. In certain embodiments, the product is subjected to mechanical refinement, e.g., grinding, in order to obtain a product with desired physical properties, e.g., particle size, etc. In certain embodiments, the product is combined with a hydraulic cement, e.g., as a sand, a gravel, as an aggregate, etc., e.g., to produce final product, e.g., concrete or mortar.

Also of interest are formed building materials. The formed building materials of the invention may vary greatly. By "formed" is meant shaped, e.g., molded, cast, cut or otherwise produced, into a man-made structure defined physical shape, i.e., configuration. Formed building materials are distinct from amorphous building materials, e.g., particulate (such as powder) compositions that do not have a defined and stable shape, but instead conform to the container in which they are held, e.g., a bag or other container. Illustrative formed building materials include, but are not limited to: bricks; boards; conduits; beams; basins; columns; drywalls etc. Further examples and details regarding formed building materials include those described in United States Published Application No. US20110290156; the disclosure of which is herein incorporated by reference.

Also of interest are non-cementitious manufactured items that include the product of the invention as a component. Non-cementitious manufactured items of the invention may vary greatly. By non-cementitious is meant that the compositions are not hydraulic cements. As such, the compositions are not dried compositions that, when combined with a setting fluid, such as water, set to produce a stable product. Illustrative compositions include, but are not limited to: paper products; polymeric products; lubricants; asphalt products; paints; personal care products, such as cosmetics, toothpastes, deodorants, soaps and shampoos; human ingestible products, including both liquids and solids; agricultural products, such as soil amendment products and animal feeds; etc. Further examples and details non-cementitious manufactured items include those described in U.S. Pat. No. 7,829,053; the disclosure of which is herein incorporated by reference.

Aggregates

As summarized above, the methods and systems of the invention may be employed to produce carbonate coated aggregates, e.g., for use in concretes and other applications. The carbonate coated aggregates may be conventional or lightweight aggregates.

Aspects of the invention include $CO_2$ sequestering aggregate compositions. The $CO_2$ sequestering aggregate compositions include aggregate particles having a core and a $CO_2$ sequestering carbonate coating on at least a portion of a surface of the core. The $CO_2$ sequestering carbonate coating is made up of a $CO_2$ sequestering carbonate material, e.g., as described above. The $CO_2$ sequestering carbonate material that is present in coatings of the coated particles of the subject aggregate compositions may vary. In some instances, the isotopic profile of the core of the aggregate differs from the carbonate coating of the aggregate, such that the aggregate has a carbonate coating with a first isotopic profile and a core with a second isotopic profile that is different from the first.

In some instances, the carbonate material is a highly reflective microcrystalline/amorphous carbonate material. The microcrystalline/amorphous materials present in coatings of the invention may be highly reflective. As the materials may be highly reflective, the coatings that include the same may have a high total surface reflectance (TSR) value. TSR may be determined using any convenient protocol, such as ASTM E1918 Standard Test Method for Measuring Solar Reflectance of Horizontal and Low-Sloped Surfaces in the Field (see also R. Levinson, H. Akbari, P. Berdahl, Measuring solar reflectance—Part II: review of practical methods, LBNL 2010). In some instances, the backsheets exhibit a TSR value ranging from Rg; 0=0.0 to Rg; $0_1$=1.0, such as Rg; $0_1$=0.25 to Rg; $0_1$=0.99, including Rg; $0_1$=0.40 to Rg; $0_1$=0.98, e.g., as measured using the protocol referenced above.

In some instances, the coatings that include the carbonate materials are highly reflective of near infra-red (NIR) light, ranging in some instances from 10 to 99%, such as 50 to 99%. By NIR light is meant light having a wavelength ranging from 700 nanometers (nm) to 2.5 mm. NIR reflectance may be determined using any convenient protocol, such as ASTM C1371-04a(2010)e1 Standard Test Method for Determination of Emittance of Materials Near Room Temperature Using Portable Emissometers (http://www.astm.org/Standards/C1371.htm) or ASTM G173-03(2012) Standard Tables for Reference Solar Spectral Irradiances: Direct Normal and Hemispherical on 37° Tilted Surface (http://rredc.nrel.gov/solar/spectra/am1.5/ASTMG173/ASTMG173.html). In some instances, the coatings exhibit a NIR reflectance value ranging from Rg; 0=0.0 to Rg; 0=1.0, such as Rg; 0=0.25 to Rg; 0=0.99, including Rg; 0=0.40 to Rg; 0=0.98, e.g., as measured using the protocol referenced above.

In some instances, the carbonate coatings are highly reflective of ultra-violet (UV) light, ranging in some instances from 10 to 99%, such as 50 to 99%. By UV light is meant light having a wavelength ranging from 400 nm and 10 nm. UV reflectance may be determined using any convenient protocol, such as ASTM G173-03(2012) Standard Tables for Reference Solar Spectral Irradiances: Direct Normal and Hemispherical on 37° Tilted Surface. In some instances, the materials exhibit a UV value ranging from Rg; 0=0.0 to Rg; 0=1.0, such as Rg; 0=0.25 to Rg; 0=0.99, including Rg; 0=0.4 to Rg; 0=0.98, e.g., as measured using the protocol referenced above.

In some instances, the coatings are reflective of visible light, e.g., where reflectivity of visible light may vary, ranging in some instances from 10 to 99%, such as to 90%. By visible light is meant light having a wavelength ranging from 380 nm to 740 nm. Visible light reflectance properties may be determined using any convenient protocol, such as ASTM G173-03(2012) Standard Tables for Reference Solar Spectral Irradiances: Direct Normal and Hemispherical on 37° Tilted Surface. In some instances, the coatings exhibit a visible light reflectance value ranging from Rg; 0=0.0 to Rg; 0=1.0, such as Rg; 0=0.25 to Rg; 0=0.99, including Rg; 0=0.4 to Rg; 0=0.98, e.g., as measured using the protocol referenced above.

The materials making up the carbonate components are, in some instances, amorphous or microcrystalline. Where the materials are microcrystalline, the crystal size, e.g., as determined using the Scherrer equation applied to the FWHM of X-ray diffraction pattern, is small, and in some instances is 1000 microns or less in diameter, such as 100 microns or less in diameter, and including 10 microns or less in diameter. In some instances, the crystal size ranges in diameter from 1000 μm to 0.001 μm, such as 10 to 0.001 μm, including 1 to 0.001 μm. In some instances, the crystal size is chosen in view of the wavelength(s) of light that are to be reflected. For example, where light in the visible spectrum is to be reflected, the crystal size range of the materials may be selected to be less than one-half the "to be reflected" range, so as to give rise to photonic band gap. For example, where the to be reflected wavelength range of light is 100 to 1000 nm, the crystal size of the material may be selected to be 50 nm or less, such as ranging from 1 to 50 nm, e.g., 5 to 25 nm. In some embodiments, the materials produced by methods of the invention may include rod-shaped crystals and amorphous solids. The rod-shaped crystals may vary in structure, and in certain embodiments have length to diameter ratio ranging from 500 to 1, such as 10 to 1. In certain embodiments, the length of the crystals ranges from 0.5 μm to 500 μm, such as from 5 μm to 100 μm. In yet other embodiments, substantially completely amorphous solids are produced.

The density, porosity, and permeability of the coating materials may vary according to the application. With respect to density, while the density of the material may vary, in some instances the density ranges from 5 g/cm$^3$ to 0.01 g/cm$^3$, such as 3 g/cm$^3$ to 0.3 g/cm$^3$ and including 2.7 g/cm$^3$ to 0.4 g/cm$^3$. With respect to porosity, as determined by Gas Surface Adsorption as determined by the BET method (Brown Emmett Teller (e.g., as described at http://en.wikipedia.org/wiki/BET_theory, S. Brunauer, P. H. Emmett and E. Teller, *J. Am. Chem. Soc.*, 1938, 60, 309. doi:10.1021/ja01269a023) the porosity may range in some instances from 100 m$^2$/g to 0.1 m$^2$/g, such as 60 m$^2$/g to 1 m$^2$/g and including 40 m$^2$/g to 1.5 m$^2$/g. With respect to permeability, in some instances the permeability of the material may range from 0.1 to 100 darcies, such as 1 to 10 darcies, including 1 to 5 darcies (e.g., as determined using the protocol described in H. Darcy, Les Fontaines Publiques de la Ville de Dijon, Dalmont, Paris (1856)). Permeability may also be characterized by evaluating water absorption of the material. As determined by water absorption protocol, e.g., the water absorption of the material ranges, in some embodiments, from 0 to 25%, such as 1 to 15% and including from 2 to 9%.

The hardness of the materials may also vary. In some instances, the materials exhibit a Mohs hardness of 3 or greater, such as 5 or greater, including 6 or greater, where the hardness ranges in some instances from 3 to 8, such as 4 to 7 and including 5 to 6 Mohs (e.g., as determined using the protocol described in American Federation of Mineralogical Societies. "Mohs Scale of Mineral Hardness"). Hardness may also be represented in terms of tensile strength, e.g., as determined using the protocol described in ASTM C1167. In some such instances, the material may exhibit a compressive strength of 100 to 3000 N, such as 400 to 2000 N, including 500 to 1800 N.

In some embodiments, a the carbonate material includes one or more contaminants predicted not to leach into the environment by one or more tests selected from the group consisting of Toxicity Characteristic Leaching Procedure (TCLP), Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. Tests and combinations of tests may be chosen depending upon likely contaminants and storage conditions of the composition. For example, in some embodiments, the composition may include As, Cd, Cr, Hg, and Pb (or products thereof), each of which might be found in a waste gas stream of a coal-fired power plant. Since TCLP tests for As, Ba, Cd, Cr, Pb, Hg, Se, and Ag, TCLP may be an appropriate test for aggregates described herein. In some embodiments, a carbonate composition of the invention includes As, wherein the composition is predicted not to leach As into the environment. For example, a TCLP extract of the composition may provide less than 5.0 mg/L As indicating that the composition is not hazardous with respect to As. In some embodiments, a carbonate composition of the invention includes Cd, wherein the composition is predicted not to leach Cd into the environment. For example, a TCLP extract of the composition may provide less than 1.0 mg/L Cd indicating that the composition is not hazardous with respect to Cd. In some embodiments, a carbonate composition of the invention includes Cr, wherein the composition is predicted not to leach Cr into the environment. For example, a TCLP extract of the composition may provide less than 5.0 mg/L Cr indicating that the composition is not hazardous with respect to Cr. In some embodiments, a carbonate composition of the invention includes Hg, wherein the composition is predicted not to leach Hg into the environment. For example, a TCLP extract of the composition may provide less than 0.2 mg/L Hg indicating that the composition is not hazardous with respect to Hg. In some embodiments, a carbonate composition of the invention includes Pb, wherein the composition is predicted not to leach Pb into the environment. For example, a TCLP extract of the composition may provide less than 5.0 mg/L Pb indicating that the composition is not hazardous with respect to Pb. In some embodiments, a carbonate composition and aggregate that includes of the same of the invention may be non-hazardous with respect to a combination of different contaminants in a given test. For example, the carbonate composition may be non-hazardous with respect to all metal contaminants in a given test. A TCLP extract of a composition, for instance, may be less than 5.0 mg/L in As, 100.0 mg/L in Ba, 1.0 mg/L in Cd, 5.0 mg/mL in Cr, 5.0 mg/L in Pb, 0.2 mg/L in Hg, 1.0 mg/L in Se, and 5.0 mg/L in Ag. Indeed, a majority if not all of the metals tested in a TCLP analysis on a composition of the invention may be below detection limits. In some embodiments, a carbonate composition of the invention may be non-hazardous with respect to all (e.g., inorganic, organic, etc.) contaminants in a given test. In some embodiments, a carbonate composition of the invention may be non-hazardous with respect to all contaminants in any combination of tests selected from the group consisting of Toxicity Characteristic Leaching Procedure, Extraction Procedure Toxicity Test, Synthetic Precipitation Leaching Procedure, California Waste Extraction Test, Soluble Threshold Limit Concentration, American Society for Testing and Materials Extraction Test, and Multiple Extraction Procedure. As such, carbonate compositions and aggregates including the same of the invention may effectively sequester $CO_2$ (e.g., as carbonates, bicarbonates, or a combinations thereof) along with various chemical species (or co-products thereof) from waste gas streams, industrial waste sources of divalent cations, industrial waste sources of proton-removing agents, or combinations thereof that might be considered contaminants if released into the environment. Compositions of the invention incorporate environmental contaminants (e.g., metals and co-products of metals such as Hg, Ag, As, Ba, Be, Cd, Co, Cr, Cu, Mn, Mo, Ni, Pb, Sb, Se, Tl, V, Zn, or combinations thereof) in a non-leachable form.

The aggregate compositions of the invention include particles having a core region and a $CO_2$ sequestering carbonate coating on at least a portion of a surface of the core. The coating may cover 10% or more, 20% or more, 30% or more, 40% or more, 50% or more, 60% or more, 70% or more, 80% or more, 90% or more, including 95% or more of the surface of the core. The thickness of the carbonate layer may vary, as desired. In some instances, the thickness may range from 0.1 μm to 10 mm, such as 1 μm to 1000 μm, including 10 μm to 500 μm.

The core of the coated particles of the aggregate compositions described herein may vary widely. The core may be made up of any convenient aggregate material. Examples of suitable aggregate materials include, but are not limited to: natural mineral aggregate materials, e.g., carbonate rocks, sand (e.g., natural silica sand), sandstone, gravel, granite, diorite, gabbro, basalt, etc.; and synthetic aggregate materials, such as industrial byproduct aggregate materials, e.g., blast-furnace slag, fly ash, municipal waste, and recycled concrete, etc. In some instances, the core comprises a material that is different from the carbonate coating.

In some instances, the aggregates are lightweight aggregates. In such instances, the core of the coated particles of the aggregate compositions described herein may vary widely, so long as when it is coated it provides for the desired lightweight aggregate composition. The core may be made up of any convenient material. Examples of suitable aggregate materials include, but are not limited to: conventional lightweight aggregate materials, e.g., naturally occurring lightweight aggregate materials, such as crushed volcanic rocks, e.g., pumice, scoria or tuff, and synthetic materials, such as thermally treated clays, shale, slate, diatomite, perlite, vermiculite, blast-furnace slag and fly ash; as well as unconventional porous materials, e.g., crushed corals, synthetic materials like polymers and low density polymeric materials, recycled wastes such as wood, fibrous materials, cement kiln dust residual materials, demolished/recycled/returned concrete materials, recycled glass, various volcanic minerals, granite, silica bearing minerals, mine tailings and the like.

The physical properties of the coated particles of the aggregate compositions may vary. Aggregates of the invention have a density that may vary so long as the aggregate provides the desired properties for the use for which it will be employed, e.g., for the building material in which it is employed. In certain instances, the density of the aggregate particles ranges from 1.1 to 5 gm/cc, such as 1.3 gm/cc to 3.15 gm/cc, and including 1.8 gm/cc to 2.7 gm/cc. Other particle densities in embodiments of the invention, e.g., for lightweight aggregates, may range from 1.1 to 2.2 gm/cc, e.g., 1.2 to 2.0 g/cc or 1.4 to 1.8 g/cc. In some embodiments the invention provides aggregates that range in bulk density (unit weight) from 50 lb/lb/ft$^3$ to 200 lb/ft$^3$, or 75 lb/ft$^3$ to 175 lb/ft$^3$, or 50 lb/ft$^3$ to 100 lb/ft$^3$, or 75 lb/ft$^3$ to 125 lb/ft$^3$, or lb/ft$^3$ to 115 lb/ft$^3$, or 100 lb/ft$^3$ to 200 lb/ft$^3$, or 125 lb/ft$^3$ to lb/ft$^3$, or 140 lb/ft$^3$ to 160 lb/ft$^3$, or 50 lb/ft$^3$ to 200 lb/ft$^3$. Some embodiments of the invention provide lightweight aggregate, e.g., aggregate that has a bulk density (unit weight) of 75 lb/ft$^3$ to 125 lb/ft$^3$, such as 90 lb/ft$^3$ to 115 lb/ft$^3$. In some instances, the lightweight aggregates have a weight ranging from 50 to 1200 kg/m$^3$, such as 80 to 11 kg/m$^3$.

The hardness of the aggregate particles making up the aggregate compositions of the invention may also vary, and in certain instances the hardness, expressed on the Mohs scale, ranges from 1.0 to 9, such as 1 to 7, including 1 to 6 or 1 to 5. In some embodiments, the Mohr's hardness of aggregates of the invention ranges from 2-5, or 2-4. In some embodiments, the Mohs hardness ranges from 2-6. Other hardness scales may also be used to characterize the aggregate, such as the Rockwell, Vickers, or Brinell scales, and equivalent values to those of the Mohs scale may be used to characterize the aggregates of the invention; e.g., a Vickers hardness rating of 250 corresponds to a Mohs rating of 3; conversions between the scales are known in the art.

The abrasion resistance of an aggregate may also be important, e.g., for use in a roadway surface, where aggregates of high abrasion resistance are useful to keep surfaces from polishing. Abrasion resistance is related to hardness but is not the same. Aggregates of the invention include aggregates that have an abrasion resistance similar to that of natural limestone, or aggregates that have an abrasion resistance superior to natural limestone, as well as aggregates having an abrasion resistance lower than natural limestone, as measured by art accepted methods, such as ASTM C131-03. In some embodiments aggregates of the invention have an abrasion resistance of less than 50%, or less than 40%, or less than 35%, or less than 30%, or less than 25%, or less than 20%, or less than 15%, or less than 10%, when measured by ASTM C131-03.

Aggregates of the invention may also have a porosity within a particular ranges. As will be appreciated by those of skill in the art, in some cases a highly porous aggregate is desired, in others an aggregate of moderate porosity is desired, while in other cases aggregates of low porosity, or no porosity, are desired. Porosities of aggregates of some embodiments of the invention, as measured by water uptake after oven drying followed by full immersion for 60 minutes, expressed as % dry weight, can be in the range of 1-40%, such as 2-20%, or 2-15%, including 2-10% or even 3-9%.

The dimensions of the aggregate particles may vary. Aggregate compositions of the invention are particulate compositions that may in some embodiments be classified as fine or coarse. Fine aggregates according to embodiments of the invention are particulate compositions that almost entirely pass through a Number 4 sieve (ASTM C 125 and ASTM C 33). Fine aggregate compositions according to embodiments of the invention have an average particle size ranging from 10 µm to 4.75 mm, such as 50 µm to 3.0 mm and including 75 µm to 2.0 mm. Coarse aggregates of the invention are compositions that are predominantly retained on a Number 4 sieve (ASTM C 125 and ASTM C 33). Coarse aggregate compositions according to embodiments of the invention are compositions that have an average particle size ranging from 4.75 mm to 200 mm, such as 4.75 to 150 mm in and including 5 to 100 mm. As used herein, "aggregate" may also in some embodiments encompass larger sizes, such as 3 in to 12 in or even 3 in to 24 in, or larger, such as 12 in to 48 in, or larger than 48 in.

In some instances, aggregates as described herein find use as aggregates of internal curing concretes, where the aggregates allow for the release of water over time to fully and evenly hydrate the cementitious components of the concrete. Internal curing aggregate products of such embodiments may be used to improve performance of concrete by increasing autogenous curing and reducing chemical shrinkage, leading to reduced cracking of the concrete body through the slow and uniform release of water throughout the placed concrete. Aspects of these embodiments include the use of internal curing aggregate products as described above to increase the performance of concrete, its various forms and types. As described above, the internal curing aggregate products are composed of, either partially or wholly, sequestered anthropogenic carbon from point source $CO_2$ emitters, such as DAC systems and power plants, refineries and cement plants. The carbon, coming from carbon dioxide gas, is sequestered by methods of carbon capture and mineralization such as those in: U.S. application Ser. No. 14/204,994 published as US-2014-0322803-A1; 14/214,129 published as US 2014-0271440 A1; Ser. No. 14/861,996 published as US 2016-0082387 A1 and Ser. No. 14/877,766 published as US 2016-0121298 A1; as well as U.S. Pat. Nos. 9,707,513 and 9,714,406; the disclosures of which are herein incorporated by reference. The captured $CO_2$ results in synthetic limestone in the form of calcium or other divalent cationic carbonate solids composing part or all of the internal curing aggregate products for concrete. Aspects of the invention include use of a rock composed wholly or partially of aggregate for use in concrete, mortar, pavements or other building materials that contain $CO_2$ stemming from DAC systems or the combustion of fossil fuels or other forms of fuels and other $CO_2$ criteria pollutant sources. In some embodiments, aggregates, either fine or coarse, manufactured from methods of carbon capture and mineralization as described above are employed as internal curing aggregates for concrete and meat ASTM Standard Specification for Lightweight Aggregate for Internal Curing of Concrete C1761, which provides guidelines to estimate the amount of lightweight aggregate required for internal curing per unit volume of concrete. Further details regarding the use of aggregates in internal curing concrete applications are provided in U.S. Provisional Application Ser. No. 62/624,022 filed Jan. 30, 2018, the disclosure of which is herein incorporated by reference.

Concrete Dry Composites

Also provided are concrete dry composites that, upon combination with a suitable setting liquid (such as described below), produce a settable composition that sets and hardens into a concrete or a mortar. Concrete dry composites as described herein include an amount of an aggregate, e.g., as described above, and a cement, such as a hydraulic cement. The term "hydraulic cement" is employed in its conventional sense to refer to a composition which sets and hardens after combining with water or a solution where the solvent is water, e.g., an admixture solution. Setting and hardening of the product produced by combination of the concrete dry composites of the invention with an aqueous liquid results from the production of hydrates that are formed from the cement upon reaction with water, where the hydrates are essentially insoluble in water.

Aggregates of the invention find use in place of conventional natural rock aggregates used in conventional concrete when combined with pure Portland cement. Other hydraulic cements of interest in certain embodiments are Portland cement blends. The phrase "Portland cement blend" includes a hydraulic cement composition that includes a Portland cement component and significant amount of a non-Portland cement component. As the cements of the invention are Portland cement blends, the cements include a Portland cement component. The Portland cement component may be any convenient Portland cement. As is known in the art, Portland cements are powder compositions produced by grinding Portland cement clinker (more than 90%), a limited amount of calcium sulfate which controls the set time, and up to 5% minor constituents (as allowed by various standards). When the exhaust gases used to provide carbon dioxide for the reaction contain SOx, then sufficient sulphate may be present as calcium sulfate in the precipitated material, either as a cement or aggregate to off set the need for additional calcium sulfate. As defined by the European Standard EN197.1, "Portland cement clinker is a hydraulic material which shall consist of at least two-thirds by mass of calcium silicates ($3CaO \cdot SiO_2$ and $2CaO \cdot SiO_2$), the remainder consisting of aluminium- and iron-containing clinker phases and other compounds. The ratio of CaO to $SiO_2$ shall not be less than 2.0. The magnesium content (MgO) shall not exceed 5.0% by mass." The concern about MgO is that later in the setting reaction, magnesium hydroxide, brucite, may form, leading to the deformation and weakening and cracking of the cement. In the case of magnesium carbonate containing cements, brucite will not form as it may with MgO. In certain embodiments, the Portland cement constituent of the present invention is any Portland cement that satisfies the ASTM Standards and Specifications of C150 (Types I-VIII) of the American Society for Testing of Materials (ASTM C50-Standard Specification for Portland Cement). ASTM C150 covers eight types of Portland cement, each possessing different properties, and used specifically for those properties.

Also of interest as hydraulic cements are carbonate containing hydraulic cements. Such carbonate containing hydraulic cements, methods for their manufacture and use are described in U.S. Pat. No. 7,735,274; the disclosure of which applications are herein incorporated by reference.

In certain embodiments, the hydraulic cement may be a blend of two or more different kinds of hydraulic cements, such as Portland cement and a carbonate containing hydraulic cement. In certain embodiments, the amount of a first cement, e.g., Portland cement in the blend ranges from 10 to 90% (w/w), such as 30 to 70% (w/w) and including 40 to 60% (w/w), e.g., a blend of 80% OPC and 20% carbonate hydraulic cement.

In some instances, the concrete dry composite compositions, as well as concretes produced therefrom, have a CarbonStar Rating (CSR) that is less than the CSR of the control composition that does not include an aggregate of the invention. The Carbon Star Rating (CSR) is a value that characterizes the embodied carbon (in the form of $CaCO_3$ or other $X_mCO_3$) for any product, in comparison to how carbon intensive production of the product itself is (i.e., in terms of the production $CO_2$). The CSR is a metric based on the embodied mass of $CO_2$ in a unit of concrete. Of the three components in concrete—water, cement and aggregate—cement is by far the most significant contributor to $CO_2$ emissions, roughly 1:1 by mass (1 ton cement produces roughly 1 ton $CO_2$). So, if a cubic yard of concrete uses 600 lb cement, then its CSR is 600. A cubic yard of concrete according to embodiments of the present invention which include 600 lb cement and in which at least a portion of the aggregate is carbonate coated aggregate, e.g., as described above, will have a CSR that is less than 600, e.g., where the CSR may be 550 or less, such as 500 or less, including 400 or less, e.g., 250 or less, such as 100 or less, where in some instances the CSR may be a negative value, e.g., −100 or less, such as −500 or less including −1000 or less, where in some instances the CSR of a cubic yard of concrete having 600 lbs cement may range from 500 to −5000, such as −100 to −4000, including −500 to −3000. To determine the CSR of a given cubic yard of concrete that includes carbonate coated aggregate of the invention, an initial value of $CO_2$ generated for the production of the cement component of the concrete cubic yard is determined. For example, where the yard includes 600 lbs of cement, the initial value of 600 is assigned to the yard. Next, the amount of carbonate coating in the yard is determined. Since the molecular weight of carbonate is 100 a.u., and 44% of carbonate is $CO_2$, the amount of carbonate coating is present in the yard is then multiplied by 0.44 and the resultant value subtracted from the initial value in order to obtain the CSR for the yard. For example, where a given yard of concrete mix is made up of 600 lbs of cement, 300 lbs of water, 1429 lbs of fine aggregate and 17391 lbs of coarse aggregate, the weight of a yard of concrete is 4068 lbs and the CSR is 600. If 10% of the total mass of aggregate in this mix is replaced by carbonate coating, e.g., as described above, the amount of carbonate present in the revised yard of concrete is 317 lbs. Multiplying this value by 0.44 yields 139.5. Subtracting this number from 600 provides a CSR of 460.5.

Settable Compositions

Settable compositions of the invention, such as concretes and mortars, are produced by combining a hydraulic cement with an amount of aggregate (fine for mortar, e.g., sand; coarse with or without fine for concrete) and an aqueous liquid, e.g., water, either at the same time or by pre-combining the cement with aggregate, and then combining the resultant dry components with water. The choice of coarse aggregate material for concrete mixes using cement compositions of the invention may have a minimum size of about ⅜ inch and can vary in size from that minimum up to one inch or larger, including in gradations between these limits. Finely divided aggregate is smaller than ⅜ inch in size and again may be graduated in much finer sizes down to 200-sieve size or so. Fine aggregates may be present in both mortars and concretes of the invention. The weight ratio of cement to aggregate in the dry components of the cement may vary, and in certain embodiments ranges from 1:10 to 4:10, such as 2:10 to 5:10 and including from 55:1000 to 70:100.

The liquid phase, e.g., aqueous fluid, with which the dry component is combined to produce the settable composition, e.g., concrete, may vary, from pure water to water that includes one or more solutes, additives, co-solvents, etc., as desired. The ratio of dry component to liquid phase that is combined in preparing the settable composition may vary, and in certain embodiments ranges from 2:10 to 7:10, such as 3:10 to 6:10 and including 4:10 to 6:10.

In certain embodiments, the cements may be employed with one or more admixtures. Admixtures are compositions added to concrete to provide it with desirable characteristics that are not obtainable with basic concrete mixtures or to modify properties of the concrete to make it more readily useable or more suitable for a particular purpose or for cost reduction. As is known in the art, an admixture is any material or composition, other than the hydraulic cement, aggregate and water, that is used as a component of the concrete or mortar to enhance some characteristic, or lower the cost, thereof. The amount of admixture that is employed may vary depending on the nature of the admixture. In certain embodiments the amounts of these components range from 1 to 50% w/w, such as 2 to 10% w/w.

Admixtures of interest include finely divided mineral admixtures such as cementitious materials; pozzolans; pozzolanic and cementitious materials; and nominally inert materials. Pozzolans include diatomaceous earth, opaline cherts, clays, shales, fly ash, silica fume, volcanic tuffs and pumicites are some of the known pozzolans. Certain ground granulated blast-furnace slags and high calcium fly ashes possess both pozzolanic and cementitious properties. Nominally inert materials can also include finely divided raw quartz, dolomites, limestone, marble, granite, and others. Fly ash is defined in ASTM C618.

Other types of admixture of interest include plasticizers, accelerators, retarders, air-entrainers, foaming agents, water reducers, corrosion inhibitors, and pigments.

As such, admixtures of interest include, but are not limited to: set accelerators, set retarders, air-entraining agents, defoamers, alkali-reactivity reducers, bonding admixtures, dispersants, coloring admixtures, corrosion inhibitors, dampproofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, and any other concrete or mortar admixture or additive. Admixtures are well-known in the art and any suitable admixture of the above type or any other desired type may be used; see, e.g., U.S. Pat. No. 7,735,274, incorporated herein by reference in its entirety.

In some instances, the settable composition is produced using an amount of a bicarbonate rich product (BRP) admixture, which may be liquid or solid form, e.g., as described in U.S. Pat. No. 9,714,406; the disclosure of which is herein incorporated by reference.

In certain embodiments, settable compositions of the invention include a cement employed with fibers, e.g., where one desires fiber-reinforced concrete. Fibers can be made of zirconia containing materials, steel, carbon, fiberglass, or synthetic materials, e.g., polypropylene, nylon, polyethylene, polyester, rayon, high-strength aramid, (i.e. Kevlar®), or mixtures thereof.

The components of the settable composition can be combined using any convenient protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

Following the combination of the components to produce a settable composition (e.g., concrete), the settable compositions are in some instances initially flowable compositions, and then set after a given period of time. The setting time may vary, and in certain embodiments ranges from 30 minutes to 48 hours, such as 30 minutes to 24 hours and including from 1 hour to 4 hours.

The strength of the set product may also vary. In certain embodiments, the strength of the set cement may range from 5 Mpa to 70 MPa, such as 10 MPa to 50 MPa and including from 20 MPa to 40 MPa. In certain embodiments, set products produced from cements of the invention are extremely durable. e.g., as determined using the test method described at ASTM C1157.

Structures

Aspects of the invention further include structures produced from the aggregates and settable compositions of the invention. As such, further embodiments include manmade structures that contain the aggregates of the invention and methods of their manufacture. Thus in some embodiments the invention provides a manmade structure that includes one or more aggregates as described herein. The manmade structure may be any structure in which an aggregate may be used, such as a building, dam, levee, roadway or any other manmade structure that incorporates an aggregate or rock. In some embodiments, the invention provides a manmade structure, e.g., a building, a dam, or a roadway, that includes an aggregate of the invention, where in some instances the aggregate may contain $CO_2$ from a fossil fuel source, e.g., as described above. In some embodiments the invention provides a method of manufacturing a structure, comprising providing an aggregate of the invention.

Albedo Enhancing Applications

In some instances, the solid carbonate product may be employed in albedo enhancing applications. Albedo, i.e., reflection coefficient, refers to the diffuse reflectivity or reflecting power of a surface. It is defined as the ratio of reflected radiation from the surface to incident radiation upon it. Albedo is a dimensionless fraction, and may be expressed as a ratio or a percentage. Albedo is measured on a scale from zero for no reflecting power of a perfectly black surface, to 1 for perfect reflection of a white surface. While albedo depends on the frequency of the radiation, as used herein Albedo is given without reference to a particular wavelength and thus refers to an average across the spectrum of visible light, i.e., from about 380 to about 740 nm.

As the methods of these embodiments are methods of enhancing albedo of a surface, the methods in some instances result in a magnitude of increase in albedo (as compared to a suitable control, e.g., the albedo of the same surface not subjected to methods of invention) that is 0.05 or greater, such as 0.1 or greater, e.g., 0.2 or greater, 0.3 or greater, 0.4 or greater, 0.5 or greater, 0.6 or greater, 0.7 or greater, 0.8 or greater, 0.9 or greater, including 0.95 or greater, including up to 1.0. As such, aspects of the subject methods include increasing albedo of a surface to 0.1 or greater, such as 0.2 or greater, e.g., 0.3 or greater, 0.4 or greater, 0.5 or greater, 0.6 or greater, 0.7 or greater, 0.8 or greater, 0.9 or greater, 0.95 or greater, including 0.975 or greater and up to approximately 1.0.

Aspects of the methods include associating with a surface of interest an amount of a highly reflective microcrystalline or amorphous material composition, e.g., as described above, effective to enhance the albedo of the surface by a desired amount, such as the amounts listed above. The material composition may be associated with the target surface using any convenient protocol. As such, the material composition may be associated with the target surface by incorporating the material into the material of the object having the surface to be modified. For example, where the target surface is the surface of a building material, such as a roof tile or concrete mixture, the material composition may be included in the composition of the material so as to be present on the target surface of the object. Alternatively, the material composition may be positioned on at least a portion of the target surface, e.g., by coating the target surface with the composition. Where the surface is coated with the material composition, the thickness of the resultant coating on the surface may vary, and in some instances may range from 0.1 mm to 25 mm, such as 2 mm to 20 mm and including 5 mm to 10 mm. Applications in use as highly reflective pigments in paints and other coatings like photovoltaic solar panels are also of interest.

The albedo of a variety of surfaces may be enhanced. Surfaces of interest include at least partially facing skyward surfaces of both man-made and naturally occurring objects. Man-made surfaces of interest include, but are not limited to: roads, sidewalks, buildings and components thereof, e.g., roofs and components thereof (roof shingles, roofing granules, etc.) and sides, runways, and other man-made structures, e.g., walls, dams, monuments, decorative objects, etc. Naturally occurring surfaces of interest include, but are not limited to: plant surfaces, e.g., as found in both forested and non-forested areas, non-vegetated locations, water, e.g., lake, ocean and sea surfaces, etc.

For example, the albedo of colored granules may be readily increased using methods as described herein to produce a carbonate layer on the surface of the colored roofing granules. While the thickness of the layer of carbonate material present on the surface of the colored roofing granules may vary, in some instances the thickness ranges from 0.1 to 200 µm, such as 1 to 150 µm, including 5 to 100 µm. A variety of different types of colored granules may be coated as described above, e.g., to enhance their reflectivity without substantially diminishing their color, if at all. Examples of types of granules that may be coated with a carbonate layer as described herein include roofing granules.

Roofing granules that may be coated with a carbonate layer, e.g., to improve their reflectivity without substantially reducing their color, if at all, may include a core formed by crushed and screened mineral materials, which are subsequently coated with one or more color coating layers comprising a binder in which is dispersed one or more coloring pigments, such as suitable metal oxides. Inorganic binders may be employed. The binder can be a soluble alkaline silicate that is subsequently insolubilized by heat or by chemical reaction, such as by reaction between an acidic material and the alkaline silicate, resulting in an insoluble colored coating on the mineral particles. The base particles employed in the process of preparing the roofing granules of the present invention can take several forms. The base particles may be inert core particles. The core particles may be chemically inert materials, such as inert mineral particles, solid or hollow glass or ceramic spheres, or foamed glass or ceramic particles. Suitable mineral particles can be produced by a series of quarrying, crushing, and screening operations, are generally intermediate between sand and gravel in size (that is, between about #8 US mesh and #70 US mesh). The core particles have an average particle size of from about 0.2 mm to about 3 mm, e.g., from about 0.4 mm to about 2.4 mm. In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as manufactured materials such as ceramic grog and proppants, and recycled manufactured materials such as crushed bricks, concrete, porcelain, fire clay, and the like. Solid and hollow glass spheres are available, for example, from Potters Industries Inc., P.O. Box 840, Valley Forge, Pa. 19482-0840, such as SPHERIGLASS® solid "A" glass spheres product grade 1922 having a mean size of 0.203 mm, product code 602578 having a mean size of 0.59 mm, BALLOTTINI impact beads product grade A with a size range of 600 to 850 micrometers (U.S. Seive size 20-30), and QCEL hollow spheres, product code 300 with a mean particle size of 0.090 mm. Glass spheres can be coated or treated with a suitable coupling agent if desired for better adhesion to the binder of the inner coating composition. In the granules, the particles can be coated with a coating composition that includes binder and a pigment. The coating binder can be an inorganic material, such as a metal-silicate binder, for example an alkali metal silicate, such as sodium silicate.

The coatings pigments that may be used include, but are not limited to PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black.

Methods as described herein may also be employed to produce frac sands. Frac-sands are used in the oil and gas recovery industry to maintain porous void space in fractured geologic structure, so as to maintain geologic fracture integrity. Methods described herein may be employed to produce coated substrates and manufactured sands with tailorable surface coatings that can contribute to the buoyancy of the sand when in fluid flow. Methods as described herein may be employed to produce substrate with a closely regular patterning or irregular patterning of carbonate materials (crystalline or amorphous) as to effectively design the surface of the sands to maintain an above average buoyancy in the flow of fracking fluid, while the fluids are being pumped under very high pressure into the geologic fracture site. In some instances, the methods produce a product with a crystalline or amorphous however unreacted cementitious coating compound, such that upon contact with a second medium, the material could react as an expansive cement, providing void space for gas and fluid flow from surrounding geologic structure. This expansive property could be activated by intimate fluid or gas contact, sustained fluid contact, or other magnetic or sound wave activation provided from the geologic surface.

Methods of using the carbonate precipitate compounds described herein in varying applications as described above, including albedo enhancing applications, as well as compositions produced thereby, are further described in U.S. application Ser. Nos. 14/112,495 and 14/214,129; the disclosures of which applications are herein incorporated by reference.

Ammonia Regeneration

In those embodiments that employ an aqueous capture ammonia, combination of a cation source with the aqueous ammonium carbonate produces a solid $CO_2$ sequestering carbonate and an aqueous ammonium salt. The produced aqueous ammonium salt may vary with respect to the nature of the anion of the ammonium salt, where specific ammonium salts that may be present in the aqueous ammonium salt include, but are not limited to, ammonium chloride, ammonium acetate, ammonium sulfate, ammonium nitrate, etc.

In addition to carbonate production, e.g., as described above, aspects of the invention may further include regenerating an aqueous capture ammonia, e.g., as described above, from the aqueous ammonium salt. By regenerating an aqueous capture ammonium is meant processing the aqueous ammonium salt in a manner sufficient to generate amount of ammonium from the aqueous ammonium salt. The percentage of input ammonium salt that is converted to ammonia during this regeneration step may vary, ranging in some instances from 20 to 80%, such as 35 to 55%.

Ammonia may be regenerated from an aqueous ammonium salt in this regeneration step using any convenient regeneration protocol. In some instances, a distillation protocol is employed. While any convenient distillation protocol may be employed, in some embodiments the employed distillation protocol includes heating the aqueous ammonium salt in the presence of an alkalinity source to produce a gaseous ammonia/water product, which may then be condensed to produce a liquid aqueous capture ammonia.

The alkalinity source may vary, so long as it is sufficient to convert ammonium in the aqueous ammonium salt to ammonia. Any convenient alkalinity source may be employed.

Alkalinity sources that may be employed in this regeneration step include chemical agents. Chemical agents that may be employed as alkalinity sources include, but are not limited to, hydroxides, organic bases, super bases, oxides, and carbonates. Hydroxides include chemical species that provide hydroxide anions in solution, including, for example, sodium hydroxide (NaOH), potassium hydroxide (KOH), calcium hydroxide ($Ca(OH)_2$), or magnesium hydroxide ($Mg(OH)_2$). Organic bases are carbon-containing molecules that are generally nitrogenous bases including primary amines such as methyl amine, secondary amines such as diisopropylamine, tertiary such as diisopropylethylamine, aromatic amines such as aniline, heteroaromatics such as pyridine, imidazole, and benzimidazole, and various forms thereof. Super bases suitable for use as proton-removing agents include sodium ethoxide, sodium amide ($NaNH_2$), sodium hydride (NaH), butyl lithium, lithium diisopropylamide, lithium diethylamide, and lithium bis(trimethylsilyl)amide. Oxides including, for example, calcium oxide (CaO), magnesium oxide (MgO), strontium oxide (SrO), beryllium oxide (BeO), and barium oxide (BaO) are also suitable proton-removing agents that may be used.

Also of interest as alkalinity sources are silica sources. The source of silica may be pure silica or a composition that includes silica in combination with other compounds, e.g., minerals, so long as the source of silica is sufficient to impart desired alkalinity. In some instances, the source of silica is a naturally occurring source of silica. Naturally occurring sources of silica include silica containing rocks, which may be in the form of sands or larger rocks. Where the source is larger rocks, in some instances the rocks have been broken down to reduce their size and increase their surface area. Of interest are silica sources made up of components having a longest dimension ranging from 0.01 mm to 1 meter, such as 0.1 mm to 500 cm, including 1 mm to 100 cm, e.g., 1 mm to 50 cm. The silica sources may be surface treated, where desired, to increase the surface area of the sources. A variety of different naturally occurring silica sources may be employed. Naturally occurring silica sources of interest include, but are not limited to, igneous rocks, which rocks include: ultramafic rocks, such as Komatiite, Picrite basalt, Kimberlite, Lamproite, Peridotite; mafic rocks, such as Basalt, Diabase (Dolerite) and Gabbro; intermediate rocks, such as Andesite and Diorite; intermediate felsic rocks, such as Dacite and Granodiorite; and Felsic rocks, such as Rhyolite, Aplite-Pegmatite and Granite. Also of interest are man-made sources of silica. Man-made sources of silica include, but are not limited to, waste streams such as: mining wastes; fossil fuel burning ash; slag, e.g. iron slag, phosphorous slag; cement kiln waste; oil refinery/petrochemical refinery waste, e.g. oil field and methane seam brines; coal seam wastes, e.g. gas production brines and coal seam brine; paper processing waste; water softening, e.g. ion exchange waste brine; silicon processing wastes; agricultural waste; metal finishing waste; high pH textile waste; and caustic sludge. Mining wastes include any wastes from the extraction of metal or another precious or useful mineral from the earth. Wastes of interest include wastes from mining to be used to raise pH, including: red mud from the Bayer aluminum extraction process; the waste from magnesium extraction for sea water, e.g. at Moss Landing, Calif.; and the wastes from other mining processes involving leaching. Ash from processes burning fossil fuels, such as coal fired power plants, create ash that is often rich in silica. In some embodiments, ashes resulting from burning fossil fuels, e.g. coal fired power plants, are provided as silica sources, including fly ash, e.g., ash that exits out the smoke stack, and bottom ash. Additional details regarding silica sources and their use are described in U.S. Pat. No. 9,714,406; the disclosure of which is herein incorporated by reference.

In embodiments of the invention, ash is employed as an alkalinity source. Of interest in certain embodiments is use of a coal ash as the ash. The coal ash as employed in this invention refers to the residue produced in power plant boilers or coal burning furnaces, for example, chain grate boilers, cyclone boilers and fluidized bed boilers, from burning pulverized anthracite, lignite, bituminous or subbituminous coal. Such coal ash includes fly ash which is the finely divided coal ash carried from the furnace by exhaust or flue gases; and bottom ash which collects at the base of the furnace as agglomerates.

Fly ashes are generally highly heterogeneous, and include of a mixture of glassy particles with various identifiable crystalline phases such as quartz, mullite, and various iron oxides. Fly ashes of interest include Type F and Type C fly ash. The Type F and Type C fly ashes referred to above are defined by CSA Standard A23.5 and ASTM C618. The chief difference between these classes is the amount of calcium, silica, alumina, and iron content in the ash. The chemical properties of the fly ash are largely influenced by the chemical content of the coal burned (i.e., anthracite, bituminous, and lignite). Fly ashes of interest include substantial amounts of silica (silicon dioxide, $SiO_2$) (both amorphous and crystalline) and lime (calcium oxide, CaO, magnesium oxide, MgO).

The burning of harder, older anthracite and bituminous coal typically produces Class F fly ash. Class F fly ash is pozzolanic in nature, and contains less than 10% lime (CaO). Fly ash produced from the burning of younger lignite or subbituminous coal, in addition to having pozzolanic properties, also has some self-cementing properties. In the presence of water, Class C fly ash will harden and gain strength over time. Class C fly ash generally contains more than 20% lime (CaO). Alkali and sulfate ($SO_4$) contents are generally higher in Class C fly ashes.

Fly ash material solidifies while suspended in exhaust gases and is collected using various approaches, e.g., by electrostatic precipitators or filter bags. Since the particles solidify while suspended in the exhaust gases, fly ash particles are generally spherical in shape and range in size from 0.5 µm to 100 µm. Flyashes of interest include those in which at least about 80%, by weight comprises particles of less than 45 microns. Also of interest in certain embodiments of the invention is the use of highly alkaline fluidized bed combustor (FBC) fly ash.

Also of interest in embodiments of the invention is the use of bottom ash. Bottom ash is formed as agglomerates in coal combustion boilers from the combustion of coal. Such combustion boilers may be wet bottom boilers or dry bottom boilers. When produced in a wet or dry bottom boiler, the bottom ash is quenched in water. The quenching results in agglomerates having a size in which 90% fall within the particle size range of 0.1 mm to 20 mm, where the bottom ash agglomerates have a wide distribution of agglomerate size within this range. The main chemical components of a bottom ash are silica and alumina with lesser amounts of oxides of Fe, Ca, Mg, Mn, Na and K, as well as sulphur and carbon.

Also of interest in certain embodiments is the use of volcanic ash as the ash. Volcanic ash is made up of small tephra, i.e., bits of pulverized rock and glass created by volcanic eruptions, less than 2 millimetres in diameter.

In one embodiment of the invention, cement kiln dust (CKD) is employed as an alkalinity source. The nature of the fuel from which the ash and/or CKD were produced, and the means of combustion of said fuel, will influence the chemical composition of the resultant ash and/or CKD. Thus ash and/or CKD may be used as a portion of the means for adjusting pH, or the sole means, and a variety of other components may be utilized with specific ashes and/or CKDs, based on chemical composition of the ash and/or CKD.

In certain embodiments of the invention, slag is employed as an alkalinity source. The slag may be used as a as the sole pH modifier or in conjunction with one or more additional pH modifiers, e.g., ashes, etc. Slag is generated from the processing of metals, and may contain calcium and magnesium oxides as well as iron, silicon and aluminum compounds. In certain embodiments, the use of slag as a pH modifying material provides additional benefits via the introduction of reactive silicon and alumina to the precipitated product. Slags of interest include, but are not limited to, blast furnace slag from iron smelting, slag from electric-arc or blast furnace processing of steel, copper slag, nickel slag and phosphorus slag.

As indicated above, ash (or slag in certain embodiments) is employed in certain embodiments as the sole way to modify the pH of the water to the desired level. In yet other embodiments, one or more additional pH modifying protocols is employed in conjunction with the use of ash.

Also of interest in certain embodiments is the use of other waste materials, e.g., demolished or recycled or returned concretes or mortars, as an alkalinity source. When employed, the concrete dissolves releasing sand and aggregate which, where desired, may be recycled to the carbonate production portion of the process. Use of demolished and/or recycled concretes or mortars is further described below.

Of interest in certain embodiments are mineral alkalinity sources. The mineral alkalinity source that is contacted with the aqueous ammonium salt in such instances may vary, where mineral alkalinity sources of interest include, but are not limited to: silicates, carbonates, fly ashes, slags, limes, cement kiln dusts, etc., e.g., as described above. In some instances, the mineral alkalinity source comprises a rock, e.g., as described above.

While the temperature to which the aqueous ammonium salt is heated in these embodiments may vary, in some instances the temperature ranges from 25 to 200, such as 25 to 185° C. The heat employed to provide the desired temperature may be obtained from any convenient source, including steam, a waste heat source, such as flue gas waste heat, etc.

Distillation may be carried out at any pressure. Where distillation is carried out at atmospheric pressure, the temperature at which distillation is carried out may vary, ranging in some instances from 50 to 120, such as 60 to 100, e.g., from 70 to 90° C. In some instances, distillation is carried out at a sub-atmospheric pressure. While the pressure in such embodiments may vary, in some instances the sub-atmospheric pressure ranges from 1 to 14 psig, such as from 2 to 6 psig. Where distillation is carried out at sub-atmospheric pressure, the distillation may be carried out at a reduced temperature as compared to embodiments that are performed at atmospheric pressure. While the temperature may vary in such instances as desired, in some embodiments where a sub-atmospheric pressure is employed, the temperature ranges from 15 to 60, such as 25 to 50° C. Of interest in sub-atmospheric pressure embodiments is the use of a waste heat for some, if not all, of the heat employed during distillation. Waste heat sources of that may be employed in such instances include, but are not limited to: flue gas, heat of absorption generated by $CO_2$ capture and resultant ammonium carbonate production; and a cooling liquid (such as from a co-located source of $CO_2$ containing gas, such as a power plant, factory etc., e.g., as described above), and combinations thereof Aqueous capture ammonia regeneration may also be achieved using an electrolysis mediated protocol, in which a direct electric current is introduced into the aqueous ammonium salt to regenerate ammonia. Any convenient electrolysis protocol may be employed. Examples of electrolysis protocols that may be adapted for regeneration of ammonia from an aqueous ammonium salt may employed one or more elements from the electrolysis systems described in United States Application Publication Nos. 20060185985 and 20080248350, as well as published PCT Application Publication No. WO 2008/018928; the disclosures of which are hereby incorporated by reference.

The resultant regenerated aqueous capture ammonia may vary, e.g., depending on the particular regeneration protocol that is employed. In some instances, the regenerated aqueous capture ammonia includes ammonia ($NH_3$) at a concentration ranging from 0.1M to 25 M, such as from 4 to 20 M, including from 12.0 to 16.0 M, as well as any of the ranges provided for the aquous capture ammonia provided above. The pH of the aqueous capture ammonia may vary, ranging in some instances from 10.0 to 13.0, such as 10.0 to 12.5.

In some instances, the methods further include contacting the regenerated aqueous capture ammonia with a gaseous source of $CO_2$, e.g., as described above, under conditions sufficient to produce an aqueous ammonium carbonate. In other words, the methods may include recycling the regenerated ammonia into the process. In such instances, the regenerated aqueous capture ammonia may be used as the sole capture liquid, or combined with another liquid, e.g., make up water, to produce an aqueous capture ammonia suitable for use as a $CO_2$ capture liquid. Where the regenerated aqueous ammonia is combined with additional water, any convenient water may be employed. Waters of interest from which the aqueous capture ammonia may be produced include, but are not limited to, freshwaters, seawaters, brine waters, produced waters and waste waters.

Recycling

In some instances, the methods may include recirculating one or more of the reaction components from one stage of the process to another stage of the process. For example, as described above regenerated aqueous ammonia may be recycled to the $CO_2$ capture stage. Cation salts and/or aggregates produced during ammonia regeneration may be recycled to the carbonate production stage. Waste heat produced at one stage, e.g., $CO_2$ capture, may be employed at another stage, e.g., ammonia regeneration, e.g., as described above. The above are non-limiting examples of embodiments where recycling occurs.

Production of Pure $CO_2$ Gas

One or more stages of the methods may result in the production of pure $CO_2$ gas. For example, during the production of solid carbonate from the aqueous ammonium carbonate, up to one mol of $CO_2$ may be produced for every 2 mols of ammonium bicarbonate. Alternatively or in addition, the ammonia regeneration step may result in the production of waste $CO_2$. For example, during the ammonia regeneration step, waste $CO_2$ may come from fugitive $CO_2$ lost during heating or may come from alkalinity sources that contained embodied carbonate mineral. While such instances may result in the production of $CO_2$, the overall process sequesters a net amount of $CO_2$ in a carbonate compound. Any produced $CO_2$ may be substantially pure $CO_2$ product gas, which may be sequestered by injection into a subsurface geological location, as described in greater detail below. Therefore, the process is an effective $CO_2$ sequestration process. The phrase "substantially pure" means that the product gas is pure $CO_2$ or is a $CO_2$ containing gas that has a limited amount of other, non-$CO_2$ components.

Following production of the $CO_2$ product gas in such embodiments, aspects of the invention may include injecting the product $CO_2$ gas into a subsurface geological location to sequester $CO_2$. By injecting is meant introducing or placing the $CO_2$ product gas into a subsurface geological location. Subsurface geological locations may vary, and include both subterranean locations and deep ocean locations. Subterranean locations of interest include a variety of different underground geological formations, such as fossil fuel reservoirs, e.g., oil fields, gas fields and un-mineable coal seams; saline reservoirs, such as saline formations and saline-filled basalt formations; deep aquifers; porous geological formations such as partially or fully depleted oil or gas formations, salt caverns, sulfur caverns and sulfur domes; etc.

In some instances, the $CO_2$ product gas may be pressurized prior to injection into the subsurface geological location. To accomplish such pressurization the gaseous $CO_2$ can be compressed in one or more stages with, where desired, after cooling and condensation of additional water. The modestly pressurized $CO_2$ can then be further dried, where desired, by conventional methods such as through the use of molecular sieves and passed to a $CO_2$ condenser where the $CO_2$ is cooled and liquefied. The $CO_2$ can then be efficiently pumped with minimum power to a pressure necessary to deliver the $CO_2$ to a depth within the geological formation or the ocean depth at which $CO_2$ injection is desired. Alternatively, the $CO_2$ can be compressed through a series of stages and discharged as a super critical fluid at a pressure matching that necessary for injection into the geological formation or deep ocean. Where desired, the $CO_2$ may be transported, e.g., via pipeline, rail, truck or other suitable protocol, from the production site to the subsurface geological formation.

In some instances, the $CO_2$ product gas is employed in an enhanced oil recovery (EOR) protocol. Enhanced Oil Recovery (abbreviated EOR) is a generic term for techniques for increasing the amount of crude oil that can be extracted from an oil field. Enhanced oil recovery is also called improved oil recovery or tertiary recovery. In EOR protocols, the $CO_2$ product gas is injected into a subterranean oil deposit or reservoir.

$CO_2$ gas production and sequestration thereof is further described in U.S. application Ser. No. 14/861,996 published as US 2016-0082387 A1, the disclosure of which is herein incorporated by reference.

Alkali Enrichment

In some instances, the methods further include subjecting the aqueous ammonium carbonate to an alkali enrichment protocol, e.g., a membrane mediated protocol, such as one that includes contacting first and second liquids to opposite sides of a membrane. In such instances, the membrane may be a cationic membrane or an anionic membrane. Further details regarding alkali enrichment protocols, such as membrane mediated alkali enrichment protocols, are described in U.S. Pat. No. 9,707,513; the disclosure of which is herein incorporated by reference. In some such instances, the methods include contacting the aqueous capture ammonia with the gaseous source of $CO_2$ in a combined capture and alkali enrichment reactor, where the reactor may include: a core hollow fiber membrane component, e.g., one that includes a plurality of hollow fiber membranes; an alkali enrichment membrane component surrounding the core hollow fiber membrane component and defining a first liquid flow path in which the core hollow fiber membrane component is present; and a housing configured to contain the alkali enrichment membrane component and core hollow fiber membrane component, wherein the housing is configured to define a second liquid flow path between the alkali enrichment membrane component and the inner surface of the housing. In such instances, the alkali enrichment membrane component may be configured as a tube and the hollow fiber membrane component is axially positioned in the tube. In such instances, the housing may be configured as a tube, wherein the housing and the alkali enrichment membrane component are concentric.

Recycling Demolished and Remediated Concrete

In some aspects of the invention, the methods further include providing calcium and/or alkalinity into one or more steps of the process from demolished or returned concrete geomass for carbon sequestration and utilization through calcium carbonate mineralization and use of the residual concrete as a favorable aggregate in new concrete after the partial dissolution of recycled concrete geomass material. Geomass or geomass material, as used herein, refers to concrete that has been demolished after its service life or other reasons. Though generally, geomass is most commonly a waste product from industry, geomass may also refer to primary, secondary, tertiary, byproduct or other product from industry. Some example general trade names of geomass materials from industry may include mine tailings, mining dust, sand, baghouse fines, soil dust, dust, cement kiln dust, slag, steel slag, boiler slag, coal combustion residue, ash, fly ash, slurry, lime slurry, lime, kiln dust, kiln fines, residue, bauxite residue, demolished concrete, recycled concrete, recycled mortar, recycled cement, demolished building materials, recycled building materials, recycled aggregate, etc. Geomass materials typically have compositions that contain metal oxides, as crystalline or amorphous phases, such as sodium oxide, potassium oxide, or other alkali metal oxide, magnesium oxide, calcium oxide, or other alkaline earth metal oxide, manganese oxide, copper oxide, or other transition metal oxide, zinc oxide or any other metal oxide or derivative thereof, or metal oxides present in crystalline form in simple or complex minerals or as amorphous phases of metal oxides or derivatives thereof or as a combination of any of the above.

Embodiments described herein include methods of reducing transportation distance of aggregate by recycling demolished concrete and using the residual material remaining after geomass dissolution as and aggregate in new concrete. The use of remediated concrete geomass as aggregate in new concrete reduces both the price and carbon footprint associated with the concrete. For example, if a concrete geomass contains 60% by weight calcium oxide (CaO) cement, and the cement is 10% of the concrete geomass, then 100% dissolution efficiency of CaO would result in 6% of the mass of the concrete geomass being dissolved for carbon capture and utilization, leaving the remaining 94% for utilization as recycled aggregate in new concrete, using the methods of invention. As such, aspects of the subject methods include dissolution efficiency of metal oxides present in the geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% dissolution efficiency. Additional aspects of embodiments the subject methods include liberating as individual particles present in the concrete geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% of the original sand and gravel aggregates in the demolished concrete in a form similar to their original virgin characteristic, useful in concrete, unlike mechanically crushed and classified recycled concrete.

Aspects of the methods include utilizing the remediated concrete aggregate as a substrate for applying a carbonate mineral coating derived from capture carbon dioxide for permanent sequestration in the mineral phase, e.g., as described above, creating a composite aggregate useful as an aggregate for concrete. This method of obtaining a substrate for the mineral coating similarly has the advantage of avoiding mining and transportation of fresh virgin aggregate.

Aspects of the methods include formulating concrete, mortar, and asphalt using the remediated residual concrete aggregate materials, either alone or coated with a $CO_2$ sequestered carbonate mineral. The amount of remediated coated or uncoated aggregate particles in the concrete, mortar, or asphalt may be present in the amounts of to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% of the original sand and gravel aggregates in the concrete, mortar, or asphalt in a form similar to their original virgin characteristic, useful in concrete, unlike mechanically crushed and classified recycled concrete.

The dissolution of a variety of concrete and mortar materials may be useful and the residual remediated aggregate may be used in a large array of building material application, including all the uses of mined aggregates. Concrete and mortar materials, and any materials comprising Portland cement are of interest including at least those materials coming from roadways, buildings, dams, bridges, sidewalks, piping, culverts, water conductance systems, well casings, and the like.

Figure 3:
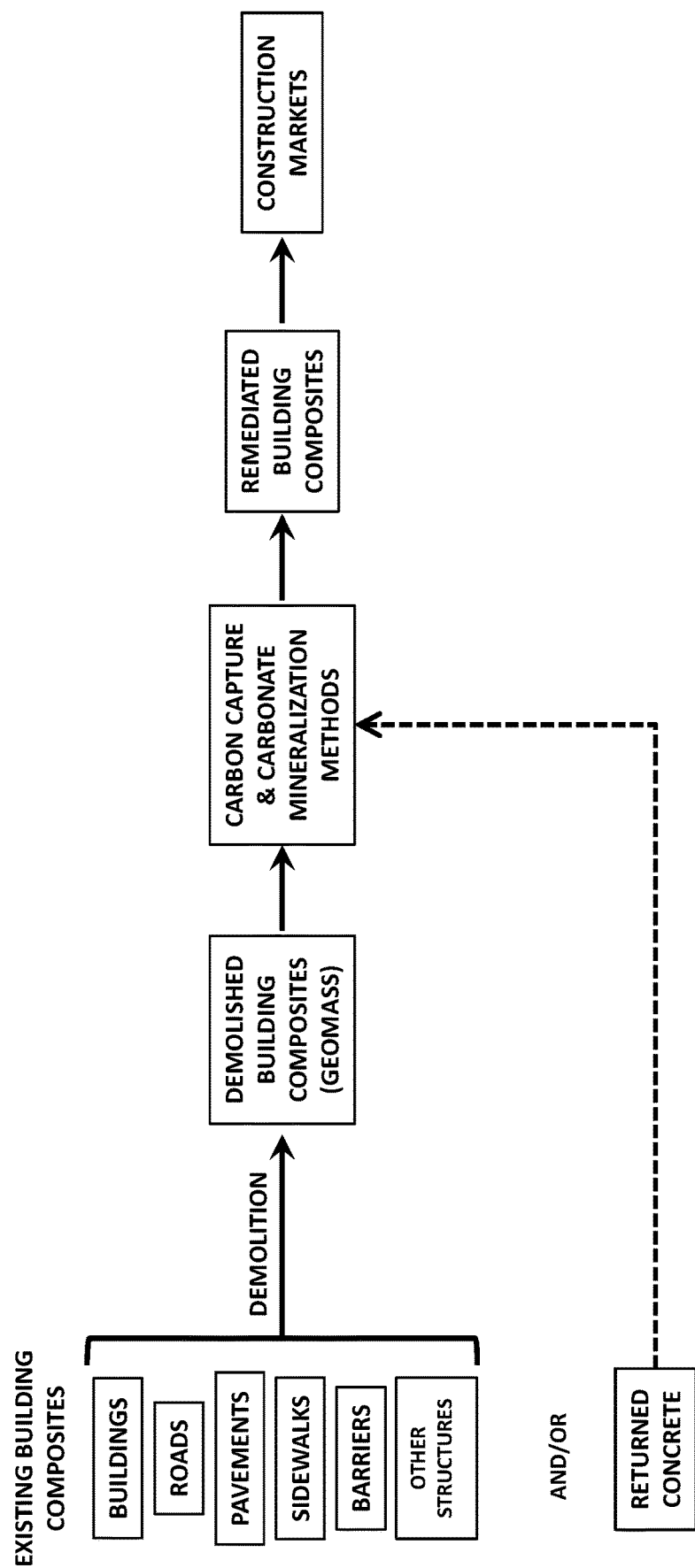
FIG. 3 provides an example flow chart applicable to recycling demolished and remediated concrete.

FIG. 3 provides an example flow chart applicable to recycling demolished and/or returned and remediated concrete. As illustrated in FIG. 3, demolished concrete may be obtained from a variety of different sources, including but not limited to buildings, roads, pavements, sidewalks, barriers, and other structures. The source of returned concrete may come from a variety of sources, including but not limited to the ready-mix concrete trucks returning to their plant from a job site with unused or returned concrete. The source may be demolished using any convenient protocol to produce demolished geomass. The demolished geomass may then be employed in one or more stages of a $CO_2$ sequestering solid carbonate production process, e.g., as described above, to produce one or more types of products, including remediated building compositions, which may be employed in a variety of markets, including construction markets.

Figure 4:
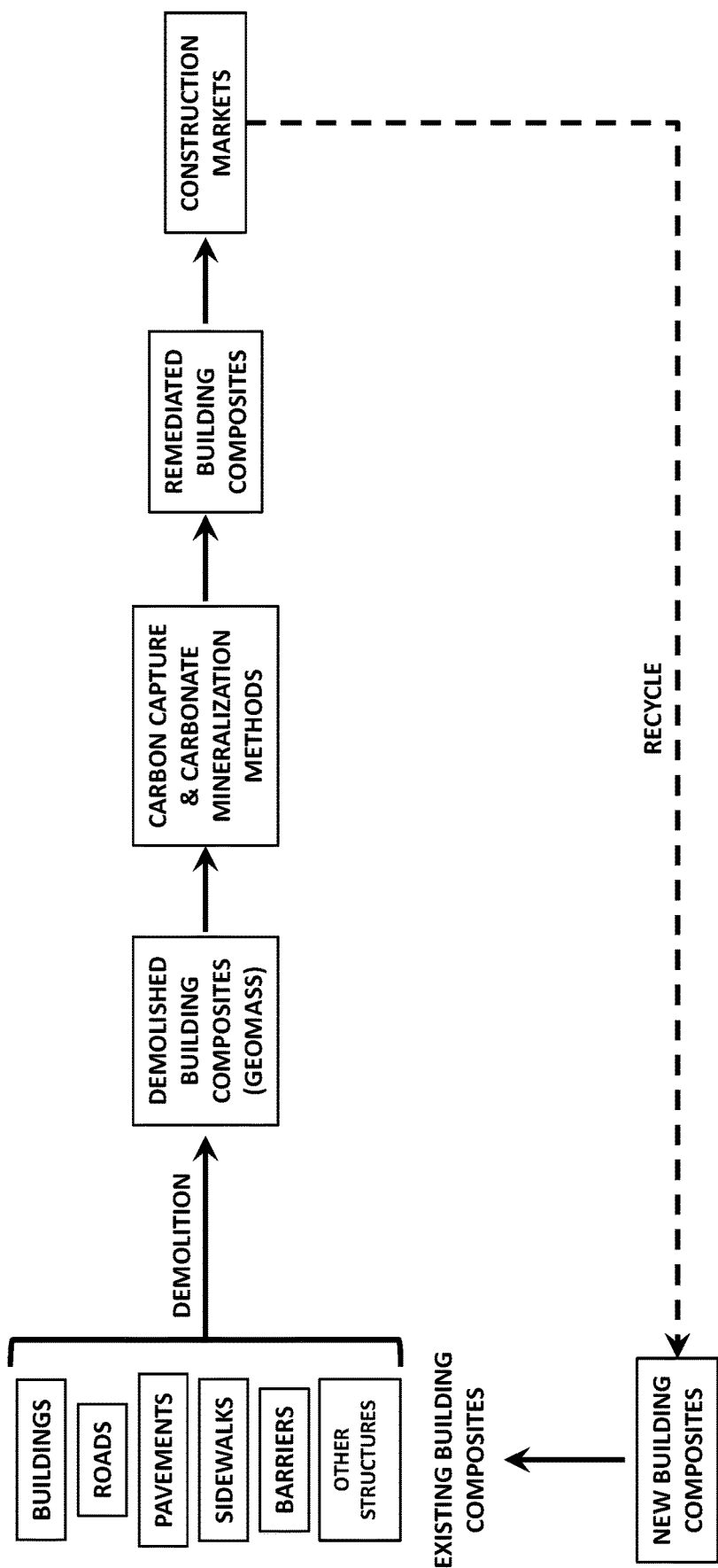
FIG. 4 provides an example flow chart applicable to recycling demolished and remediated concrete.

FIG. 4 provides an example flow chart applicable to recycling demolished and remediated concrete. As illustrated in FIG. 4, demolished concrete may be obtained from a variety of different sources, including but not limited to buildings, roads, pavements, sidewalks, barriers, and other structures. The source may be demolished using any convenient protocol to produce demolished geomass. The demolished geomass may then be employed in one or more stages of a $CO_2$ sequestering solid carbonate production process, e.g., as described above, to produce one or more types of products, including remediated building compositions, which may be employed in a variety of markets, including construction markets. In the embodiment in FIG. 4, the remediated building composites are recycled to new building composites, which may be incorporated into existing building composites as desired.

The above described embodiment of recycling demolished and/or returned and remediated concrete is not limited to embodiments where DAC generated gaseous sources of $CO_2$ are employed. Instead, the above described embodiment of recycling demolished and remediated concrete may be employed with processes employing any convenient gaseous source of $CO_2$, such as waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants, where methods employing such sources are further described in: U.S. application Ser. No. 14/204,994 published as US-2014-0322803-A1; 14/214,129 published as US 2014-0271440 A1; Ser. No. 14/861,996 published as US 2016-0082387 A1 and Ser. No. 14/877,766 published as US 2016-0121298 A1; as well as U.S. Pat. Nos. 9,707,513 and 9,714,406; the disclosures of which are herein incorporated by reference.

Enhanced Geomass Dissolution Methods

Where the methods include dissolving geomass, e.g., as described above, aspects of the methods may include enhancing the dissolution of geomass, where a geomass and a liquid phase are combined in a system under conditions sufficient to produce a desired dissolution efficiency. Aspects of these embodiments further include systems configured to produce dissolved geomass compositions, and methods and devices that include the same. Also provided are methods that use dissolved geomass compositions.

As reviewed above, geomass or geomass material, as used herein, refers to industry products from industries such as mining industry, power industry, and heavy industry. Though most commonly a waste product from industry, geomass may also refer to primary, secondary, tertiary, byproduct or other product from industry. Some example trade names of geomass materials from industry may include mine tailings, mining dust, sand, bag house fines, soil dust, dust, cement kiln dust, slag, steel slag, iron slag, boiler slag, coal combustion residue, coal combustion product, ash, fly ash, slurry, lime slurry, lime, carbide lime, carbide residue, kiln dust, kiln fines, residue, bauxite residue, demolished concrete, recycled concrete, returned concrete, recycled mortar, recycled cement, demolished building materials, recycled building materials, recycled aggregate, etc. Geomass materials typically have compositions that contain metal oxides, as crystalline or amorphous phases, such as sodium oxide, potassium oxide, or other alkali metal oxide, magnesium oxide, calcium oxide, or other alkaline earth metal oxide, manganese oxide, copper oxide, or other transition metal oxide, zinc oxide or any other metal oxide or derivative thereof, or metal oxides present in crystalline form in simple or complex minerals or as amorphous phases of metal oxides or derivatives thereof or as a combination of any of the above.

As the methods are methods of enhancing geomass dissolution, the methods result in the leaching, seeping, straining, liberation, etc., of metal oxides or minerals from the geomass into a liquid phase such as an aqueous phase or an organic phase or as a combination of any other liquid phases, up to 100% dissolution efficiency of the desired metal oxides present in the composition of the geomass (as compared to a suitable control, e.g., the geomass material not subjected to methods of invention). For example, if a geomass contains 25% by weight calcium oxide (CaO), then 100% dissolution efficiency of CaO would result in 25% of the mass of the geomass being dissolved using the methods of invention. As such, aspects of the subject methods include dissolution efficiency of metal oxides present in the geomass to 0.05% or greater, such as 1.1% or greater, e.g., 2.1% or greater, 3.1% or greater, 4.1% or greater, 5.1% or greater, 6.1% or greater, 7.1% or greater, 8.1% or greater, 9.1% or greater, including 10% or greater, 20% or greater, 30% or greater, 40% or greater, 50% or greater, 60% or greater, 70% or greater, 80% or greater, 90% or greater and up to 100% dissolution efficiency.

In some embodiments, the methods use microwave radiation to enhance the dissolution efficiency of a geomass. Microwaves, microwave radiation, microwave energy, etc., are a form of non-ionizing electromagnetic radiation energy with wavelengths ranging from one meter (1 m) to one millimeter (1 mm), a frequency higher than ordinary radio waves but lower than infrared light, with frequencies that range, e.g., from 300 megahertz (MHz) to 300 gigahertz (GHz). Microwave radiation has been investigated to improve dissolution efficiency in order to improve overall yield and process time. Microwave radiation offers advantages over conventional heating that involve, non-contact heating, transfer of energy (not heat), rapid heating, material selective heating, volumetric heating, quick starting and stopping of heating, heating starting from interior, and improved safety. The microwave radiation that is employed in methods of the invention may vary according to process specificity, so long as it provides the desired enhancement in dissolution efficiency of the geomass. By microwaves, microwave radiation, microwave energy, etc., is meant a form of energy with frequencies that vary, and in some instances may range from 500 MHz to 100 GHz, such as 900 MHz to 5 GHz and including from 300 MHz to 300 GHz or the full microwave spectrum of frequencies. The methods use microwaves, microwave radiation, microwave energy, etc., to provide the power necessary to enhance the dissolution efficiency of the geomass, which may vary, and in some instances may range from one watt (1 W) to one gigawatt (1 GW), such as one kilowatt (1 kW) to one megawatt (1 MW) and including from 500 kW to 500 MW.

Aspects of the methods include microwave treatment of a combination of geomass material with a liquid phase to enhance the dissolution efficiency of the geomass. The treatment may occur, but is not limited to occurring in, a vessel or device that operates continuously, in batch, or a combination thereof. In certain embodiments, the geomass materials are present as particles that vary in size, e.g., with particle sizes ranging from 0.1 microns to several inches in diameter, e.g., 1 micron to 20 inches, or 100 microns to 10 inches, or 500 microns to 20 inches, in some embodiments 25 microns to ⅜ inches. In some embodiments, the liquid phase used in the methods is an aqueous medium, an organic medium, a combination thereof, or any other liquid medium that helps to promote the enhanced dissolution efficiency of the geomass using methods, systems and devices herein.

As the methods are methods of enhanced geomass dissolution efficiency, the microwave treatment or dielectric heating mechanism of enhancement is considered as methods, systems and devices described herein. The rate of geomass materials dissolution involves the surface area, the composition of the geomass itself, which may be comprised of many different mineral phases, and the temperature of the system, which may depend on the penetration of microwave radiation, effectiveness of dielectric heating, etc. Dielectric heating is a method in which a high frequency alternating electric field or radiofrequency or microwave electromagnetic radiation heats a material with dielectric properties. Dielectric heating is enhanced by materials with a dipole moment that are capable of molecular rotation, i.e., H2O, molecules with carboxylic acid or carboxylate groups such as, but not limited to acetate, oxalate, glutamate, malate or other organic or natural carboxylic acid or carboxylate containing molecule. Molecules attempt to reorient themselves in the electric field and cannot respond to friction, therefore creating a stronger heating effect. The stronger heating effect described in this method is a localized method that enhances the dissolution of the different phases contained in the geomass.

The heating effect caused by microwave radiation in the enhanced methods described herein may also lower the heat requirements for a carbon sequestration method that uses the enhanced dissolution methods as part of its process to capture and sequester carbon dioxide. For example, the enhanced methods may reduce the auxiliary power requirement for carbon sequestration methods, reducing the parasitic load associated with the auxiliary power requirement. The enhanced dissolution methods may lower or even reduce the need for a heat source such as heat from steam or heat from electrical power that are sometimes necessary to drive carbon sequestration methods, devices and systems.

Instead of or in addition to use of microwaves, e.g., as described above, enhancement of dissolution efficiency of geomass material may involve mixing or heating the geomass material in a liquid phase that contains ammonium salts, acidic media, surfactants or catalysts that can be regenerated in a batch or continuous flow process.

Dissolution efficiency described in this method can be enhanced by liquid phase solutions containing organic or inorganic materials with a dipole moment that ranges between 0 and 80 Debye, such as materials with a dipole moment of 0.01 Debye or greater, 0.1 Debye or greater, 1.0 Debye or greater such as a dipole moment that ranges between 0.5 and 0.9 Debye, and including materials with a dipole moment of 2.0 Debye or greater, 3.0 Debye or greater, 4.0 Debye or greater. The solution employed in this method may further include a catalyst, an organic ligand, or a surfactant. The solution employed may contain an organic salt or organic acid with a dipole moment to enhance dielectric heating efficiency of heating. The solution may be optimized to reduce reflection that decreases the efficiency of the microwave energy penetration. The solution in this method is optimized to generate a homogenous temperature, which improves the heating efficiency of the solution and dissolution efficiency of this material.

The dissolution of a variety of geomass materials may be enhanced. Geomass materials of interest include at least those materials coming from power industry, heavy industry and mining industry.

Figure 5:
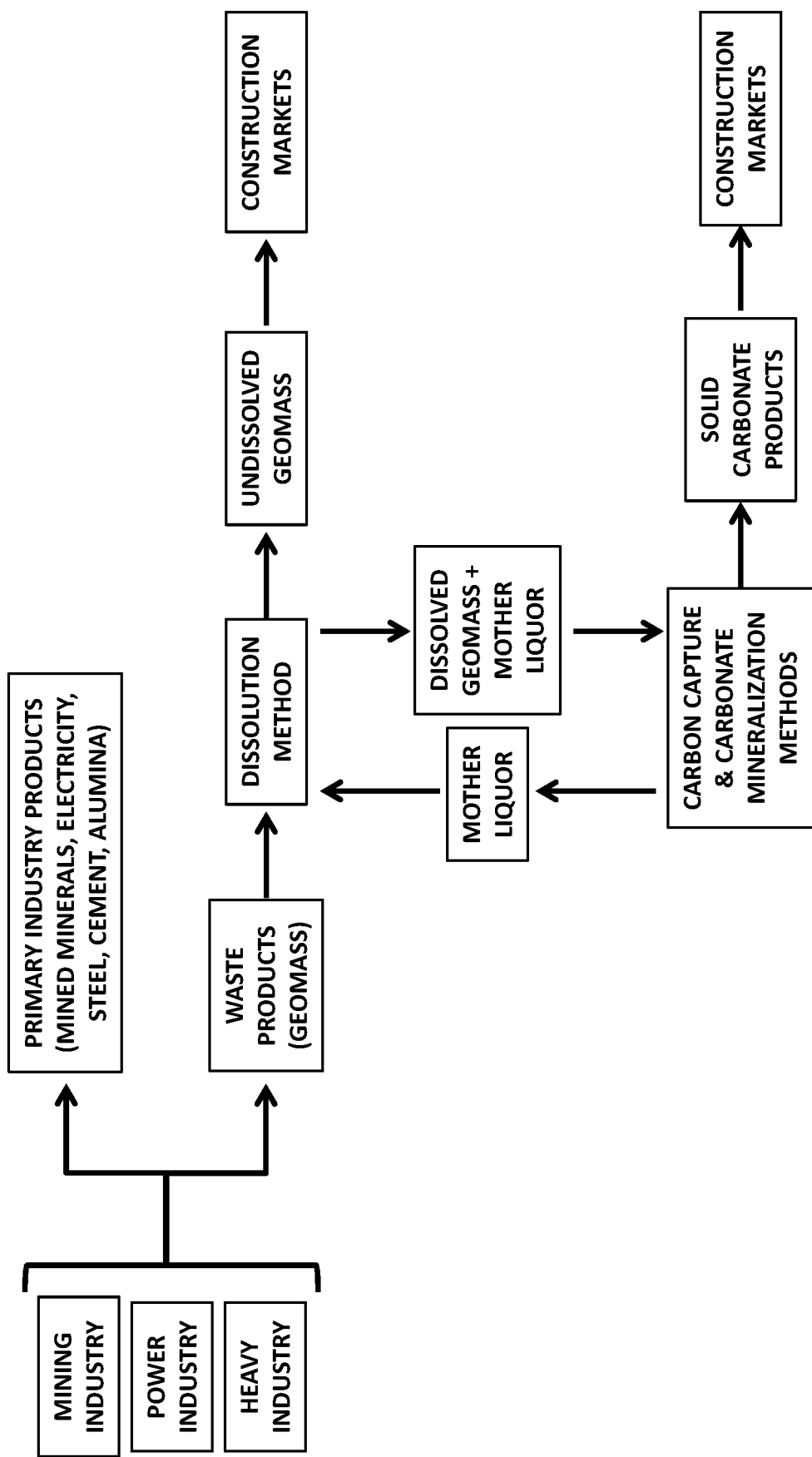
FIG. 5 shows an example flow chart applicable to enhanced geomass dissolution.

FIG. 5 shows an example flow chart applicable to enhanced geomass dissolution. As illustrated in FIG. 5, geomass generated as a waste product in the production of primary industry products (e.g., mined minerals, electricity, steel, cement, alumina) from a variety of industries (e.g., the mining industry, power industry, heavy industry) is dissolved using an enhanced dissolution method, e.g., a microwave mediated dissolution method, such as described above. The dissolved geomass and mother liquor may then be employed in one or more stages of a $CO_2$ sequestering solid carbonate production process, e.g., as described above, to produce one or more types of solid carbonate products, which may be employed in a variety of markets, including construction markets. As illustrated, the mother liquor may be recycled into the dissolution method, as desired. Undissolved geomass may also be employed in construction markets, e.g., as aggregate, etc.

The above described embodiment of enhancing geomass dissolution is not limited to embodiments where DAC generated gaseous sources of $CO_2$ are employed. Instead, the above described embodiment of geomass dissolution may be employed with processes employing any convenient gaseous source of $CO_2$, such as waste streams produced by industrial plants that combust fossil fuels, e.g., coal, oil, natural gas, as well as man-made fuel products of naturally occurring organic fuel deposits, such as but not limited to tar sands, heavy oil, oil shale, etc. In certain embodiments, power plants are pulverized coal power plants, supercritical coal power plants, mass burn coal power plants, fluidized bed coal power plants, gas or oil-fired boiler and steam turbine power plants, gas or oil-fired boiler simple cycle gas turbine power plants, and gas or oil-fired boiler combined cycle gas turbine power plants, where methods employing such sources are further described in: U.S. application Ser. No. 14/204,994 published as US-2014-0322803-A1; 14/214,129 published as US 2014-0271440 A1; Ser. No. 14/861,996 published as US 2016-0082387 A1 and Ser. No. 14/877,766 published as US 2016-0121298 A1; as well as U.S. Pat. Nos. 9,707,513 and 9,714,406; the disclosures of which are herein incorporated by reference.

Systems

Aspects of the invention further include systems for sequestering $CO_2$ from a DAC generated gaseous source of $CO_2$ via a protocol such as described above. A system is an apparatus that includes functional modules or reactors, e.g., as described above, that are operatively coupled in a manner sufficient to perform methods of the invention, e.g., as described above. Aspects of such systems include: a $CO_2$ gas/aqueous capture module and a carbonate production module. In some instances, the systems include an aqueous capture ammonia module; a carbonate production module; and an aqueous capture ammonia regeneration module.

In some instances, the $CO_2$ gas/aqueous capture ammonia module comprises a hollow fiber membrane. In some instances, the system is operatively coupled to a gaseous source of $CO_2$. As described above, the gaseous source of $CO_2$ may be a multi-component gaseous stream, such as a flue gas.

Operably coupled to the $CO_2$ gas/aqueous capture ammonia module is a carbonate production module. Embodiments of modules include continuous reactors that are configured for producing $CO_2$ sequestering carbonate materials. As the systems includes continuous reactors (i.e., flow reactors), they include reactors in which materials are carried in a flowing stream, where reactants (e.g., divalent cations, aqueous bicarbonate rich liquid, etc.) are continuously fed into the reactor and emerge as continuous stream of product. The continuous reactor components of the systems are therefore not batch reactors. A given system may include the continuous reactors, e.g., as described herein, in combination with one or more additional elements, as described in greater detail below.

In some embodiments, continuous reactors of the systems include: a flowing aqueous liquid, e.g., an aqueous ammonium carbonate; a divalent cation introducer configured to introduce divalent cations at an introduction location into the flowing aqueous liquid; and a non-slurry solid phase $CO_2$ sequestering carbonate material production location which is located at a distance from the divalent cation introducer. The flowing aqueous liquid is a stream of moving aqueous liquid, e.g., as described above, which may be present in the continuous reactor, where the continuous reactor may have any convenient configuration. Continuous reactors of interest include an inlet for a liquid and an outlet for the waste liquid, where the inlet and outlet are arranged relative to each other to provide for continuous movement or flow of the liquid into and out of the reactor. The reactor may have any convenient structure, where in some instances the reactor may have a length along which the liquid flows that is longer than any given cross sectional dimension of the reactor, where the inlet is at a first end of the reactor and the outlet is at a second end of the reactor. The volume of the reactor may vary, ranging in some instances from 10 L to 1,000,000 L, such as 1,000 L to 100,000 L.

Continuous reactors of interest further include a divalent cation introducer configured to introduce divalent cations at an introduction location into the flowing aqueous liquid. Any convenient introducer may be employed, where the introducer may be a liquid phase or solid phase introducer, depending on the nature of the divalent cation source. The introducer may be located in some instances at substantially the same, if not the same, position as the inlet for the bicarbonate rich product containing liquid. Alternatively, the introducer may be located at a distance downstream from the inlet. In such instances, the distance between the inlet and the introducer may vary, ranging in some embodiments from 1 cm to 10 m, such as 10 cm to 1 m. The introducer may be operatively coupled to a source or reservoir of divalent cations.

Continuous reactors of interest also include a non-slurry solid phase $CO_2$ sequestering carbonate material production location. This location is a region or area of the continuous reactor where a non-slurry solid phase $CO_2$ sequestering carbonate material is produced as a result of reaction of the divalent cations with bicarbonate ions of the bicarbonate rich product containing liquid. The reactor may be configured to produce any of the non-slurry solid phase $CO_2$ sequestering carbonate materials described above in the production location. In some instances, the production location is located at a distance from the divalent cation introduction location. While this distance may vary, in some instances the distance between the divalent cation introducer and the material production location ranges from 1 cm to 10 m, such as 10 cm to 1 m.

The production location may include seed structure(s), such as described above. In such instances, the reactor may be configured to contact the seed structures in a submerged or non-submerged format, such as described above. In non-submerged formats, the flowing liquid may be present on the surface of seed structures as a layer, e.g., of varying thickness, but a gas, e.g., air, separates at least two portions of the seed structure, e.g., two different particles, such that the particles are not submerged in the liquid.

Further details regarding such reactors that may be employed as carbonate production modules in embodiments of the present systems are provide in U.S. application Ser. No. 14/877,766 published as US 2016-0121298 A1; the disclosure of which is herein incorporated by reference.

The aqueous capture ammonia regeneration module may vary so long is it is configured to produce ammonia from the aqueous ammonium salt, e.g., via distillation or electrolysis, such as described above. In some instances, the regeneration module will be configured to operate a sub-atmospheric pressure, e.g., as described above, such that it will include one or more components for producing sub-atmospheric pressure, e.g., pumps, etc. In some instances, the regeneration module is operably coupled to a source of generated heat, e.g., steam, and/or one or more sources of waste heat, e.g., as described above. In some embodiments, the regeneration module includes a source of alkalinity, such as a mineral alkali source, e.g., as described above.

In some instances, the system is configured to recycle regenerated aqueous capture ammonia to the $CO_2$ gas/aqueous capture ammonia module, e.g., as described above.

In some instances, the systems and modules thereof are industrial scale systems, by which is meant that they are configured to process industrial scale amounts/volumes of input compositions (e.g., gases, liquids, etc.). For example, the systems and modules thereof, e.g., $CO_2$ contactor modules, carbonate production modules, ammonia regeneration modules, etc., are configured to process industrial scale volumes of liquids, e.g., 1,000 gal/day or more, such as 10,000 gal/day or more, including 25,000 gal/day or more, where in some instances, the systems and modules thereof are configured to process 1,000,000,000 gal/day or less, such as 500,000,000 gal/day or less. Similarly, the systems and modules thereof, e.g., $CO_2$ contactor modules, etc., are configured to process industrial scale volumes of gases, e.g., 25,000 cubic feet/hour or more, such as 100,000 cubic feet/hour or more, including 250,000 cubic feet/hour or more, where in some instances, the systems and modules thereof are configured to process 500,000,000 cubic feet/hour or less, such as 100,000,000 cubic feet/hour or less.

In some embodiments, a system is in fluidic communication with a source of aqueous media, such as a naturally occurring or man-made source of aqueous media, and may be co-located with a location where a $CO_2$ sequestration protocol is conducted. The systems may be present on land or sea. For example, a system may be a land based system that is in a coastal region, e.g., close to a source of sea water, or even an interior location, where water is piped into the system from a salt water source, e.g., an ocean. Alternatively, a system may be a water based system, i.e., a system that is present on or in water. Such a system may be present on a boat, ocean-based platform etc., as desired. In certain embodiments, a system may be co-located with an industrial plant, e.g., a power plant, at any convenient location.

In addition to the above components, systems of the invention further include a DAC component, which component generates $CO_2$ containing gas that is introduced into the aqueous capture module, e.g., as described above. DAC components are components that extract $CO_2$ from the air using media that binds to $CO_2$ but not to other atmospheric chemicals (such as nitrogen and oxygen). As air passes over the $CO_2$ binding medium, $CO_2$ "sticks" to the binding medium. In response to a stimulus, e.g., heat, humidity, etc., the bound $CO_2$ may then be released from the binding medium resulting the production of a gaseous $CO_2$ containing product. DAC components of interest include, but are not limited to: hydroxide based systems; $CO_2$ sorbent/temperature swing based systems, and $CO_2$ sorbent/temperature swing based systems. In some instances, the DAC component is a hydroxide based system, in which $CO_2$ is separated from air by contacting the air with is an aqueous hydroxide liquid. Examples of hydroxide based DAC systems include, but are not limited to, those described in PCT published application Nos. WO/2009/155539; WO/2010/022339; WO/2013/036859; and WO/2013/120024; the disclosures of which are herein incorporated by reference. In some instances, the DAC component is a $CO_2$ sorbent based system, in which $CO_2$ is separated from air by contacting the air with sorbent, such as an amine sorbent, followed by release of the sorbent captured $CO_2$ by subjecting the sorbent to one or more stimuli, e.g., change in temperature, change in humidity, etc. Examples of such DAC systems include, but are not limited to, those described in PCT published application Nos. WO/2005/108297; WO/2006/009600; WO/2006/023743; WO/2006/036396; WO/2006/084008; WO/2007/016271; WO/2007/114991; WO/2008/042919; WO/2008/061210; WO/2008/131132; WO/2008/144708; WO/2009/061836; WO/2009/067625; WO/2009/105566; WO/2009/149292; WO/2010/019600; WO/2010/022399; WO/2010/107942; WO/2011/011740; WO/2011/137398; WO/2012/106703; WO/2013/028688; WO/2013/075981; WO/2013/166432; WO/2014/170184; WO/2015/103401; WO/2015/185434; WO/2016/005226; WO/2016/037668; WO/2016/162022; WO/2016/164563; WO/2016/161998; WO/2017/184652; and WO/2017/009241; the disclosures of which are herein incorporated by reference.

FIG. 1 provides a schematic representation of a system according to an embodiment of the invention. As illustrated in FIG. 1, system 100 includes a $CO_2$ gas/aqueous capture ammonia module 102, a carbonate production module 104; and an aqueous capture ammonia regeneration module 106. System 100 is configured so that $CO_2$ containing gas 108 from a DAC source 109 is combined with aqueous ammonia capture liquid in the $CO_2$ gas/aqueous capture ammonia module 102 so as to produce an aqueous ammonium carbonate 110 which is then conveyed to the fluidically coupled carbonate production module 104. In the carbonate production module 104, the aqueous ammonium carbonate 110 is combined with a cation source 112 under conditions sufficient to produce a solid $CO_2$ sequestering carbonate 114 and an aqueous ammonium salt 116. The aqueous ammonium salt 116 is then conveyed to the fluidically coupled aqueous capture ammonia regeneration module 106, where it is heated, e.g., via steam from steam source 120, in the presence of a mineral aklalinity source 118. Regenerated aqueous ammonia liquid 122 is then conveyed to fluidically coupled $CO_2$ gas/aqueous capture ammonia module 102.

Figure 2:
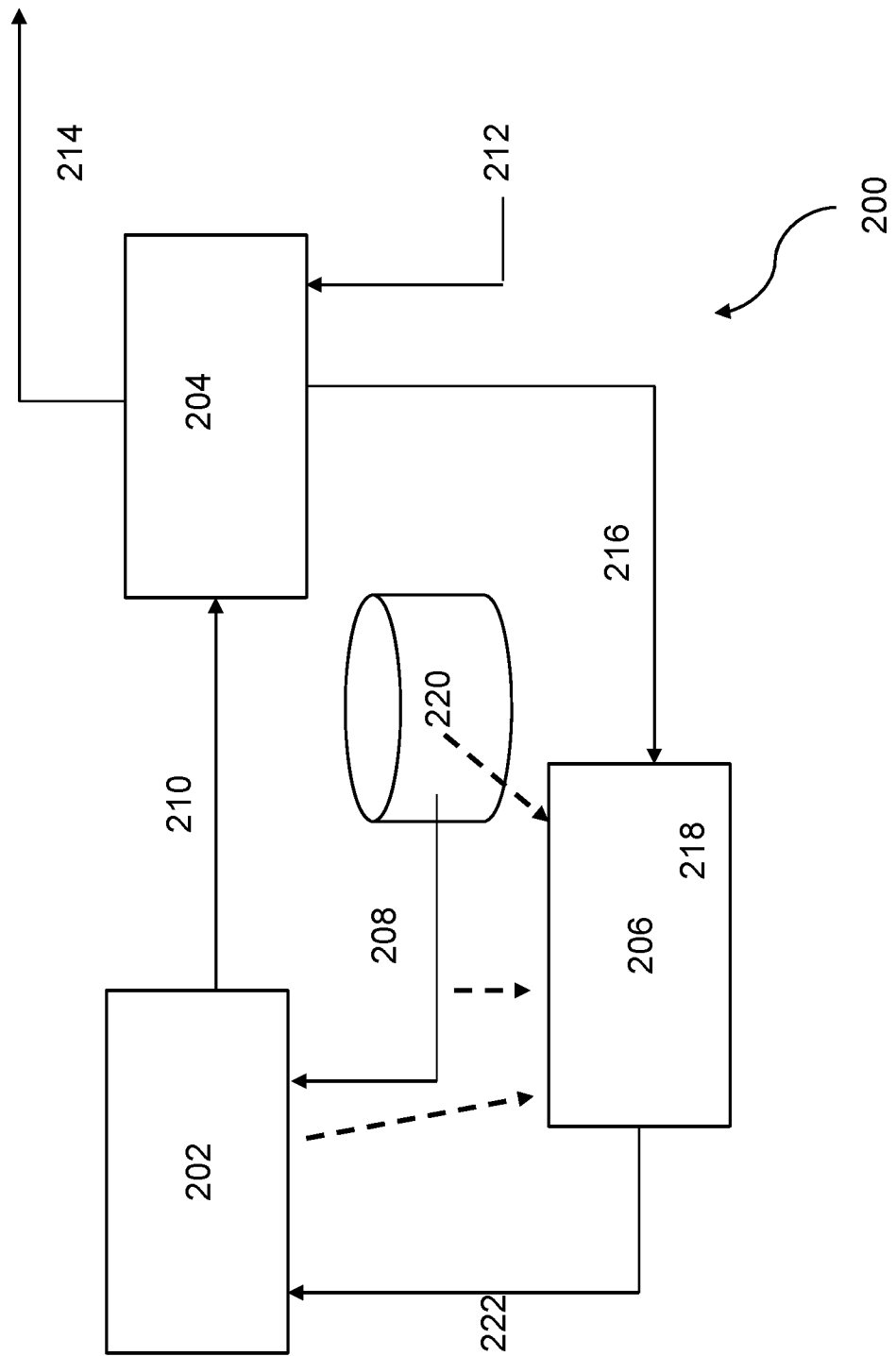
FIG. 2 provides a schematic representation of a system according to an embodiment of the invention, where ammonia regeneration occurs at sub-atmospheric pressure and all heat is provided by waste heat sources.

FIG. 2 provides a schematic representation of a system according to an embodiment of the invention, where ammonia regeneration occurs at sub-atmospheric pressure and all heat is provided by waste heat sources. As illustrated in FIG. 2, system 200 includes a $CO_2$ gas/aqueous capture ammonia module 202, a carbonate production module 204; and an aqueous capture ammonia regeneration module 206. System 200 is configured so that $CO_2$ containing gas 208 from a DAC source 220 is combined with aqueous ammonia capture liquid in the $CO_2$ gas/aqueous capture ammonia module 202 so as to produce an aqueous ammonium carbonate 210 which is then conveyed to the fluidically coupled carbonate production module 204. In the carbonate production module 204, the aqueous ammonium carbonate 210 is combined with a cation source 212 under conditions sufficient to produce a solid $CO_2$ sequestering carbonate 214 and an aqueous ammonium salt 216. The aqueous ammonium salt 216 is then conveyed to the fluidically coupled aqueous capture ammonia regeneration module 206, where it is heated in the presence of a mineral aklalinity source 218. Waste heat cooling systems of a co-located power plant 220, flue gas 208 and $CO_2$ gas/aqueous capture ammonia module 202 are employed as the heat sources for the regeneration module 206. Regenerated aqueous ammonia liquid 222 is then conveyed to fluidically coupled $CO_2$ gas/aqueous capture ammonia module 202.

In some instances, the $CO_2$ gas/aqueous capture ammonia module comprises a combined capture and alkali enrichment reactor, the reactor comprising: a core hollow fiber membrane component (e.g., one that comprises a plurality of hollow fiber membranes); an alkali enrichment membrane component surrounding the core hollow fiber membrane component and defining a first liquid flow path in which the core hollow fiber membrane component is present; and a housing configured to contain the alkali enrichment membrane component and core hollow fiber membrane component, wherein the housing is configured to define a second liquid flow path between the alkali enrichment membrane component and the inner surface of the housing. In some instances, the alkali enrichment membrane component is configured as a tube and the hollow fiber membrane component is axially positioned in the tube. In some instances, the housing is configured as a tube, wherein the housing and the alkali enrichment membrane component are concentric. Aspects of the invention further include a combined capture and alkali enrichment reactor, e.g., as described above.

In some instances the, the above protocols are carried out using a system of one or more shippable modular units configured for use in sequestering $CO_2$, e.g., as described in PCT published application No. WO 2016/160612; the disclosure of which is herein incorporated by reference. Aspects of the units include a support, e.g., a housing or base, having associated therewith one or more of: a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Modular units configured for use in the present invention may also include an ammonia regeneration unit, e.g., as described above. Also provided are systems made up of one or more such modular units. Systems disclosed herein include large capacity systems, where individual modular units may contain only one type or more of a given subunit, e.g., a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Aspects of the invention include larger assemblages of multiple individual modular units that are engaged and may have one or many individual modular units that include a $CO_2$ gas/liquid contactor subunit, a carbonate production subunit, an alkali enrichment subunit, a water softening subunit, a cation recovery subunit, a heat exchange subunit, a reverse osmosis subunit, a nanofiltration subunit, a microfiltration subunit, an ultrafiltration subunit, and a purified $CO_2$ collection subunit. Also provided are methods of using the units/systems in $CO_2$ sequestration protocols.

The following examples are offered by way of illustration and not by way of limitation.

EXPERIMENTAL

I. $CO_2$ Capture with Aqueous Ammonia

A. Materials & Methods

Experiments were run in batch contacting ~25 gal 0.5 M $NH_3$ (~ 1 wt % $NH_3$) capture solution with synthetic flue gas inside of a single (quantity 1) 2.5×8 Liqui-Cel membrane contactor (1.4 m2 membrane surface area). The capture solution was pumped through the lumenside (volume=0.15 L) of the contactor at a flow rate of 0.5 gpm (1.9 lpm) with an applied back pressure of 25 psig. The synthetic flue gas was flowed in a counter-current flow through the shellside (volume=0.40 L) of the contactor. The gas inlet concentrations ranged from 5-50% $CO_2$ (air make-up); inlet volumes from 10-40 slpm (air+$CO_2$); inlet pressures from 2-20 psig. During data collection the capture solution was flowed through the membrane contactor only once, recording $CO_2$ concentration (%, inlet and outlet), $O_2$ concentration (%, inlet and outlet), gas volume in (slpm, air and $CO_2$), gas pressure (psig, inlet and outlet), liquid flow (gpm, inlet), liquid pressure (psig, inlet and outlet), liquid pH (outlet), liquid temperature (deg C, outlet), liquid conductivity (mS/cm, outlet).

The outlet liquid (post contact with synthetic flue gas) was collected/combined in a separate tank. Experiments were repeated using the combined outlet liquid as the new inlet capture solution; this allows for verification of capture solutions with different pHs.

B. Results

Figure 6:
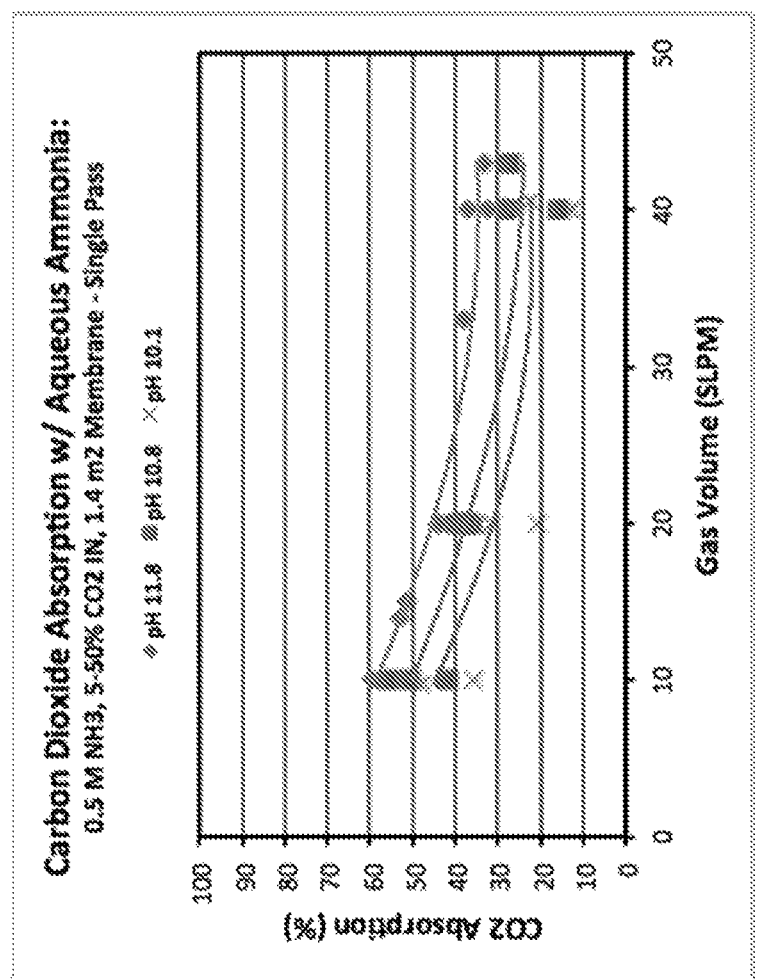
FIG. 6 provides a plot Carbon dioxide absorption (%) as it depends on gas volume (standard liters per minute, SLPM) using a 0.5 M $NH_3$ solution, with $CO_2$ gas concentrations ranging from 5-50% $CO_2$ (air makeup gas) and a single pass through one hollow fiber membrane contactor (1.4 $m^2$ surface area), as reported in the Experimental Section, below.

The plot in FIG. 6 verifies the $CO_2$ absorption from synthetic flue gas as it depends on the pH of a 0.5 M $NH_3$ (~ 1 wt % $NH_3$) capture solution and the gas volume entering a single (quantity 1) 2.5×8 Liqui-Cel membrane contactor. With larger membrane contactors (greater surface area, longer residence time, etc.) it is expected that the percent $CO_2$ absorption will increase significantly.

II. Mineralization

The following shows that ammonium bicarbonate solution can be used as a carbon bearing liquid in the formation of carbonate minerals when exposed to hard water (a cation source).

A. Materials and Methods 200 ml of ACS reagent grade ammonium bicarbonate was mixed (0.5M) with 200 ml of an ACS reagent grade $CaCl_2$ in a dual decomposition reaction. The solutions were left to react, exposed to the atmosphere and gentle stirring with a stir plate. The solution was Buchner filtered after 5 minutes and the resulting precipitate was recovered and dried at 75° C. overnight.

Resulting materials were observed by scanning electron microscope (SEM) as well as fourier transform infrared analysis (FTIR). FTIR spectra were recorded using a Nicolet IS-10 by Thermo-Fisher with a HeNe laser and a fast recovery deuterated triglycerine sulfate (DTGS) detector. Scans were collected on a Germanium ATR crystal at resolution of 16 and at optical velocity of 0.4747. SEM images were recorded using a Hitatchi™-3030 benchtop model.

B. Results

The reaction resulted in a precipitate, that when separated from supernatant was identified both in crystal habit (FIG. 4A) as well as by Fourier Transform Infrared analysis as calcite (peak identifiers 871 cm$^{-1}$, 714 cm$^{-1}$). The supernatant was further identified as ammonium chloride (peak identifiers 1100 cm$^{-1}$ as $NH_3$ and 1450 cm$^{-1}$ as $NH_4Cl$).

Further the experiment was repeated and $CaCl_2$ solution was titrated into the $NH_4HCO_3$ solution in the presence of silica sand. The reaction yielded a distinct coating similar to coatings produced with $NaHCO_3$ as carbon containing reagent.

III. Coating Process

A. Materials and Methods 0.25 M $CaCl_2$ was added to equal volumes of either 0.5 M $NaHCO_3$ or 0.5 M $Na_2CO_3$ in a dual decomposition reaction manner and were analyzed immediately post mixing. The results indicate that there are two distinct pathways toward calcium carbonate formation; a familiar one designated as reaction 2 ($CaCl_2$ (aq) and $Na_2CO_3$ (aq) at high pH, carbonate pathway) and another pathway designated as reaction 1 ($CaCl_2$ (aq) into $NaHCO_3$ (aq) at neutral pH, bicarbonate pathway).

FTIR spectra were recorded using a Nicolet IS-10 by Thermo-Fisher with a HeNe laser and a fast recovery deuterated triglycerine sulfate (DTGS) detector. Scans were collected on a Germanium ATR crystal at resolution of 16 and at optical velocity of 0.4747. FTIR samples were prepared by adding 0.25 M $CaCl_2$ (Sigma, Lot #BCBL2738 & Deionized Water) to 0.5M $NaHCO_3$ (Aqua Solutions, Lot #319302 & Deionized Water). 20 µl was pipetted onto the ATR crystal and the reaction was recorded in a time resolved fashion using a Macro applied to Omnic 9.2 software. The spectra were recorded at 0, 10, 20, and 1800 seconds.

The pH was recorded in a time resolved manner using an OrionStar A215 pH meter with an Orion 8157BNUMD Ross Ultra pH/ATC Probe. Data was logged using StarCom 1.0 sampling every 3 seconds while dosing 0.25 M $CaCl_2$ solution (Sigma, Lot #BCBL2738 & Deionized Water) into 0.5 M $NaHCO_3$ solution (Aqua Solutions, Lot #319302 & Deionized Water) and 0.5 M $Na_2CO_3$ (Sigma Lot #SLBD98664).

The dissolved inorganic carbon (DIC) content of solution and solid carbonate samples were determined by acidometric titration and coulometric detection using a CM150 carbon analysis system (UIC, Inc.). The samples were typically titrated with 2N $H_2PO_4$ (Sigma Aldrich). To detect $CO_2$ evolved in reactions of $CaCl_2$ (Sigma Aldrich) with $NaHCO_3$ (Aqua Solutions), however, the samples were not titrated with $H_2PO_4$, but rather, a solution of $CaCl_2$ was titrated with a solution of $NaHCO_3$ because titration with $H_2PO_4$ would result in liberation of $CO_2$ from $CaCO_3$. This allowed $CO_2$ to be quantified by coulometric detection; any solid formed in the reaction was then isolated, dried and analyzed by FTIR to confirm its composition as $CaCO_3$. All analyses using the CM150 system were completed at 40° C.

B. Results

Time Resolved Fourier Transform Infrared Spectra (FTIR) of a reaction 1 reaction at times of 0 seconds, 10 seconds, 30 seconds, 30 minutes post mixing shows calcite infrared active bond vibrational modes of, v3 (1400 cm$^{-1}$), v1 (1087 cm$^{-1}$), v2 (877 cm$^{-1}$), and v4 (714 cm$^{-1}$). The asymmetrical C—O stretching of the carbonate bond, v3, is seen shifting through a bidentate, resulting in a characteristic calcite peak suggesting that calcium carbonate formation may be forming through a bicarbonate pathway similar to one proposed in nature. The symmetric carbonate vibrational mode, v1, relates to free carbonate available in the structure. Out of plane bending, v2, and in plane bending, v4, are identified by (877 cm$^{-1}$) and (714 cm$^{-1}$) respectively. An FTIR spectra identifying $CaCO_3$ (calcite) formed by LCP Reaction 1, and Reaction 2 can be seen. The end product of both pathways appears to be identical. Nanoparticle tracking analysis (NTA) still-shot image of 0.25M $NaHCO_3$. Bicarbonate-rich liquid condensed phase droplets can be seen. An NTA still-shot image of a reaction 1 immediately post mixing provides a visualization of what is measured in time-resolve fashion in part A: The chemical pathway of LCP-driven low pH reaction (Reaction 1) vs. conventional high pH reaction (Reaction 2). The measured yields of reaction 1 vs. reaction 2, with respect to $CaCO_3$ and $CO_2$, as determined by DIC analysis. The results reinforce the difference between reaction 1 and reaction 2 pathways due to differences in evolved $CO_2$ (expected for reaction 1). The time-resolved pH response of reaction 1 dump reaction shows an initial drop in pH, presumably due to removal of bicarbonate. The time-resolved pH response of reaction 2 dump reaction shows little pH drop suggesting that carbonates are being consumed during mineral formation and are buffered by bicarbonates. During the reaction of carbonate formation, liquid condensed phases (LCP) evolve in the presence of calcium ion and nucleating to form $CaCO_{-3}$. As $CaCO_3$ precipitation proceeds, dehydration of the reaction product occurs as seen by the drop of δ O—H vibrational peak. According to FTIR spectra, the structures were initially hydrated and amorphous as reported previously, showing broad peaks in the observed range. As the reaction progresses, however, gradual appearance of sharp peaks are related to the development of crystalline structure of the carbonate polymorphs as seen with the increase of 1400 cm$^{-1}$ (v3 asymmetrical $CO_3$), 1087 cm$^{-1}$ (v1 symmetrical $CO_3$), 877 cm$^{-1}$ (v2 out-of-plane band of $CO_3$), and 714 cm$^{-1}$ (v4 in-plane-band of $CO_3$), indicating the formation of calcite phase. This particular reaction was denoted as Reaction 1 in the main report and was compared to conventional $CaCO_3$ precipitation pathway, Reaction 2.

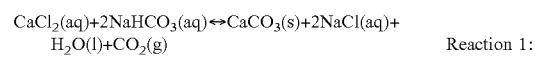

Reaction 1:

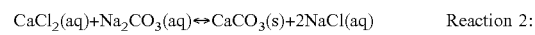

Reaction 2:

The products as the result of Reaction 1 and 2 are identical. The yield of $CO_2$ and $CaCO_3$ were 90% and 80%, respectively, confirming the stoichiometry and chemical pathway of Reaction 1. pH was also measured in a time-resolved fashion and suggests that reaction 1 occurs at a lower pH compared to the conventional Reaction 2. This is directly related to LCP-formation mechanism as $Ca^{2+}$ has the propensity to interact with $HCO_3$, enabling precipitation reaction to take place at neutral pH. In both cases, pHs in the initial stages decrease slightly due to onset of $CaCO_3$ precipitation.

IV. Processing of Hard Water

Solutions that have high concentrations of divalent ions, e.g., calcium ($Ca^{2+}$), magnesium ($Mg^{2+}$), etc., are produced from seawater or other saline or brine sources using existing water process technologies, e.g., nanofiltration (NF) or reverse osmosis (RO), for use as the hard water in the coating process as described above.

A. Materials & Methods

Feed solutions, e.g., instant ocean (28,500 ppm TDS), calcium chloride ($CaCl_2$, 5,500 ppm TDS), etc., were treated with 4 in. diameter (12.57 sq. in.) swatches of various commercial NF and RO membrane elements. The membrane permeate flux (gallons per square foot per day, GFD) was regulated by a valve at the concentrate stream of the flat-plate testing system. Samples of permeate were analyzed by ion chromatography and/or conductivity probe to determine the percent ion rejection of a given membrane. System pressure (psig) was also recorded during screening.

B. Results

With simulated seawater as the feed solution, we were able to verify to a good degree the passage of monovalent ions and the rejection of divalent ions using commercial NF membranes. With $CaCl_2$ solution, we verified that there are commercial NF membranes (e.g., TS40 (TriSep) and ESNA1-LF2 (Hydranautics)) capable of achieving greater than 80% calcium-ion rejection.

V. Ammonia Reformation with Geomass

A. Ammonia Reformation

Different types of geomass, e.g., high surface area carbonate or silicate solids, waste materials like fly ash, slag, bottom ash, economizer ash, red mud, etc., are heated in the presence of the back-end process water containing ammonium salt to regenerate ammonia gas ($NH_3$) from ammonium salts ($NH_4+$). It takes place in a recovery tower akin to that used in the industrially developed Solvay process.

The ammonia reformation regenerates the reactive capture solution for contact with the flue gas, ultimately absorbing and converting gaseous $CO_2$ into bicarbonate ion ($HCO_3^-$) in aqueous solution. Ammonia ($NH_3$) is converted to ammonium ($NH_4^+$) in the $CO_2$ capture process, while $NH_4^+$ is converted back to $NH_3$ in the ammonia reformation process. In other words, $NH_3$ is not consumed in any part of the process. It merely facilitates the sequestration of gaseous $CO_2$ into aqueous $HCO_3$ which then mineralizes into carbonate ($CO_3^{2-}$) in the coating process.

Ammonia ($NH_3$) is regenerated by heating aqueous ammonium salts, e.g., ammonium chloride ($NH_4Cl$), ammonium acetate ($NH_4OAc$), etc., in the presence of geomass fines, e.g., limestone, fly ash, slag, basalt, etc., for reuse in $CO_2$ absorption process at the front-end of the carbon capture and mineralization protocol, e.g., as illustrated in FIG. 1.

1. Materials & Methods 5-20 mL of ammonium salt solutions (0.5 M—saturated) were added to sample vessels containing geomass fines (2-10 g) and the vessel was heated to 30-150° C. for 15-126 min. A low flow of air (pre-scrubbed w/8 M KOH solution) was passed through the suspension during heating. Any volatile ammonia gas ($NH_3$) was trapped as ammonium ($NH^{4+}$) in an acid scrubber (5 mL 1 M HCl). The $NH^{4+}$ in the acid scrubber was then quantified by ion chromatography; '$NH_3$ Reformation Yield (%)' in the figures below represents the measured quantity of $NH^{4+}$ from ion chromatography divided by the theoretical yield of $NH_3$ (based on volume and concentration of ammonium salt added to the geomass fines).

2. Results

The regeneration of ammonia ($NH_3$) from ammonium salts was verified in a number of systems that varied the geomass fines, ammonium salts and their concentrations, reaction temperature and reaction time. Ammonia reformation yields in excess of 40% were observed at temperatures as low as 75° C. after heating for only 30 minutes.

Ammonia ($NH_3$) reformation occurs by heating different types of geomass, e.g., fly ash, $CaCO_3$, basalt, etc., in the presence of an ammonium ($NH^{4+}$) salt solution, e.g., ammonium chloride ($NH_4Cl$), ammonium acetate ($NH_4OAc$), ammonium nitrate ($NH_4NO_3$), etc. The bar chart (left vertical axis) shows the experimental yield of $NH_3$ reformation, while the line chart (right vertical axis) shows the concentration of $NH_3$ recovered in the reformed solution. What these two data sets show is that while the $NH_3$ reformation yield may be low, e.g., 10% for $CaCO_3$ geomass, the concentration of $NH_3$ recovered in that same system can be quite high, e.g., 415 mM, creating an effective $CO_2$ capture solution for removal of $CO_2$ from a flue gas.

$NH_3$ reformation yield in the absence of any geomass is comparatively much lower. The exception being ammonium bicarbonate ($NH_4HCO_3$), which does yield 30% $NH_3$ in the presence of heat, however unwanted $CO_2$ is also evolved from this system. In essence, this chart illustrates the benefits of geomass in driving the $NH_3$ reformation process. Data verifying $NH_3$ reformation from $NH_4Cl$ at 75° C. and in the presence of different types of geomass is shown in U.S. patent application Ser. No. 15/469,405, the disclosure of which is herein incorporated by reference. The results demonstrate that the $NH_3$ reformation can occur at low temperatures in the presence of common types of geomass, e.g., fly ash, $CaCO_3$ and basalt.

B. Additional Studies with Different Types of Geomass

1. Studies were performed to assess the ability of recycled concrete/mortar to act as an alkalinity geomass source for ammonia reformation. Plots of "Geomass Alkalinity (mmol) vs Time (min)" for different basalt and recycled concrete/mortar geomass materials; 1 M HCl was titrated into a suspension of 0.25 g geomass in saturated ammonium chloride solution at 70 degrees C. until a pH of 3.30 was maintained. Data shown in U.S. patent application Ser. No. 15/469,405, the disclosure of which is herein incorporated by reference, illustrates the rate of release of alkalinity from geomass upon exposure to fresh ammonium chloride solution.

2. Studies were performed to assess the ability of recycled concrete/mortar, among other materials, to act as an alkalinity geomass source for ammonia reformation. The bar chart shown in U.S. patent application Ser. No. 15/469,405, the disclosure of which is herein incorporated by reference, illustrates the "Ion Concentration in Reformed Liquid (mmol/L)" for sodium (Na+), potassium (K+), calcium (Ca2+) and magnesium (Mg2+), that were leached from different geomass materials upon mixing with 2 M ammonium chloride solution for 10 minutes at room temperature; CKD=cement kiln dust, CCR=coal combustion residue. Remaining solids were separated by filtration and the filtrates or "reformed liquids" were analyzed by ion chromatography. The data demonstrate the ability of various materials to act as a source of $Ca^{2+}$ for making a solid carbonate materials.

C. Ammonia Reformation with Vacuum Distillation

Studies were performed to assess the impact of subatmospheric pressure on ammonia reformation. The chart shown in U.S. patent application Ser. No. 15/469,405, the disclosure of which is herein incorporated by reference, shows the concentration (mol/L) of calcium and of alkalinity in the reformer liquid, as was determined by ion chromatography and acid titration, respectively, after it was reformed in the presence of electric arc furnace steel slag. Higher calcium ion concentration and lower alkalinity is observed in the reformer liquid for trials with vacuum compared to trials with no vacuum (labeled as "55 C, No Vacuum"). The control trials, "55 C, No Slag" and "55 C, Water" showed minimal reaction.

VI. Reformation of Ammonia and Coating with Recycled Concrete

A. Example Protocol 1: Reformation of Geomass Material

1. Materials and Methods

Method uses 1:1 liquids:solids to verify reformation of geomass.

Materials

Aqueous ammonium salt solution in the range of 2 M to saturated, e.g., 6 M NH4Cl
Geomass, e.g., demolished concrete, coal ash, cement kiln dust, slag, red mud
Bucket, preferably 2 gal size
Stirring spatula
Rubber tubing (for siphon)
Sample bottles, preferably 1 L
PPE: goggles, nitrile gloves, face mask Methods Add known quantity of geomass (on the order of 1 kg) to empty bucket
Add ammonium salt solution to bucket with geomass in a 1:1 ratio, e.g., if 1 kg geomass then add 1 L ammonium salt solution
Stir suspension with spatula for several minutes, e.g., for up to 10 minutes
　Ensure suspension is uniformly distributed, e.g., if there are large bits of geomass, break it up to evenly distribute
Allow suspension to settle for several hours
　Note: this usually means overnight or throughout the day, which allows for two rinses per day.
Siphon off liquid after settling and dispose
　Note: after the first settling (prior to any rinses) the liquid should be saved in sample bottles for further analysis by alkalinity titration, ion chromatography, coating verification testing, etc.
Rinse remaining sludge/solids with tap water while stirring; allow to settle and siphon off liquid and dispose.
Repeat rinsing step as necessary until conductivity of liquid measures less than 1 mS/cm.
Dry rinsed sludge/solids in oven at 70-80 deg C.
Transfer remediated, rinsed and dried solids verification in mortar formulations Data Analysis:
　Geomass:
　　Note quantity, type, source, particle size (if possible) and any further processing unless using as received
　　Weigh remaining geomass, rinsed and dried, and record weight loss from initial quantity
　Ammonium salt solution:
　　Note quantity, specific salt, concentration
　　Make note of any noticeable senses of ammonia during the experiment, e.g., by smelling
　　Record pH of liquid before and after exposure to geomass
　Make note of the number of rinsing steps
　Prepare first liquid sample (the one siphoned prior to any rinsing) for ion chromatography,
　　For saturated down to ~2 M ammonium salt solution, use, e.g., 12,500× dilution
　　　(1) 200 uL sample in 5,000 uL water
　　　(2) 10 uL (1) in 5,000 uL water

B. Example Protocol 2: Coating Remediated Concrete Substrate

1. Materials and Methods

Figure 7:
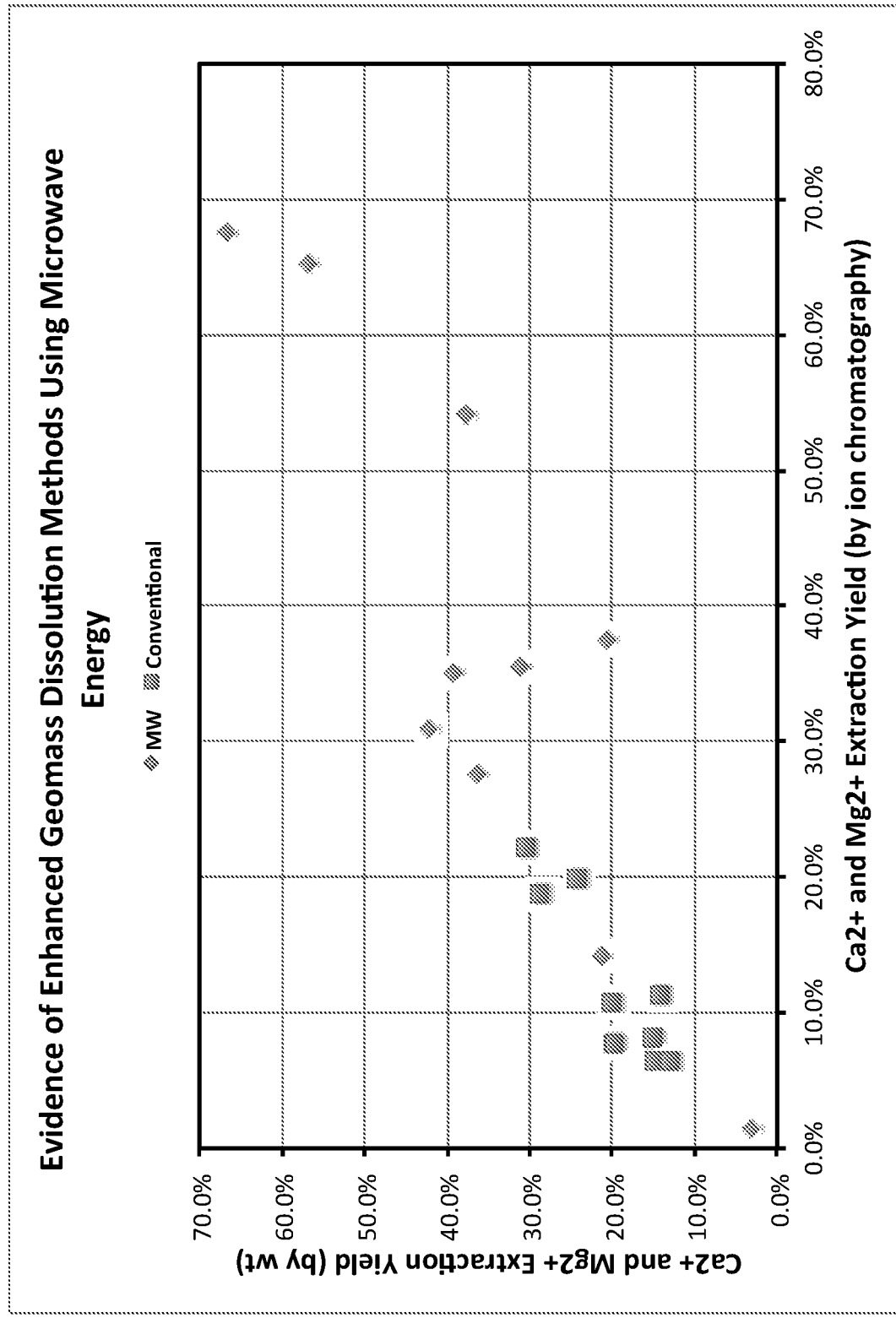
FIG. 7 shows a plot of the $Ca^{2+}$ and $Mg^{2+}$ extraction efficiency, as was determined by weight loss, versus the $Ca^{2+}$ and $Mg^{2+}$ extraction efficiency, as was determined by ion chromatography, for a set of samples that used enhanced microwave methods (MW, diamonds) and conventional methods (Conventional, squares).

Materials 5M ammonium salt solution used as a bulk solution, e.g., 5 M ammonium chloride solution
Reformed solution with dissolved calcium, e.g., filtrate from Example Protocol 1
0.7-0.8 M ammonium carbonate solution
Rotatable tube 6'1" in height and 9.5" in diameter, slightly inclined
Two injection pumps and one peristaltic recirculating pump
Vacuum pump to filter precipitates
Membrane filter
Lightweight aggregate substrates (e.g. remediated recycled concrete)
Bucket to hold ammonium chloride bulk solution
Mesh sieves to hold granules from falling
Rubber tubings for injection
Tube lid to fit tubings and prevent leakage
Sample containers
Heat-sheet
Temperature controller
Spoon
PPE: goggles, nitrile gloves, face mask Methods Weigh desired quantity of remediated recycled concrete (RRC), prewashed and dried
Load RRC onto rotating tube using spoon.
Add 5M ammonium salt solution to bucket and heat the solution to 45° C. using heat sheet and maintain the temperature with temperature controller.
Measure pH of ammonium chloride solution when it reaches 45° C.
Start flowing ammonium chloride solution into the large tube with the loaded RRCs and keep it recirculating at 110 mL/min
Inject reformed solution and ammonium carbonate solution simultaneously at 7.5 mL/min onto RRCs
Turn the tube 90° after 1 hour of reaction
After 2 hours of reaction, stop all the pumps and take out the coated RRCs using spoon.
Wash the granules using water at least 3 times
Dry the granules in air at room temperature for 3 days Data Analysis:
　Weigh the coated and dried granules
　Vacuum-filter and dry precipitates from ammonium chloride solution
　Weigh the dried precipitates
　Calculate the coating yield based on how much calcium and carbonate was injected into the system
　Characterize coatings using SEM and ATR-FTIR
　Record pH of the ammonium chloride bulk solution before and after recirculation
　Record pH of the solution from where coating takes place
　Record the extent of dilution on ammonium chloride solution Measure dissolved carbonate remaining in ammonium chloride solution based on DIC measurement or by subtracting from % precipitated and % coated VII. Enhanced Geomass Dissolution Methods A. Materials Prepared aqueous ammonium salt solution:
5M NH4Cl, 1 M NH4OAc, 8 M NH4OAc
Blue Planet geomass, e.g., recycled concrete, coal ash, cement kiln dust, slag, red mud
Microwave
Filter paper, funnel, beaker
Sample tubes for IC
100 mL graduated cylinder
Erlenmeyer flasks (appropriately sized)
RO Permeate Water
PPE: goggles, nitrile gloves, lab coat, fume hood B. Methods Weigh geomass, record and place in appropriately sized flask
Add appropriate volume of ammonium salt solution
Note concentration and volume
Place in microwave, protect yourself, and heat for one minute
Note any changes in power of microwave
Pull the fume hood cover all the way down and use a long stick to start the microwave.
Remove flask, swirl suspension, and repeat step 3 by 2×(3 minutes total heat)
Note the temperature of suspension with thermometer in between heating intervals
Note any additional microwave cycles
After microwave reaction, filter suspension and save the filtrate to analyze by Ion Chromatography
Pre-weigh filter paper
Measure and record volume of filtrate after it all filters through
Measure pH of filtrate
Rinse the solid in the filter with RO Permeate water until conductivity of filtrate is less than 500 uS/cm
Place washed solid in filter paper in oven to dry
Record weight of dried solid and filter, and calculate mass loss from the reaction
Data Analysis:
Geomass
Note quantity, type, source, particle size (if possible) and any further processing unless using as received.
Ammonium salt solution:
Note quantity, concentration
Experimental
Note temperature of samples while heating in microwave, grams of filter paper, mL of solution.
Measure samples in IC and record measurements in shared spreadsheet
Convert IC data from ppm to mmol/L C. Results FIG. 7 shows a plot of the $Ca^{2+}$ and $Mg^{2+}$ extraction efficiency, as was determined by weight loss, versus the $Ca^{2+}$ and $Mg^{2+}$ extraction efficiency, as was determined by ion chromatography, for a set of samples that used enhanced microwave methods (MW, diamonds) and conventional methods (Conventional, squares).

Figure 8:
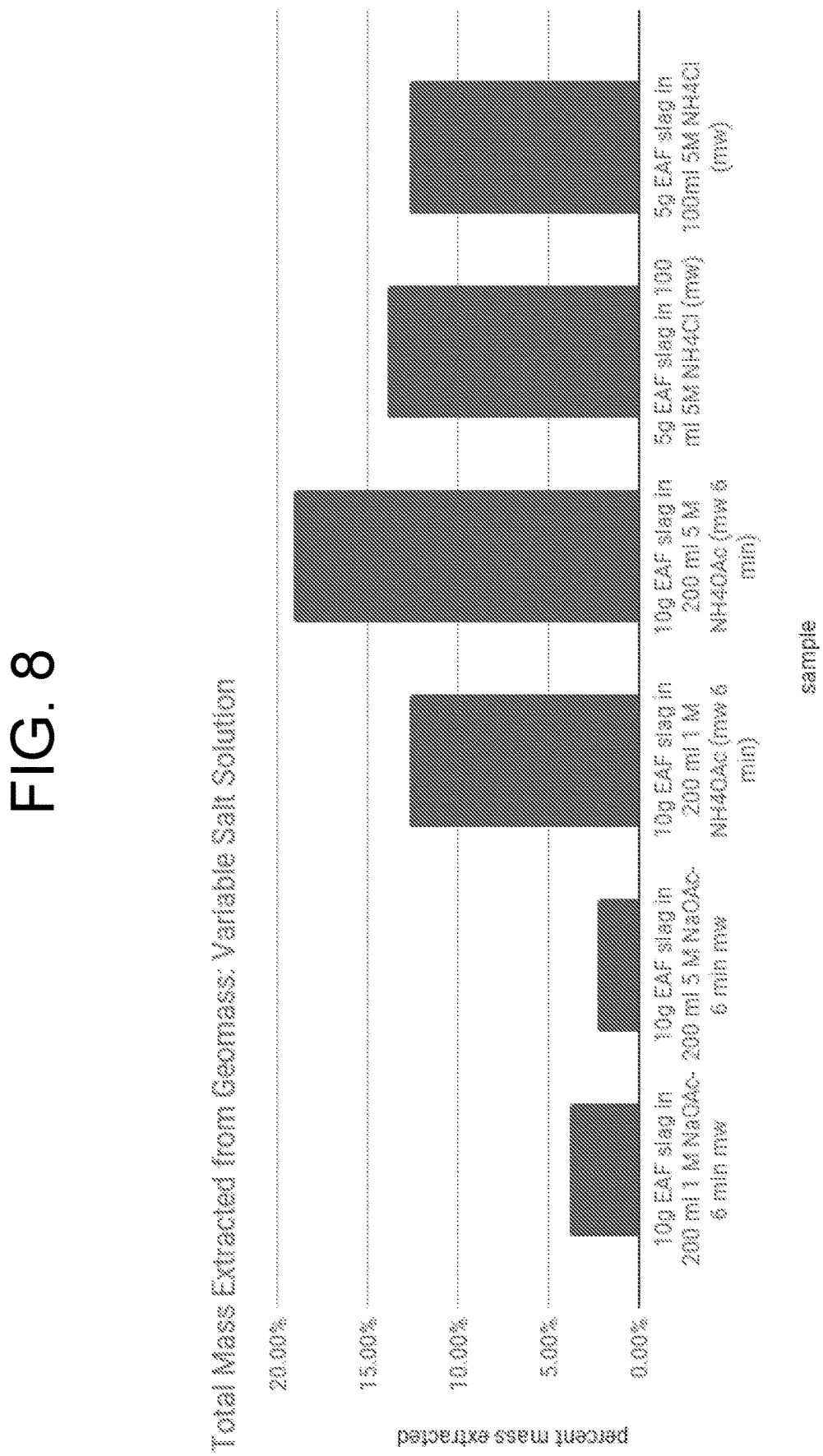
FIG. 8 compares the percent mass loss from the initial geomass, as was determined by weight difference after reformation, using enhanced extraction methods (microwave) and different salt solutions, sodium acetate (NaOAc), ammonium acetate (NH4OAc) and ammonium chloride (NH4Cl).

FIG. 8 compares the percent mass loss from the initial geomass, as was determined by weight difference after reformation, using enhanced extraction methods (microwave) and different salt solutions, sodium acetate (NaOAc), ammonium acetate (NH4OAc) and ammonium chloride (NH4Cl).

Figure 9:
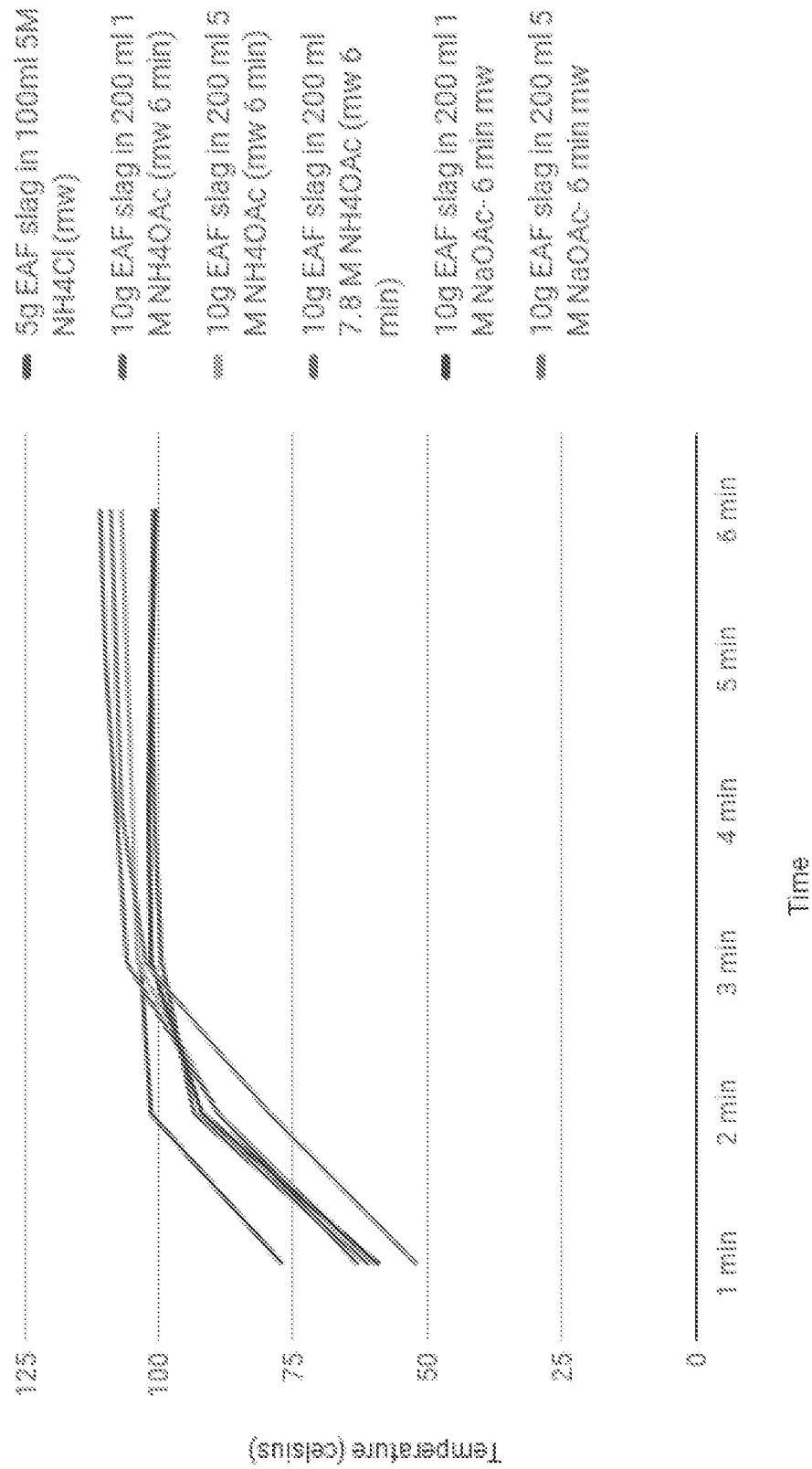
FIG. 9 shows the temperature profile vs. time using enhanced methods (microwave).

FIG. 9 shows the temperature profile vs. time using enhanced methods (microwave).

Figure 10:
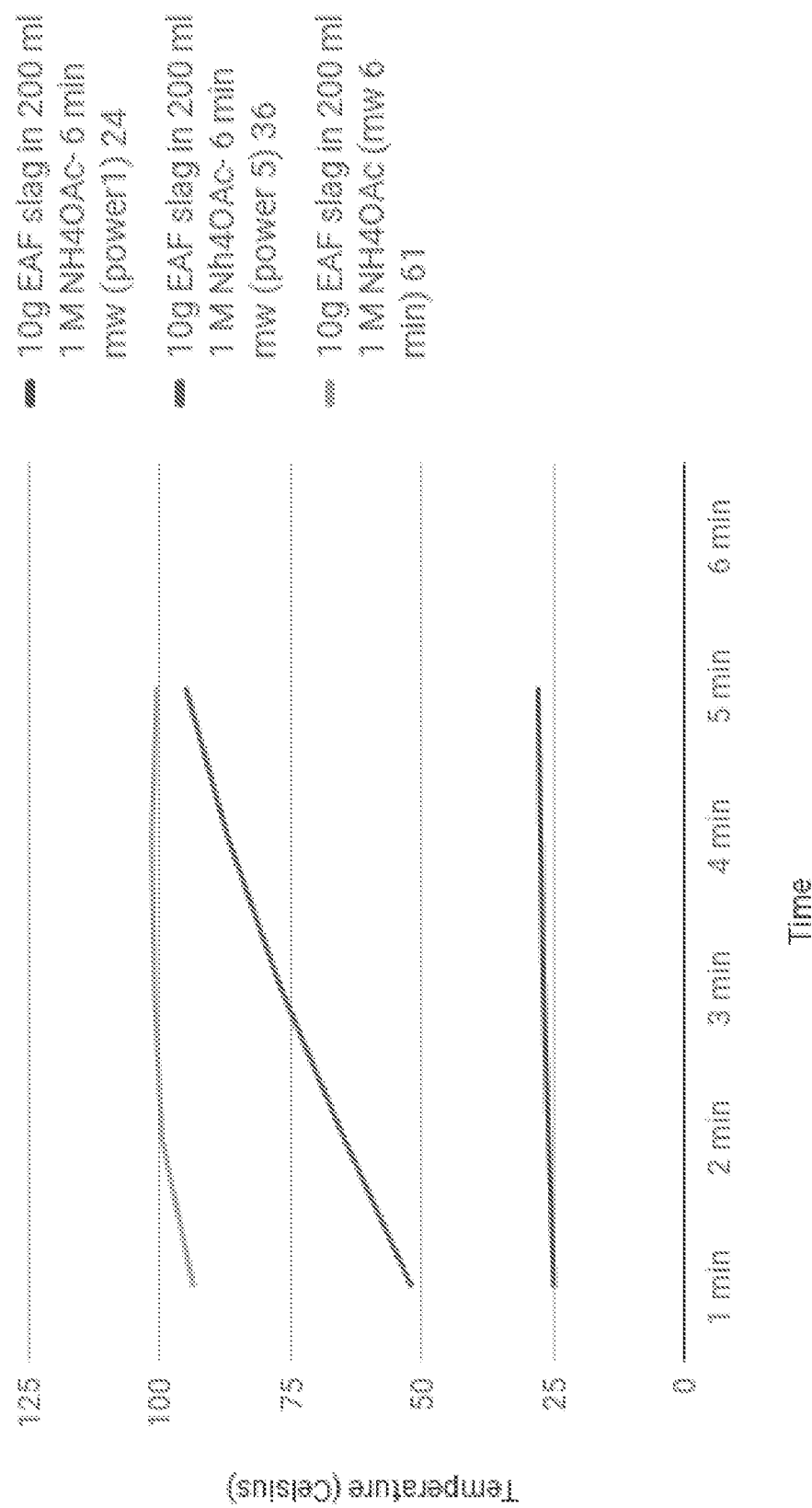
FIG. 10 shows the temperature profile vs time using enhanced extraction methods (microwave) at various power settings, MW power 1 being the lowest power and MW power 10 being the highest power from a 900-watt output domestic microwave system.

FIG. 10 shows the temperature profile vs time using enhanced extraction methods (microwave) at various power settings, MW power 1 being the lowest power and MW power 10 being the highest power from a 900-watt output domestic microwave system.

VIII. Internal Curing Test

An ASTM C1761 evaluation was made comparing Santa Cruz Marble (0.595 mm in diameter) with the same diameter Santa Cruz marble coated with solid calcium carbonate to 0.841 mm thickness and the same diameter Santa Cruz marble coated with solid calcium carbonate to 1.68 mm thickness. The coated Santa Cruz marble was prepared using the protocol described in U.S. patent application Ser. No. 14/877,766; the disclosure of which is herein incorporated by reference. Samples were soaked in water for 72 hours, dried to surface wetness, and then allowed to desorb water in a 94% humidity chamber (See ASTM C1761). The samples were weighed periodically until they reached equilibrium (1-12 days). Water released was calculated using the equation specified in ASTM C1761.

Total desorbed is: $D = (WLWA/(A72/100\%)) \times 100\%$

The results are provided below and demonstrate that carbonate coated aggregate is suitable for use in internal curing concrete compositions.

| Sample | Days to Desorption | Water Released ($W_{LWA}$) | Total Desorbed (D) | Meets ASTM C1761 Spec |
|---|---|---|---|---|
| Marble (Santa Cruz) 0.595 mm | 1 | −0.0008 | −18% | No |
| Marble Coated to 0.841 mm with CaCO3 | 10 | 0.0455 | 99% | Yes |
| Marble Coated to 1.68 mm with CaCO3 | 12 | 0.0822 | 98% | Yes |

IX. Compressive Strength with Remediated Recycled Concrete Aggregate

Figure 11:
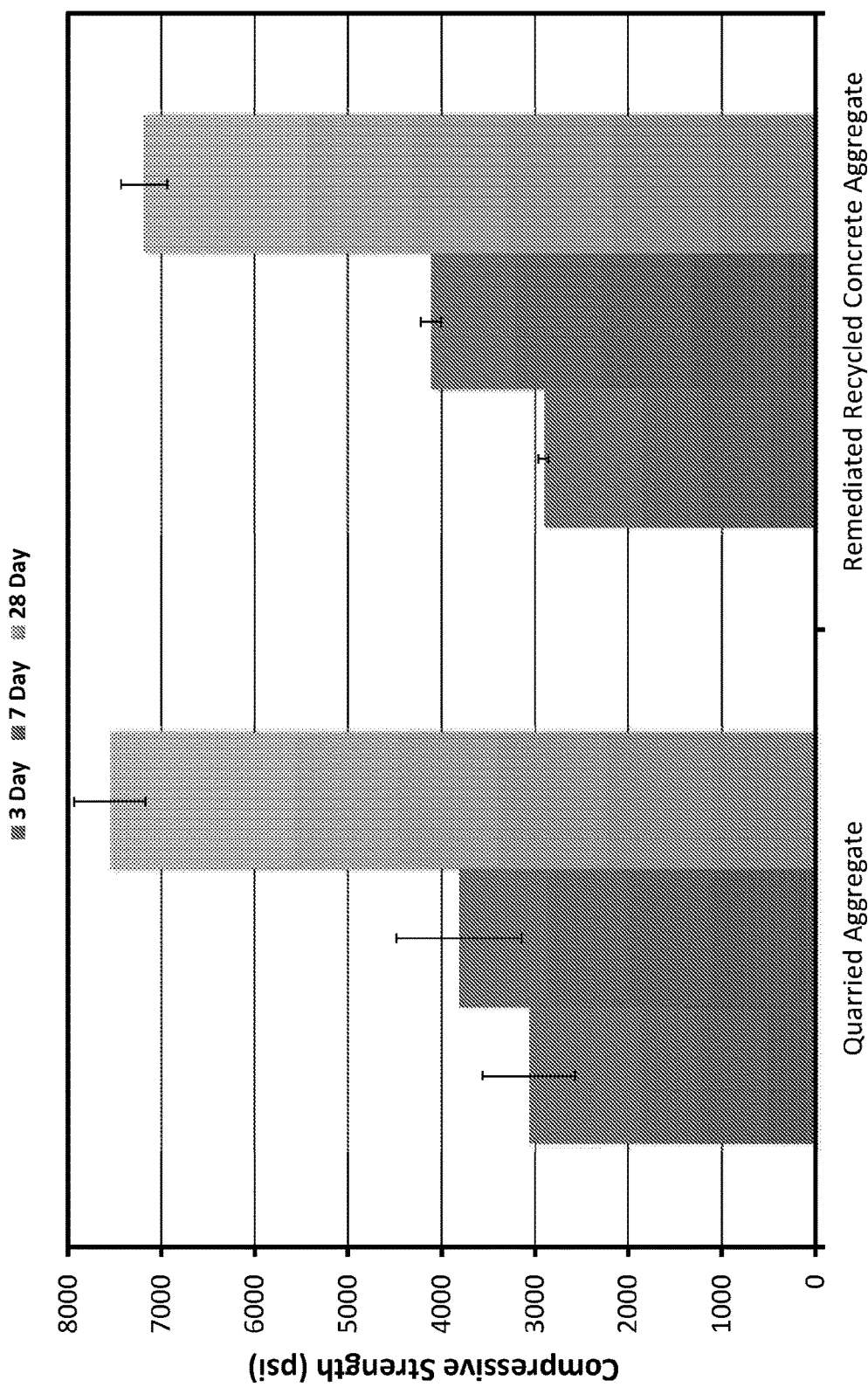
FIG. 11 shows a chart of ASTM C39 compressive strength data for 8×4 concrete cylinder specimens after 3-, 7- and 28-days of curing. The two concrete formulations used 25% fly ash SCM and compare using 100% quarried aggregate as the coarse aggregate component to using 100% reformed recycled concrete aggregate as the coarse aggregate component; the latter material having been through a reformation processing step to extract calcium and alkalinity for use in a carbon capture and mineralization process, e.g., as described above.

FIG. 11 shows a chart of ASTM C39 compressive strength data for 8×4 concrete cylinder specimens after 3-, 7- and 28-days of curing. The two concrete formulations used 25% fly ash SCM and compare using 100% quarried aggregate as the coarse aggregate component to using 100% reformed recycled concrete aggregate as the coarse aggregate component; the latter material having been through a reformation processing step to extract calcium and alkalinity for use in a carbon capture and mineralization process, e.g., as described above.

X. Stoichiometry Evaluation

The objective is to determine the effects of the stoichiometry of calcium carbonate (CaCO3) formation in ammonium salt ($NH_4^+$) versus sodium salt ($Na^+$) systems in methods of carbon capture and mineralization. Here, calcium chloride ($CaCl_2$) solutions were combined with $NH_4^+$/$Na^+$ carbonate ($CO_3^{2-}$) or bicarbonate ($HCO_3^-$) solutions to produce $CaCO_3$ and, in some instances, carbon dioxide ($CO_2$) gas. The balances of reactants and products were quantified by methods of pH measurement, acidometric titration, ion chromatography and carbon coulometry. It is noteworthy that methods of carbon capture and mineralization that employ ammonium bicarbonate ($NH_4HCO_3$) salt systems reduce the amount of $CO_2$ gas observed during the formation of $CaCO_3$ compared to analogous systems that employ sodium bicarbonate ($NaHCO_3$) salt.

A. ($CaCl_2$+$NH_4HCO_3$) Reaction

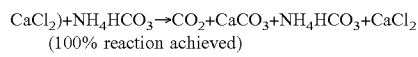
(100% reaction achieved)

| IN | | | OUT | | | RATIO | |
|---|---|---|---|---|---|---|---|
| Ca | $HCO_3^-$ | $CO_2$ | $CaCO_3$ | DIC | Ca | Ca:$HCO_3^-$ ratio | $CO_2$:$CaCO_3$ ratio |
| 0.14 | 0.12 | 0.02 | 0.12 | 0.00 | 0.05 | 1:0.9 | 1:6 |
| 0.14 | 0.22 | 0.06 | 0.18 | | | 1:1.6 | 1:3 |
| 0.14 | 0.22 | 0.06 | 0.20 | | | 1:1.6 | 1:3.3 |
| 0.14 | 0.25 | 0.13 | 0.12 | 0.01 | 0.00 | 1:1.8 | 1:0.9 |
| 0.14 | 0.27 | 0.14 | 0.14 | 0.02 | 0.01 | 1:1.9 | 1:1 |
| 0.14 | 0.30 | 0.09 | 0.10 | 0.02 | 0.01 | 1:2.1 | 1:1.1 |
| 0.14 | 0.33 | 0.16 | 0.12 | 0.02 | 0.00 | 1:2.4 | 1:0.75 |
| 0.14 | 0.33 | 0.14 | 0.12 | 0.02 | | 1:2.4 | 1:0.9 |
| 0.14 | 0.33 | 0.14 | 0.12 | 0.02 | | 1:2.4 | 1:0.9 |

IN, OUT units in M (mol/L); Ca is calcium ion ($Ca^{2+}$), $HCO_3$ is bicarbonate ion, $CO_2$ is carbon dioxide gas, $CaCO_3$ is calcium carbonate solid, DIC is dissolved inorganic carbon measurement by carbon coulometry.

Observations/Comments:
  1:1 ratio: $CaCO_3$ forms before $CO_2$; less $CO_2$ generated, but excess Ca.
  1:2 ratio: $CaCO_3$ and $CO_2$ forms in 1:1 fashion.
  Excess bicarbonate: more $CO_2$ generated than $CaCO_3$.

B. ($CaCl_2$+$NaHCO_3$) Reaction

| IN | | | OUT | | | RATIO | |
|---|---|---|---|---|---|---|---|
| Ca | $HCO_3^-$ | $CO_2$ | $CaCO_3$ | DIC | Ca | Ca:$HCO_3^-$ ratio | $CO_2$:$CaCO_3$ ratio |
| 0.14 | 0.16 | 0.08 | 0.07 | | | 1:1.1 | 0.14 |
| 0.14 | 0.27 | 0.11 | 0.16 | 0.02 | 0.01 | 1:1.9 | 0.14 |
| 0.14 | 0.28 | 0.14 | | | | 1:2 | 0.14 |
| 0.14 | 0.28 | 0.15 | | | | 1:2 | 0.14 |
| 0.14 | 0.28 | 0.12 | 0.11 | | | 1:2 | 0.14 |
| 0.14 | 0.28 | 0.15 | 0.11 | | | 1:2 | 0.14 |
| 0.14 | 0.28 | 0.14 | 0.10 | | | 1:2 | 0.14 |

IN, OUT units in M (mol/L); Ca is calcium ion ($Ca^{2+}$), $HCO_3$ is bicarbonate ion, $CO_2$ is carbon dioxide gas, $CaCO_3$ is calcium carbonate solid, DIC is dissolved inorganic carbon measurement by carbon coulometry.

Observations/Comments:
  Roughly 1:1 $CO_2$ to $CaCO_3$ ratio.
  Apparent lower yield than same system w/$NH_4HCO_3$.
  Slower reaction with $NH_4^+$ but higher yield.

C. ($CaCl_2$+$(NH_4)_2CO_3$) Reaction

| IN | | | OUT | | | RATIO |
|---|---|---|---|---|---|---|
| Ca | $CO_3^{2-}$ | $CO_2$ | $CaCO_3$ | DIC | Ca | Ca:$CO_3^{2-}$ ratio |
| 0.14 | 0.19 | 0.03 | 0.13 | | | 1:1.4 |
| 0.14 | 0.30 | 0.09 | 0.10 | 0.02 | 0.01 | 1:2.1 |
| 0.14 | 0.34 | 0.09 | 0.11 | | | 1:2.4 |
| 0.14 | 0.34 | 0.09 | 0.08 | | | 1:2.4 |
| 0.14 | 0.36 | 0.11 | 0.08 | | | 1:2.6 |
| 0.14 | 0.28 | 0.15 | 0.11 | | | 1:2 |
| 0.14 | 0.28 | 0.14 | 0.10 | | | 1:2 |

IN, OUT units in M (mol/L); Ca is calcium ion ($Ca_2^+$), $CO_3^{2-}$ is carbonate ion, $CO_2$ is carbon dioxide gas, $CaCO_3$ is calcium carbonate solid, DIC is dissolved inorganic carbon measurement by carbon coulometry.

Observations/Comments:
  Lower reaction yield than analogous system with bicarbonate.
  More $CaCO_3$ at lower ratio, but $CO_2$ increases at higher ratio.

D. ($CaCl_2$+$Na_2CO_3$) Reaction

| IN | | | OUT | | RATIO |
|---|---|---|---|---|---|
| Ca | $CO_3^{2-}$ | $CO_2$ | $CaCO_3$ | | Ca:$CO_3^{2-}$ ratio |
| 0.14 | 0.17 | 0.00 | 0.12 | | 1:1.2 |
| 0.14 | 0.33 | 0.00 | | | 1:2.4 |

IN, OUT units in M (mol/L); Ca is calcium ion ($Ca_2+$), $CO_3^{2-}$ is carbonate ion, $CO_2$ is carbon dioxide gas, $CaCO_3$ is calcium carbonate solid.

Observations/Comments:
  No $CO_2$ gas observed.
  Not 100% reaction yield.

IV. Effect of Salinity in ($CaCl_2$+$NH_4HCO_3$) Reaction

| REACTION MEDIUM | IN | | | OUT | | | REACTION YIELD |
|---|---|---|---|---|---|---|---|
| | Ca | $HCO_3^-$ | $CO_2$ | $CaCO_3$ | DIC | Ca | |
| Water | 0.09 | 0.16 | 0.1 | 0.06 | | | 1 |
| | 0.09 | 0.16 | 0.1 | | | | |
| 1M $NH_4Cl$ | 0.09 | 0.15 | 0.05 | 0.06 | | | 0.73 |
| | 0.10 | 0.17 | 0.08 | 0.04 | 0.01 | 0.01 | 0.71 |
| | 0.09 | 0.16 | 0.05 | 0.03 | | | 0.5 |
| 5M $NH_4Cl$ | 0.09 | 0.15 | 0.06 | | | | |
| | 0.09 | 0.16 | 0.06 | 0.02 | | | 0.5 |
| 1M NaCl | 0.09 | 0.16 | 0.04 | 0.08 | | | 0.75 |
| | 0.09 | 0.16 | 0.1 | 0.02 | | | 0.75 |
| | 0.09 | 0.16 | 0.09 | 0.02 | | | 0.69 |
| 5M NaCl | 0.09 | 0.16 | 0.03 | | | | |
| | 0.09 | 0.16 | 0.09 | 0.01 | | | 0.63 |
| | 0.09 | 0.16 | 0.08 | 0.03 | | | 0.69 |

IN, OUT units in M (mol/L); Ca is calcium ion ($Ca_2+$), $HCO_3$ is bicarbonate ion, $CO_2$ is carbon dioxide gas, $CaCO_3$ is calcium carbonate solid, DIC is dissolved inorganic carbon measurement by carbon coulometry.

Observations/Comments:
  Lower reaction yield with higher salt: 100%→70%→60%.
  With increased salinity, more $CO_2$ gas produced than $CaCO_3$ solid.
  With increased salinity, $CaCO_3$ polymorph(s) more complex.

Compared to $NH_4Cl$ systems, increased reaction yield in NaCl systems, possibly due to hydrogen-bonding that interferes with dissociation that occurs to promote desirable reactions.

Notwithstanding the appended clauses, the disclosure is also defined by the following clauses:

1. A method of producing a solid carbonate material from a gaseous source of $CO_2$, the method comprising:
   a) contacting an aqueous capture ammonia with a gaseous source of $CO_2$ under conditions sufficient to produce an aqueous solution comprised of ammonium carbonate, ammonia, ammonium bicarbonate, ammonium carbamate, dissolved $CO_2$, or mixture thereof;
   b) combining a cation source and the aqueous solution under conditions sufficient to produce a carbonate solid and an aqueous ammonium salt; and
   c) regenerating aqueous capture ammonia from the aqueous ammonium salt; to capture $CO_2$ from the gaseous source of $CO_2$.

2. The method according to clause 1, wherein the aqueous capture ammonia comprises ammonia at a concentration ranging from 0.1 to 20.0 M.

3. The method according to any of the preceding clauses, wherein the gaseous source of $CO_2$ is a multi-component gaseous stream.

4. The method according to clause 3, wherein the gaseous source of $CO_2$ is a flue gas.

5. The method according to clause 4, wherein the gaseous source of $CO_2$ is generated by a direct air capture (DAC) system.

6. The method according to any of the preceding clauses, wherein the gaseous source of $CO_2$ is contacted with the aqueous capture ammonia using a membrane contactor.

7. The method according to clause 6, wherein the membrane contactor is a hollow fiber membrane contactor.

8. The method according to any of the preceding clauses, wherein the aqueous ammonium carbonate comprises at least one of ammonium carbonate and ammonium bicarbonate.

9. The method according to any of the preceding clauses, wherein the aqueous ammonium carbonate comprises both ammonium carbonate and ammonium bicarbonate.

10. The method according to any of the preceding clauses, wherein the aqueous ammonium carbonate comprises ammonium carbamate, ammonia, ammonium carbonate, ammonium bicarbonate, and dissolved carbon dioxide gas.

11. The method according to any of the preceding clauses, wherein regenerating the aqueous capture ammonia from the aqueous ammonium salt comprises distillation.

12. The method according to clause 11, wherein the distillation is performed at a sub-atmospheric pressure.

13. The method according to clause 12, wherein the sub-atmospheric pressure ranges from 1 to 14 psig.

14. The method according to any of clauses 11 to 13, wherein the distillation comprises heating the aqueous ammonium salt in the presence of a mineral alkalinity source.

15. The method according to clause 14, wherein the mineral alkalinity source comprises a silicate, a carbonate, fly ash, slag, lime or cement kiln dust.

16. The method according to clause 15, wherein the mineral alkalinity source comprises a rock.

17. The method according to clause 16, wherein the mineral alkalinity comprises demolished or returned concrete.

18. The method according to any of clauses 11 to 17, wherein the distillation employs a waste heat.

19. The method according to clause 18, wherein the waste heat is provided from a source selected from the group consisting of flue gas, heat of absorption generated by the process mentioned in clause 1 step (a) and a cooling liquid, and combinations thereof.

20. The method according to any of clauses 1 to 10, wherein regenerating the aqueous capture ammonia from the aqueous ammonium salt comprises electrolysis.

21. The method according to any of the preceding clauses wherein the method further comprises contacting the regenerated aqueous capture ammonia with a gaseous source of $CO_2$ under conditions sufficient to produce an aqueous ammonium carbonate.

22. The method according to any of the preceding clauses, wherein the cation source comprises an alkaline earth metal cation.

23. The method according to clause 22, wherein the cation source is a source of divalent cations.

24. The method according to clause 23, wherein the divalent cations comprise alkaline earth metal cations.

25. The method according to clause 24, wherein the divalent alkaline earth metal cations are selected from the group consisting of $Ca^{2+}$ and $Mg^{2+}$, and combinations thereof.

26. The method according to any of clauses 22 to 25, wherein the process in clause 1 step (b) comprises introducing the cation source into a flowing aqueous ammonium carbonate under conditions sufficient such that a non-slurry solid carbonate is produced in the flowing aqueous ammonium carbonate.

27. The method according to any of the clauses in 26, wherein the solid carbonate is a particulate composition.

28. The method according to clause 27, wherein the solid carbonate material is composed of sequestered $CO_2$.

29. The method according to clause 28, wherein the method comprises producing the solid carbonate in association with a seed or substrate structure.

30. The method according to clause 29, wherein the solid carbonate is produced on at least one of a surface of or in a depression of the seed or substrate structure.

31. The method according to any of the preceding clauses, wherein the method further comprises producing a building material from the solid carbonate material.

32. The method according to clause 31, wherein the building material comprises an aggregate.

33. The method according to clause 32, where the seed structure is a porous, permeable aggregate material that is in-filled by the solid carbonate to produce a less porous, denser solid aggregate as compared to the seed structure.

34. The method according to clause 33, where the in-filled aggregate is in-filled on the outer margin to a larger extent than in the inner portion, making the new aggregate less dense in the inner region as compared to the outer margin, to produce a light weight aggregate.

35. The method according to clause 31, wherein the building material comprises roofing granules.

34a. The method according to clause 14 for recycling concrete, the method comprising dissolving calcium and alkalinity from the concrete.

35a. The method according to clause 34, wherein the residual concrete components remaining after the calcium and alkalinity are dissolved from the concrete are utilized as aggregate.

36. The method according to clause 35, where the utilization of residual concrete components is a method reducing transportation distances and thereby reduces transportation costs as well as $CO_2$ footprint based on $CO_2$ captured and residual material utilization.

37. The method according to clause 36, utilizing the remediated concrete aggregate as a substrate for applying a carbonate mineral coating derived from capture carbon dioxide for permanent sequestration in the mineral phase.

38. The method according to clause 37, wherein the remediated concrete material is used in building materials including but not limited to concrete, mortar, and replacement for mined aggregate or other used concrete or aggregate.

39. A product obtained by any of the methods of the preceding clauses that comprises a solid carbonate coating on a seed or substrate 40. A product according to any of the preceding clauses that comprises a solid carbonate coating on a seed or substrate, whereby the major divalent metal cation is calcium or magnesium 41. A product according to any of the preceding clauses that comprises a solid carbonate coating on a seed or substrate, whereby the major divalent metal cation is calcium or magnesium, with the minor metal cations being from the group of transition metals, including manganese, iron and the like.

42. A product according to any of the preceding clauses that comprises a solid carbonate coating on a seed or substrate where the particle has a delta 13C (PDB scale) of −20 to +40

43. A product according to any of the preceding clauses that comprises a solid carbonate coating on a seed or substrate where the resultant particle ranges in size from 100 um to 8000 um (8 mm)

44. A product according to any of the preceding clauses that comprises a solid carbonate coating on a seed or substrate where the resultant particle ranges in size from 1 cm to 7 cm 45. A product according to any of the preceding clauses that comprises a solid carbonate coating on a seed or substrate where the resultant particle release water over 10 days or longer during concrete curing 46. A product according to any of the preceding clauses that comprises a solid carbonate coating on a seed or substrate where the resultant particle ranges from 40-80 pound per cubic foot.

47. A method according to any of the preceding clauses dissolving geomass to provide alkalinity and hard ions to convert $CO_2$ to carbonate to permanently sequester the carbonate using mineralization.

48. The method according to clause 47 where the geomass is dissolved in a system containing an aqueous or organic liquid phase combined with geomass.

49. The method according to clause 48 where the dissolution efficiency of the system is enhanced using microwave energy.

50. The method according to clause 49 wherein said microwave energy exposure is of sufficient duration and power to extract said alkalinity and hard ions from the geomass.

51. The method according to clauses 47-50 wherein said system is exposed to microwave energy in a continuous process.

52. The method according to clauses 47-50 wherein said system is exposed to microwave energy in a batch process.

53. The method according to clauses 47-50 wherein said system is exposed to microwave energy in a combined batch and continuous process.

54. The method according to any of clauses 51-53, wherein the system is exposed to microwave energy and a liquid medium that promotes the enhanced dissolution of the geomass.

55. The method according to clause 54, wherein the liquid medium contains organic acids to enhance the dissolution efficiency.

56. The method according to clause 54, wherein the liquid medium contains organic acids to enhance the dissolution of the geomass through dielectric heating.

57. The method according to clause 54, wherein the dielectric heating reduces the auxiliary power requirement for a carbon capture method.

58. The method according to clause 54, wherein the liquid medium contains organic acids comprised of carboxylic acids, acetic acid, humic acid, oxalic acid, fulvic acid, citric acid or their conjugate bases of carboxylate, acetate, humate, oxalate, fulvate, citrate and the like, or combinations thereof.

59. A system for sequestering $CO_2$ from a gaseous source of $CO_2$, the system comprising:
 a $CO_2$ gas/aqueous capture ammonia module;
 a carbonate production module; and
 an aqueous capture ammonia regeneration module.

60. The system according to clause 59, wherein the $CO_2$ gas/aqueous capture ammonia module comprises a hollow fiber membrane.

61. The system according to clause 59 or 60, wherein the system is operatively coupled to a gaseous source of $CO_2$.

62. The system according to any of clauses 59 to 61, wherein the gaseous source of $CO_2$ is a multi-component gaseous stream.

63. The system according to any of clauses 59 to 61, wherein the gaseous source of $CO_2$ is a DAC system.

64. The system according to any of clauses 59 to 63, wherein the aqueous capture ammonia regeneration module comprises is configured to produce aqueous capture ammonia by distillation.

65. The system according to clause 64, wherein the aqueous capture ammonia regeneration module is configured to produce aqueous capture ammonia by distillation at sub-atmospheric pressure.

66. The system according to clauses 64 and 65, wherein the aqueous capture ammonia regeneration module is operably coupled to a waste heat source.

67. The system according to any of clauses 64 to 66, wherein the aqueous capture ammonia regeneration module comprises a mineral alkali source.

68. The system according to any of clauses 59 to 64, wherein the aqueous capture ammonia regeneration module is configured to produce aqueous capture ammonia via electrolysis.

69. The system according to any of clauses 59 to 64, wherein the system is configured to recycle regenerated aqueous capture ammonia to the $CO_2$ gas/aqueous capture ammonia module.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof.

Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A negative-carbon footprint concrete dry composite composition comprising:
   $CO_2$-sequestering aggregate that sequesters carbon dioxide ($CO_2$) from a direct air capture (DAC) generated gaseous source of $CO_2$, wherein the $CO_2$-sequestering aggregate comprises aggregate particles having a core and a $CO_2$ sequestering carbonate mineral coating layer on at least a portion of a surface of the core; and
   cementitious material,
   wherein the $CO_2$-sequestering carbonate mineral coating layer is distinct from the cementitious material.

2. The negative-carbon footprint concrete dry composite composition of claim 1, wherein the $CO_2$-sequestering aggregate comprises a solid carbonate composition generated by sequestering $CO_2$ from the direct air capture (DAC) generated gaseous source of $CO_2$.

3. The negative-carbon footprint concrete dry composite composition of claim 2, wherein the $CO_2$-sequestering aggregate has a total surface reflectance (TSR) value ranging from Rg; 0,=0.40 to Rg; 0,=0.98.

4. The negative-carbon footprint concrete dry composite composition of claim 2, wherein the $CO_2$ carbonate composition includes one or more contaminants selected from Hg, Ag, As, Ba, Be, Cd, Co, Cr, Cu, Mn, Mo, Ni, Pb, Sb, Se, Tl, V, and Zn, or products thereof, that are predicted not to leach into the environment.

5. The negative-carbon footprint concrete dry composite composition of claim 1, wherein the $CO_2$-sequestering aggregate is internal curing and enables release of water over time to hydrate the cementitious material.

6. The negative-carbon footprint concrete dry composite composition of claim 1, further comprising remediated concrete geomass as aggregate.

7. The negative-carbon footprint concrete dry composite composition of claim 6, wherein the remediated concrete geomass aggregate is coated with the $CO_2$-sequestering carbonate mineral coating.

8. The negative-carbon footprint concrete dry composite composition of claim 1, wherein the core and the $CO_2$ sequestering carbonate coating layer have different isotopic profiles.

9. The negative-carbon footprint concrete dry composite composition of claim 1, wherein the sequestering $CO_2$ from the DAC generated gaseous source of $CO_2$ comprises:
   contacting an aqueous capture liquid with the direct air capture (DAC) generated gaseous source of $CO_2$ under conditions sufficient to produce an aqueous carbonate; and
   combining a cation source and the aqueous carbonate under conditions sufficient to produce a $CO_2$ sequestering carbonate;
   to sequester $CO_2$ from the gaseous source of $CO_2$.

10. The negative-carbon footprint concrete dry composite composition of claim 1, wherein the core is selected from a natural mineral aggregate material and a synthetic aggregate material.

11. The negative-carbon footprint concrete dry composite composition of claim 10, wherein the core is a natural mineral aggregate material selected from carbonate rocks, sand, sandstone, gravel, granite, diorite, gabbro, and basalt.

12. The negative-carbon footprint concrete dry composite composition of claim 10, wherein the core is a synthetic aggregate material selected from blast-furnace slag, fly ash and municipal waste.

13. The negative-carbon footprint concrete dry composite composition of claim 1, wherein the carbonate mineral coating layer has a thickness ranging from 1 μm to 1000 μm.

* * * * *

UNITED STATES PATENT AND TRADEMARK OFFICE
CERTIFICATE OF CORRECTION

PATENT NO. : 12,145,098 B2  
APPLICATION NO. : 17/944489  
DATED : November 19, 2024  
INVENTOR(S) : Brent R. Constantz et al.

Page 1 of 2

It is certified that error appears in the above-identified patent and that said Letters Patent is hereby corrected as shown below:

In the Specification

Please replace "10.00" with -- 10,00 -- (Column 5, Line 63).

Please replace "lanfordite" with -- lansfordite -- (Column 10, Line 24).

Please replace "hydromagnisite," with -- hydromagnesite, -- (Column 10, Lines 24-25).

Please replace "a the" with -- the -- (Column 14, Line 29).

Please replace "Seive" with -- Sieve -- (Column 23, Line 22).

Please replace "thereof" with -- thereof. -- (Column 27, Line 41).

Please replace "aquous" with -- aqueous -- (Column 27, Line 60).

Please replace "is" with -- as -- (Column 36, Line 44).

Please replace "aklalinity" with -- alkalinity -- (Column 38, Line 19).

Please replace "aklalinity" with -- alkalinity -- (Column 38, Line 41).

Please replace "instances the," with -- instances, -- (Column 39, Line 1).

Please replace "Hitatchi" with -- Hitachi -- (Column 40, Line 38).

Please replace "substrate" with -- substrate. -- (Column 53, Line 11).

Please replace "magnesium" with -- magnesium. -- (Column 53, Line 15).

Signed and Sealed this  
Sixteenth Day of September, 2025

Coke Morgan Stewart  
*Acting Director of the United States Patent and Trademark Office*

CERTIFICATE OF CORRECTION (continued)
U.S. Pat. No. 12,145,098 B2

Please replace "+40" with -- +40. -- (Column 53, Line 24).

Please replace "(8 mm)" with -- (8 mm). -- (Column 53, Line 28).

Please replace "7 cm" with -- 7 cm. -- (Column 53, Line 31).

Please replace "curing" with -- curing. -- (Column 53, Line 35).